US011972126B2

(12) United States Patent
Durham et al.

(10) Patent No.: US 11,972,126 B2
(45) Date of Patent: Apr. 30, 2024

(54) DATA RELOCATION FOR INLINE METADATA

(71) Applicant: Intel Corporation, Santa Clara, CA (US)

(72) Inventors: David M. Durham, Beaverton, OR (US); Michael D. LeMay, Hillsboro, OR (US); Sergej Deutsch, Hillsboro, OR (US); Joydeep Rakshit, Burdwan (IN); Anant Vithal Nori, Bangalore (IN); Jayesh Gaur, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 20 days.

(21) Appl. No.: 17/472,272

(22) Filed: Sep. 10, 2021

(65) Prior Publication Data

US 2021/0405896 A1 Dec. 30, 2021

Related U.S. Application Data

(60) Provisional application No. 63/166,717, filed on Mar. 26, 2021.

(51) Int. Cl.
*G06F 3/06* (2006.01)
*G06F 12/02* (2006.01)
*G06F 12/1027* (2016.01)

(52) U.S. Cl.
CPC .......... *G06F 3/0631* (2013.01); *G06F 3/0604* (2013.01); *G06F 3/0659* (2013.01);
(Continued)

(58) Field of Classification Search
CPC .... G06F 3/0631; G06F 3/0604; G06F 3/0659; G06F 3/0679; G06F 12/0238; G06F 12/1027
See application file for complete search history.

(56) References Cited

U.S. PATENT DOCUMENTS 9,015,824 B1 4/2015 Drewry et al.
9,135,450 B2 9/2015 Grobman et al.
(Continued)

FOREIGN PATENT DOCUMENTS

EP 3745273 A1 12/2020
KR 101754518 B1 7/2017
(Continued)

OTHER PUBLICATIONS

Kroes et al., Fast and Generic Metadata Management with Mid-Fat Pointers, 2017, ACM, 6 pages (Year: 2017).*
(Continued)

*Primary Examiner* — Gary W. Cygiel
(74) *Attorney, Agent, or Firm* — Alliance IP, LLC

(57) ABSTRACT

Technologies disclosed herein provide one example of a system that includes processor circuitry to be communicatively coupled to a memory circuitry. The processor circuitry is to receive a memory access request corresponding to an application for access to an address range in a memory allocation of the memory circuitry and to locate a metadata region within the memory allocation. The processor circuitry is also to, in response to a determination that the address range includes at least a portion of the metadata region, obtain first metadata stored in the metadata region, use the first metadata to determine an alternate memory address in a relocation region, and read, at the alternate memory address, displaced data from the portion of the metadata region included in the address range of the memory allocation. The address range includes one or more bytes of an expected allocation region of the memory allocation.

25 Claims, 19 Drawing Sheets

(52) U.S. Cl.
CPC ........ *G06F 3/0679* (2013.01); *G06F 12/0238* (2013.01); *G06F 12/1027* (2013.01)

(56) References Cited

U.S. PATENT DOCUMENTS

| | | | |
|---|---|---|---|
| 9,390,268 | B1 | 7/2016 | Martini et al. |
| 9,436,847 | B2 | 9/2016 | Durham et al. |
| 9,753,754 | B2 | 9/2017 | Howell et al. |
| 9,830,162 | B2 | 11/2017 | LeMay |
| 9,954,950 | B2 | 4/2018 | LeMay et al. |
| 10,326,744 | B1 | 6/2019 | Nossik et al. |
| 10,706,164 | B2 | 7/2020 | LeMay et al. |
| 10,785,028 | B2 | 9/2020 | Girkar et al. |
| 10,860,709 | B2 | 12/2020 | LeMay et al. |
| 11,216,366 | B2 | 1/2022 | Durham et al. |
| 11,288,188 | B1 * | 3/2022 | Tummala ............ G06F 12/0646 |
| 11,403,234 | B2 | 8/2022 | Durham et al. |
| 11,416,624 | B2 | 8/2022 | Durham et al. |
| 2002/0065993 | A1 | 5/2002 | Chauvel |
| 2005/0010804 | A1 | 1/2005 | Bruening et al. |
| 2006/0080553 | A1 | 4/2006 | Hall |
| 2007/0192592 | A1 | 8/2007 | Goettfert et al. |
| 2007/0220500 | A1 | 9/2007 | Saunier |
| 2008/0205651 | A1 | 8/2008 | Goto et al. |
| 2008/0229425 | A1 | 9/2008 | Perrin et al. |
| 2008/0288785 | A1 | 11/2008 | Rao et al. |
| 2008/0320601 | A1 | 12/2008 | Linsley |
| 2009/0249064 | A1 | 10/2009 | Atley et al. |
| 2010/0122088 | A1 | 5/2010 | Oxford |
| 2010/0281273 | A1 | 11/2010 | Lee et al. |
| 2013/0191649 | A1 | 7/2013 | Muff et al. |
| 2013/0232507 | A1 | 9/2013 | Farrugia et al. |
| 2013/0283396 | A1 | 10/2013 | Langer et al. |
| 2014/0020092 | A1 | 1/2014 | Davidov |
| 2014/0149730 | A1 | 5/2014 | Joshi et al. |
| 2015/0032996 | A1 | 1/2015 | Koeberl et al. |
| 2015/0381358 | A1 | 12/2015 | Grobman et al. |
| 2016/0092702 | A1 | 3/2016 | Durham et al. |
| 2016/0292422 | A1 | 10/2016 | Hayashi et al. |
| 2016/0335187 | A1 | 11/2016 | Greenspan et al. |
| 2016/0364341 | A1 | 12/2016 | Banginwar et al. |
| 2016/0371496 | A1 | 12/2016 | Sell |
| 2016/0380772 | A1 | 12/2016 | Gopal et al. |
| 2017/0063547 | A1 | 3/2017 | Brandt et al. |
| 2017/0093567 | A1 | 3/2017 | Gopal et al. |
| 2017/0235957 | A1 | 8/2017 | Maletsky |
| 2017/0237560 | A1 | 8/2017 | Mueller et al. |
| 2017/0249260 | A1 | 8/2017 | Sahita et al. |
| 2017/0300425 | A1 | 10/2017 | Meredith et al. |
| 2017/0308297 | A1 | 10/2017 | Roberts et al. |
| 2017/0344297 | A1 | 11/2017 | Woolman et al. |
| 2017/0364704 | A1 | 12/2017 | Wright et al. |
| 2018/0046576 | A1 | 2/2018 | Lesartre et al. |
| 2018/0082057 | A1 | 3/2018 | LeMay et al. |
| 2018/0268170 | A1 | 9/2018 | Li et al. |
| 2019/0044927 | A1 | 2/2019 | Sood et al. |
| 2019/0102322 | A1 | 4/2019 | Chhabra et al. |
| 2019/0227951 | A1 | 7/2019 | Durham et al. |
| 2019/0339978 | A1 | 11/2019 | Wallach |
| 2019/0377574 | A1 | 12/2019 | Weimer |
| 2020/0050553 | A1 | 2/2020 | Hajj et al. |
| 2020/0089430 | A1 | 3/2020 | Kanno |
| 2020/0125501 | A1 | 4/2020 | Durham et al. |
| 2020/0125770 | A1 | 4/2020 | LeMay et al. |
| 2020/0159676 | A1 | 5/2020 | Durham et al. |
| 2020/0201789 | A1 | 6/2020 | Durham et al. |
| 2020/0241775 | A1 | 7/2020 | Breslow |
| 2020/0249995 | A1 | 8/2020 | Wong et al. |
| 2020/0379902 | A1 | 12/2020 | Durham et al. |
| 2020/0380140 | A1 | 12/2020 | Medwed et al. |
| 2020/0382303 | A1 | 12/2020 | Girkar et al. |
| 2021/0200673 | A1 | 7/2021 | Gupta et al. |
| 2021/0240638 | A1 | 8/2021 | Deutsch et al. |
| 2022/0012188 | A1 | 1/2022 | Durham et al. |
| 2022/0156180 | A1 | 5/2022 | Durham et al. |
| 2022/0206958 | A1 | 6/2022 | LeMay et al. |
| 2022/0382885 | A1 | 12/2022 | Durham et al. |

FOREIGN PATENT DOCUMENTS

| | | |
|---|---|---|
| WO | 2013147794 A1 | 10/2013 |
| WO | 2014059438 A2 | 4/2014 |
| WO | 2021162792 A1 | 8/2021 |
| WO | 2022139850 | 6/2022 |

OTHER PUBLICATIONS

Durham, David M. et al; U.S. Appl. No. 17/539,933, filed Dec. 1, 2021.
EPO; Extended European Search Report issued in EP Patent Application No. 20210029.3, dated May 20, 2021; 8 pages.
PCT International Search Report and Written Opinion issued in PCT/US2020/067072, dated May 26, 2021; 13 pages.
Haraken, "CheckedPtr2 and CheckedPtr3," Apr. 2020, retrieved on Sep. 27, 2021 from https://docs.google.com/document/d/14TsvTgswPUOQuQol9TmkFQnuSaFD8ZLHRvzapNwl5vs, 8 pages.
Kim, Yonghae, et al.; "Hardware-based Always-On Heap Memory Safety," 2020 53rd Annual IEEE/ACM International Symposium on Microarchitecture (MICRO); Athens, Greece; 14 pages.
Myoung Jin Nam, Periklis Akritidis, and David J Greaves. 2019. FRAMER: a tagged-pointer capability system with memory safety applications. In Proceedings of the 35th Annual Computer Security Applications Conference (ACSAC 19), Association for Computing Machinery, New York, NY, USA, 612-626, https://doi.org/10.1145/3359789.3359799.
Dutch Office Action received in Application No. 2029792, dated Mar. 22, 2023, with Statement of Relevance, 15 pages.
L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008, doi: 10.1109/TC.2008.69; 14 pages.
Ainsworth, Sam et al., "MarkUs: Drop-in use-after-free prevention for low-level languages," 2020 IEEE Symposium on Security and Privacy, Cambridge, UK (14 pages).
Carlini, Nicholas, et al.; "Control-Flow Bending: On the Effectiveness of Control-Flow Integrity," Proceedings of the 24th USENIX Security Symposium; Washington, D.C.; Aug. 2015; 16 pages.
Carr, Scott A. et al., "DataShield: Configurable Data Confidentiality and Integrity," Purdue University, ASIA CCSs, '17, Apr. 2-6, 2017, Abu Dhabi, United Arab Emirates (12 pages).
Chen, Tony et al., "Pointer Tagging for Memory Safety." Microsoft. Retrieved from https://www.microsoft.com/en-us/research/uploads/prod/2019/07/Pointer-Tagging-for-Memory-Safety.pdf, 23 pages.
Durham, David M., et al.; U.S. Appl. No. 17/791,000, filed Jul. 6, 2022.
EPO; Office Action issued in EP Patent Application No. 20210029.3, dated Mar. 16, 2022; 4 pages.
Filardo, Nathaniel Wesley et al., "Cornucopia: Temporal Safety for CHERI Heaps;" Cambridge, UK. (18 pages).
GitHub.com; "V8 Garbage Collector," Oct. 23, 2018 (13 pages).
Haraken@, et al..; "MTECheckedPtr" Last updated Jul. 9, 2020; Accessed Jul. 19, 2022; Retrieved from https://docs.google.com/document/d/1ph7iOorkGqTuETFZp-xvHV4L2rYootuz1ThzAAoGe30/edit#heading=h.b57m9s7iv7yr, 9 pages.
Hong, H. et al., "Data-Oriented Programming: On the Expressiveness of Non-Control Data Attacks," IEEE S&P, 18 pages, 2016.
INTEL; "Intel 64 and IA-32 Architectures Software Developer's Manual," vol. 1: Basic Architecture, Chapter 3: Basic Execution Environment; Oct. 2019; 57 pages.
INTEL; "Intel 64 and IA-32 Architectures Software Developer's Manual," vol. 1: Basic Architecture, Chapter 6: Procedure Calls, Interrupts, and Exceptions; Oct. 2019; 48 pages.
INTEL; "Intel 64 and IA-32 Architectures Software Developer's Manual," vol. 3: System Programming Guide, Chapter 6; Oct. 2019; 110 pages.

(56) References Cited

OTHER PUBLICATIONS

L. Muscariello et al., "Hybrid Information-Centric Networking draft-muscariello-intarea-hicn-00," Cisco Systems, Inc., Jun. 7, 2018 (21 pages).
Mohamed et al., "A scheme for implementing address translation storage buffers," Proceedings of the 2002 IEEE Canadian Conference on Electrical and Computer Engineering, 2002, pp. 626-632.
Notice of Allowance, U.S. Appl. No. 16/024,259, dated May 20, 2020, 20 pages.
Notice of Allowance, U.S. Appl. No. 16/728,928, dated Feb. 22, 2021, 10 pages.
Notice of Allowance, U.S. Appl. No. 17/321,087, dated Apr. 13, 2022, 13 pages.
Notice of Allowance, U.S. Appl. No. 17/321,087, dated May 4, 2022, 9 pages.
PCT International Search Report and Written Opinion issued in PCT/US2020/067076, dated Sep. 9, 2021; 11 pages.
Watson et al., Capability Hardware Enhanced RISC Instructions (CHERI): Notes on the Meltdown and Spectre Attacks, University of Campbridge Computer Laboratory, Feb. 2018, 16 pages.
Watson, Robert N.M., et al., "Capability Hardware Enhanced RISC Instructions: CHERI Instruction-Set Architecture (Version 8)," University of Cambridge Computer Laboratory Technical Report No. 951, Cambridge, UK; Oct. 2020 (590 pages).
Xia, Hongyan et al., "CHERIvoke: Characterising Pointer Revocation using CHERI Capabilities for Temporal Memory Safety," MICRO-52, Oct. 2019, Columbus, OH, US (13 pages).
Yan, Z., et al., "Hardware translation coherence for virtualized systems," 2017 3 ACM/IEEE 44th Annual International Symposium on Computer Architecture (ISCA), 2017, pp. 430-443, doi: 10.1145/3079856.3080211. {Year: 2017).
France Intellectual Property Office; Search Report issued in FR2114288, dated Jan. 12, 2023; 18 pages with English translation.
USPTO Non-Final Office Action for U.S. Appl. No. 17/485,213, entitled, Object and Cacheline Granularity Cryptographic Memory Integrity (19 pages).
Non-Final Office Action received in U.S. Appl. No. 16/998,913, dated Jan. 25, 2023, 13 pages.
USPTO Non-Final Office Action for U.S. Appl. No. 17/481,405, entitled, Cryptographic Computing Including Enhanced Cryptographic Addresses (19 pages).
EPO; Extended European Search Report issued in EP Patent Application No. 22153425.8, dated Jul. 18, 2022; 8 pages.
PCT International Preliminary Report on Patentability issued in PCT/US2020/067072, dated Aug. 25, 2022; 8 pages.
USPTO Non-Final Office Action for U.S. Appl. No. 17/539,933, filed Dec. 1, 2021 entitled, Security Check Systems and Methods for Memory Allocations (5 pages).
USPTO Notice of Allowance for U.S. Appl. No. 17/539,933 entitled, Security Check Systems and Methods for Memory Allocations (7 pages).
International Preliminary Report on Patentability for International Patent Application No. PCT/US2020/067076, dated Jul. 6, 2023; 7 pages.
USPTO Final Office Action for U.S. Appl. No. 17/481,405, entitled, Cryptographic Computing Including Enhanced Cryptographic Addresses (21 pages).
USPTO Final Office Action for U.S. Appl. No. 17/485,213, entitled, Object and Cacheline Granularity Cryptographic Memory Integrity (19 pages).
USPTO Notice of Allowance for U.S. Appl. No. 16/998,913 (13 pages).
France Intellectual Property Office; Office Action issued in FR2114288, dated Nov. 28, 2023; 4 pages with English translation.
USPTO Notice of Allowance for U.S. Appl. No. 17/485,213 received Dec. 14, 2023 (11 pages).

\* cited by examiner

DATA RELOCATION FOR INLINE METADATA

CROSS REFERENCE TO RELATED APPLICATION

This application claims the benefit of, and priority to, U.S. Provisional Patent Application No. 63/166,717, entitled "Data Relocation for Inline Metadata" and filed Mar. 26, 2021, the entire disclosure of which is incorporated herein by reference.

TECHNICAL FIELD

This disclosure relates in general to the field of computer systems, more particularly, to data relocation for inline metadata.

BACKGROUND

Memory safety vulnerabilities such as buffer overflows and Use-After-Free (UAF) account for a large majority of all software vulnerabilities. Proposed mitigations have high overheads due to increased pointer sizes, reliance on tables with poor locality, and metadata duplication. For example, memory tagging technology is a memory safety mechanism designed to prevent buffer overruns, overflows, and UAF exploits. Typically, the technology uses a repeating memory tag for every data block. For example, in systems using a 16 byte memory block, a 1 byte tag is associated with each memory block. Thus, a 16 GB memory allocation may require an additional 1 GB simply to store the tag data—resulting in gigabytes of wasted memory and performance impacts due to multiple redundant memory accesses to retrieve the tag metadata.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

Figure 1:
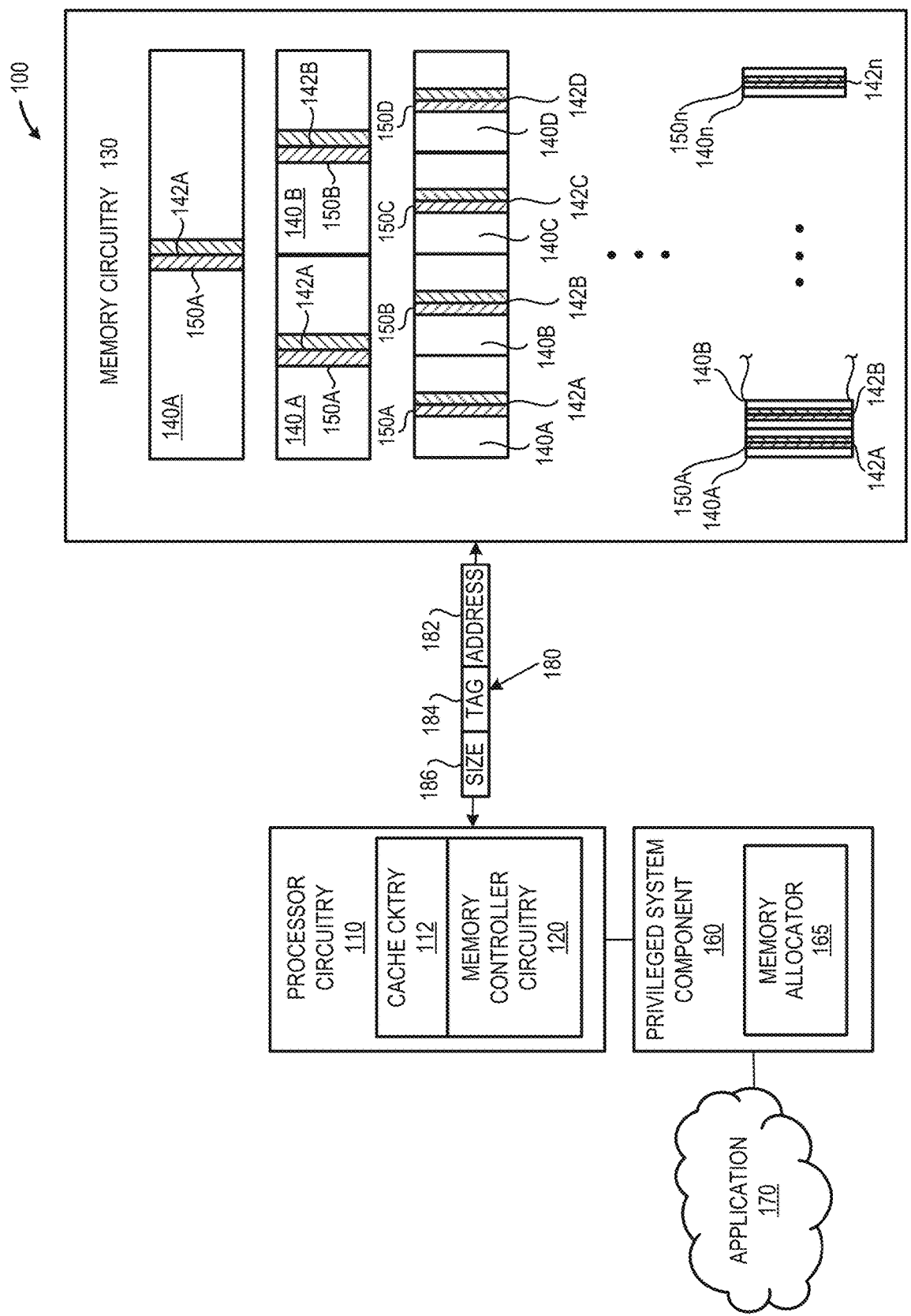
FIG. 1 is a schematic diagram of an illustrative system for performing security checks for memory allocations, in accordance with at least one embodiment described herein.

The systems and methods described herein provide systems, methods, and computer readable media containing instructions that store tag metadata associated with a memory allocation at the mid-point of the memory allocation. Using the 16 GByte example from above, using traditional tag metadata would require 1 GByte of additional memory space to repeatedly store the tag metadata for each 16 Byte sub portion of the allocation. One beneficial technique is to reduce this memory requirement to a single copy of metadata inline with the associated allocation for favorable cache locality and constant-time metadata updates. The metadata region containing the single copy of metadata is located at a memory address within the 16 GB memory allocation, a billion-fold decrease in memory required to store the tag metadata. The tag metadata is hidden from software by the system processor circuitry, providing an appearance to an application that the data is still arranged in contiguous memory (e.g., logical addresses) when incrementing the linear/virtual address or index across the extent of the memory allocation. The processor redirects attempted software accesses to the metadata locations so that they instead access memory at the end of the allocation. Thus, the metadata effectively displaces some data to at least one end of the allocation or to another location in memory.

The middle or center of a memory allocation slot (which can also be referred to as a "bounding box") is determined by the memory controller circuitry (or processor circuitry) using a best-fit power of two pointer encoding. The tag metadata may be encoded only once per memory allocation, located at the mid-point of the allocation's slot (or bounding box), and hidden by the processor circuitry such that the memory appears as a contiguous allocation to software using an encoded pointer (for example, a data array would only see data, and no metadata, at each indexed location into the array).

The systems and methods disclosed herein use pointer encoding, such as a power of two size and a memory address of a memory allocation's slot, to determine the mid-point of the memory allocation's power of two slot. Each memory allocation of a particular size plus its metadata and location is assigned to exactly one slot of the smallest size that fits the allocation, and the allocation will always contain the mid-point of such slot, as will be further described herein. The tag metadata associated with the entire memory allocation can be stored about the determined slot mid-point location. In some embodiments, the C++ New or C malloc function (or similar functions in other programming languages) of a memory allocator library takes the tag metadata size into account and adjusts (increases) the memory allocation accordingly to accommodate the tag metadata size and any additional metadata such as the allocation's true size, an integrity value, or any other metadata that may be stored in a metadata region of the memory allocation (e.g. context identifier, privileges, secret, message authentication code, etc.). Because the metadata is stored in the middle of the allocation's slot, in some systems the processor circuitry can hide the existence of the metadata (e.g., tag) when loading data from the memory allocation by replacing that value with data that was relocated, for example, to the end of the allocation. Meanwhile, the processor can directly determine the location of the metadata in memory (the corresponding mid-point of the allocation's assigned slot) for the allocation based on the pointer encoding. Specifically, the metadata location is compactly specified in the upper pointer bits that are unneeded for addressing (e.g., in a size/power field). This allows the metadata to be located directly from a pointer in one step regardless of the pointer's offset within an allocation. No updates to that metadata location information are needed even when the pointer address is updated to reference different parts of an allocation.

The systems and methods disclosed herein benefit from the realization that a power of two encoding of the allocation size will have a best fit slot (bounding box) mid-point value that is always located within the memory allocation including the metadata. Beneficially, multiple memory allocations may overlap within a larger memory allocation's power of two size slot, but each of the smaller memory allocations will have different mid-point addresses and each of the smaller memory allocation slot mid-point values will differ from the larger memory allocation slot's mid-point value. The pointer may include a number of bits (e.g., 6-bits for a 64 bit pointer, 7-bits for a 128 bit pointer, and so on) to identify the power of two encoding of the allocation size and optionally, a tag value for versioning, which can prevent use-after-free (UAF). The actual allocated memory bounds (e.g., offset and array size, or actual allocation size to the left and allocation size to the right of the slot mid-point, or any other information that indicates the actual beginning and end of the allocation) may be encoded into the mid-point metadata and checked by the processor circuitry to ensure a given memory access is performed only within the boundary addresses of the current memory allocation. These bounds may be sized according to the power of two slot size identified by the pointer's power size field value to optimize memory use, with smaller slots requiring fewer bytes to encode the allocation's true bounds verses larger allocations requiring additional bytes to encode the larger allocations true bounds. The bounds information contained in the metadata may then be beneficial for the processor locating the data that should be located at the slot's mid-point and that was displaced by the metadata, such as, by relocating the displaced data to the beginning or end of the allocation as determined by the bound's metadata value.

Beneficially, the systems and methods disclosed herein reduce memory overhead for storing metadata/tags, while providing performance optimizations. Unlike memory tagging technology (MU) or memory tagging extension (MTE), where the processor circuitry may cache one tag per each memory block (e.g., 16B) comprising an allocation, using systems and methods related to linear inline metadata (LIM) described herein, where a single metadata region is defined for an entire allocation and the processor can cache one tag/bounds per allocation, minimizes storage overhead and transfer bandwidth, maximizes cache locality, and avoids the need for the operating system to manage separate metadata tables. Additionally, linear inline metadata does not expand pointer sizes, require pointer tagging, restrict pointer ranges, or impose rigid allocation layouts. Such systems and methods make caching far more effective and reduce memory lookups to fetch metadata from the mid-point of the allocation's power of two slot. Likewise, the data displaced by the metadata may similarly be cached so that data accesses to the slot mid-point will be available in the cache. Furthermore, smaller memory allocations (for smaller data objects) likely have the metadata on the same cache line as data, completely avoiding the extra memory lookups (loads) from a separate cacheline or metadata tag table as MU (also referred to as data corruption detection DCD) requires.

When allocating memory (e.g., by an operating system, in the heap or in the stack), memory allocation operations can be invoked by instructions such as MALLOC( )/ALLOC/NEW for example, or implicitly via a loader, or statically allocating memory by a compiler, etc. The memory allocation operations can simply account for the metadata in the middle of the memory allocation's power of two slot, increase the allocation size (e.g., by one byte, or two bytes, or more depending on the size of the power of two slot and associated metadata size), and set the tag value in the middle of the memory allocation's power of two slot along with the bounds of the actual allocation. The memory allocation operations can return a pointer encoded with metadata such as the same tag value in a metadata field and size metadata (e.g., a power of two size of the slot) in the power size field. In this specification, the middle of the memory allocation's power of two slot where metadata is stored inline with data stored in the memory allocation is referred to herein as a 'metadata storage location' or a 'metadata region.' In one or more embodiments disclosed herein, where the allocation size is increased to accommodate inline metadata, the data displaced by the metadata stored in the metadata region can be relocated to one (or both) ends of the expanded allocation. The area where the displaced data is stored is referred to herein as a 'relocation region.'

In other embodiments, memory allocation operations allocate memory using the requested allocation size (rather than expanding the allocation size) and set the tag value in the middle of the memory allocation's power of two slot along with the bounds of the actual allocation. The memory allocation operations can also identify a relocation region in memory that is outside the memory allocation. Data that is displaced by the metadata stored at the middle of the allocation's power of two slot, in the metadata region, can be stored in the separate relocation region. The memory allocation operations can also generate a redirection pointer or index to the relocation region that may be stored in the metadata region. The memory allocation operations can return a pointer as previously described.

When accessing memory (e.g., by a program, in the heap or in the stack), memory access operations to read or load data can be invoked by instructions such as a "MOV" or "LOAD" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Memory access operations to store data can be invoked by instructions such as a "MOV" or "STORE" instruction or any other instruction that causes data to be read, copied, or otherwise accessed at one storage location, e.g., register, and moved into another storage location, e.g., memory or cache, or any instruction that accesses or manipulates memory. As used herein, "memory access requests" may be embodied as one or more of these instructions that, when executed, invoke the appropriate memory access operations.

When the processor is accessing a memory allocation with an encoded pointer format as previously described (e.g., encoded with a tag value and a power of two size of the allocation's assigned slot), the processor circuitry looks up the tag value from the middle of the allocation's power of two slot and compares with the pointer tag value, allowing memory access if they match, triggering a fault or exception if they don't match. In one or more embodiments disclosed herein, bounds information is also included in the metadata and may be used to locate the data displaced by the metadata, such as, relocating the displaced data to the end of the allocation. Memory deallocation (or free) operations, invoked by an instruction such as FREE( ) for example, will then reset the memory tag and other metadata values. The processor may also use bounds information in the metadata to verify that the memory access is within the correct allocation bounds, for example, is within X1 bytes (or other unit of minimum allocation size) from the left of the slot mid-point and X2 bytes (or other unit of minimum allocation size) from the right of the mid-point of the slot, where tag, X1 and X2 are separate fields of the mid-point metadata. In one or more embodiments disclosed herein, accesses to the mid-point of the slot may be redirected to the end of the allocation given the bounds to locate the data displaced by the mid-point metadata. (Other embodiments may locate the data displaced by the mid-point metadata to the beginning of the allocation or additional metadata fields may specify the exact location of the displaced data anywhere in memory, e.g., by providing a memory address to locate the displaced data).

In some other approaches, data from the mid-point to the end of the allocation is shifted to the right in a memory allocation. In memory access operations, a processor skips over the metadata and adjusts the physical address accordingly. Thus, data can be accessed by adding the size of the tag metadata to memory accesses of physical addresses past the mid-point based on the pointer encoding. While such approaches can offer significant improvements in memory overhead and performance by reducing redundant storage and accesses of metadata associated with memory allocation, some issues may arise from the shifting of data within a memory allocation to create space for the tag data and possibly other metadata. For example, devices that perform direct memory accesses to buffers may not be configured to expect linear inline metadata and replacing the metadata requires shifting the data back to its original position in the allocation. In another example, shifting the data can potentially cause alignment issues down a buffer, in the form of cache line splitting. In a further example, memory reallocations may be inefficient as they require shifting the data back to its original position in the allocation, and obtaining a new allocation, which requires shifting the data again to make room for the metadata in the memory region.

A memory allocation and access system with data relocation for inline metadata, as disclosed herein, can resolve these issues (and more), while still providing the substantial benefits of reducing redundant metadata storage and accesses in memory allocations. In one or more embodiments, a memory allocation and access system with data relocation for inline metadata includes displacing application data from a metadata region of a memory allocation and storing desired metadata, such as tag or version metadata and/or bounds information in the metadata region instead. During memory store operations, the displaced data is moved to another, alternate location at the beginning or end of the allocation, or in a non-adjacent location in memory. The stored data appears to the application to still be arranged in contiguous logical addresses. The processor redirects attempted software accesses to the metadata regions so that they instead access memory at the end of the allocation (or in the other non-adjacent allocation). The processor finds and reads the metadata in the metadata region using the slot mid-point location. In response to a memory access request to retrieve data (e.g., load, read, move, etc.) in that metadata region, the processor uses the metadata to locate the data that was displaced by the metadata and stored at an alternate location, and to retrieve the displaced data from that alternate location. The alternate location may be at the beginning or the end of the buffer allocation or in non-adjacent location in memory. Similarly, in response to a memory access request to store data (e.g., store, write, move, etc.) in that metadata region, the processor locates the metadata in the metadata region of the memory allocation, and uses the metadata to locate an alternate location where data that is to be displaced by the metadata is to be stored, and stores the displaced data in that alternate location. Additionally, for variable sized metadata that is larger (e.g., in page-sized allocations or other large allocations), the metadata (and its associated metadata region in the page-sized allocation) can be extended to include a pointer (e.g., encoded) or index to the relocated data's actual location.

Advantageously, the memory allocation and access system with data relocation for inline metadata not only offers significant memory efficiency, but also provides substantially higher performance than a system without the data relocation feature. Importantly, during a memory reallocation, the data does not have to be shifted, which significantly improves the efficiency of the reallocation. Similarly, on a direct memory access operation, only one location needs to be patched to replace the metadata in the metadata region with data for the direct device access. Storing a single metadata block for an entire allocation, instead of storing metadata for every defined block of memory (e.g., every 16B granule of memory), saves memory and reduces the time complexity of setting and checking metadata across an entire allocation. Furthermore, small allocations are able to store metadata on the same cacheline as data, thus avoiding loads of separate cachelines. Beneficially, metadata can be located directly in one action regardless of the pointer's offset within a memory allocation. Also, no updates to the metadata in the metadata region of a memory allocation are needed even when the pointer address is updated to reference different parts of the allocation. Finally, data alignment issues due to shifting data (e.g., split cache lines) are just associated with the slot's mid-point data, and other data locations can be aligned as normal.

Embodiments that extend metadata to include a redirection pointer (address) or index to the actual location of relocated data allow for linear tables to be much smaller and dynamically scaled, or for on-the-fly allocated linked lists to be used, as the displaced data can be relocated anywhere in memory. Furthermore, page-alignment issues can also be resolved. Redirection pointers, addresses, or indexes to an alternative location for relocated data may only be needed when a slot size extends above a large allocation having a designated threshold size (e.g. a threshold number (one or more) of pages, cache lines, blocks, or frames, or any other threshold size of memory for a large allocation). Thus, the extra memory usage for an index or redirection pointer metadata value may be avoided in smaller slots.

In some embodiments, the metadata for large slots may include a bit indicating whether the displaced data is stored inline at the beginning or end of the allocation or out-of-line in a separate table with an associated index or redirection pointer to the table stored in the metadata. Alternatively, metadata for large slots above some threshold size may be stored in a separate table indexed by the address of the slot, which can eliminate alignment issues for the data buffer, avoid indirection, and avoid the overhead of storing a redirection pointer or index in the metadata. Some allocators group large allocations into a subset of the available address space. The separate metadata table could be reserved for that subset of memory, rather than the entire address space, to reduce the address space and/or committed memory needed for the table. Instead of a redirection pointer, this separate metadata table may be accessible via, for example, an address in a register (e.g., model specific register (MSR)). Specialized metadata or displaced data caching could be performed selectively or preferentially for large allocations, since accesses to a given large allocation may have more temporal locality and since accessing out-of-line metadata or displaced data may be slower than accessing inline metadata or displaced data.

Some embodiments may only store a redirection pointer in the slot's mid-point metadata, locating both the displaced data and metadata (e.g., tag, bounds, etc.) to the address identified by the redirection pointer. In this way, both the displaced data and the metadata, or some portion of the metadata, can be relocated to a relocation region in memory (e.g., beginning portion of an allocation, end portion of the allocation, another memory location separate from the allocation). Advantageously, such embodiments may protect the relocation regions in memory from general access by software, for example, by using range registers, page table entries, or protection keys to identify the relocation regions, which require software to use special access instructions or privileges to read or write the metadata and/or displaced data contained in the relocation regions.

Alternatively, some or all metadata besides the redirection pointer or index may be retained inline with the data at the mid-point of the slot, e.g., to minimize the need to reassemble data at unaligned boundaries or to avoid the need for looking up the displaced data/metadata for access requests that can be decided and satisfied solely based on the inline data and metadata. That inline metadata retained at the mid-point may still benefit from the protections applied to the relocation regions by storing within the relocation region certain information to be protected such as a copy of the inline metadata or a message authentication code (MAC) or integrity check value (ICV) computed over the inline metadata. For accesses that can be decided and satisfied solely based on the inline data and metadata, varying policies with a spectrum of overhead and protection levels can be applied regarding when to check the integrity of the inline metadata using the protected information. For example, the integrity could be checked every time the metadata is loaded, randomly with a certain expected interval, or at some other set of times.

Note that in the following discussion specific components are designated using an alphanumeric item designator. For example, a first element may be designated 110A and a second element may be designated 110B. For ease of discussion and conciseness, when describing a feature common to both elements, the alphanumeric designator is omitted. Thus, when such a generic (i.e., non-alphanumeric) designator is used, the described feature should be understood as applicable to all elements sharing a common numeric designator. For example, a feature described with respect to "element 110" would apply to all elements 110A-110$n$. On the other hand, a feature described with respect to "element 110A" would apply specifically to the element designated 110A and not to elements designated 110B through 110$n$.

FIG. 1 is a schematic diagram of an illustrative system 100 for performing security checks on memory allocations and in which the system 100 includes processor circuitry 110, memory controller circuitry 120, and memory circuitry 130, with memory apportioned into one or more power of two (i.e., $2^0$ to $2^n$) memory allocation slots 140A-140$n$, in which respective metadata regions 150A-150$n$ are defined across respective mid-points 142A-142$n$ of the slots. In at least one embodiment, memory allocations obtained by an executing application are assigned to one of the memory allocation slots 140A-140$n$. For any given memory allocation slot 140 to which a memory allocation is assigned, unique metadata that is associated with the memory allocation is stored in a metadata region 150 defined in the given memory allocation slot 140. Metadata stored in a metadata region 150 can also include respective lower bound information and upper bound information for the memory allocation assigned to the memory allocation slot 140 in which the metadata region 150 is defined. The encoding of a virtual/linear address (pointer) for a memory allocation identifies a memory allocation slot to which the memory allocation is assigned and may include unique tag data that is associated with the memory allocation and with embedded metadata in the metadata region of the slot, which is hidden by the processor from software.

FIG. 1 depicts the memory circuitry 130 allocated into a number of sample memory allocation slots 140A-140$n$. In embodiments, an instruction that causes the processor circuitry 110 to perform a memory operation causes the memory controller circuitry 120 to access the memory circuitry 130 using an encoded pointer 180 that includes at least data representative of the memory address 182 of the memory operation and metadata, such as data representative of a size of a memory allocation slot to which a memory allocation is assigned. Optionally, the metadata may also include tag data 184 associated with the memory allocation assigned to a memory allocation slot 140 containing memory address 182. The tag data 184 can be compared to the tag data in the metadata region 150 defined at the mid-point of the respective memory allocation slot 140. If the pointer tag data 184 matches the stored tag data in the metadata region 150 within the memory allocation slot 140, the operation at the designated memory address 182 is permitted. If the pointer tag data 184 fails to match the stored tag data in the metadata region 150 within the memory allocation slot 140, an exception is returned to the processor circuitry 110. Although the memory controller circuitry 120 is depicted in FIG. 1 as a separate box from the processor circuitry 110, in some embodiments, the processor circuitry 110 may include all or a portion of the memory controller circuitry 120. In some embodiments, the processor circuitry 110 may include cache circuitry 112.

The processor circuitry 110 includes any number and/or combination of electrical components, optical components, quantum components, semiconductor devices, and/or logic elements capable of executing machine-readable instructions, such as provided by one or more applications 170. In embodiments, the processor circuitry 110 may include a plurality of processor core circuits. In embodiments, each of processor core circuits may provide one or more physical and/or virtual processor threads. The processor circuitry 110 may include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples the processor circuitry 110 may also be an application specific integrated circuit (ASIC) and at least some modules processor core circuits may be implemented as hardware elements of the ASIC.

Processor circuitry 110 may include all or a part of memory controller circuitry 120 (memory management unit (MMU), address generation unit (AGU), cache, load buffer, store buffer, etc.) and may also include cache circuitry 112. Memory controller circuitry 120 can include any number and/or combination of electrical components, optical components, quantum components, semiconductor devices, and/or logic elements capable of performing read and/or write operations to the processor cache circuitry 112 and/or the system memory circuitry 130. In some embodiments, the processor circuitry 110 and/or the memory controller circuitry 120 may include memory management unit circuitry to store information and/or data used to provide paginated (e.g., via 4 KB pages) address translations.

In some embodiments, a privileged system component 160, such as an operating system kernel or virtual machine monitor may facilitate communication between applications, such as application 170 and hardware components such as processor circuitry 110 and/or memory controller circuitry 120, for example. Furthermore, privileged system component 160 may be part of a trusted execution environment (TEE), virtual machine, processor circuitry 110, a co-processor (not shown), or any other suitable hardware, firmware, or software of a computing device or securely connected to computing device. A memory allocator 165 may be part of privileged system component 160 and may be embodied as software, firmware, or hardware, or any combination thereof. Memory allocator may be configured to allocate portions of memory circuitry (e.g., based on instructions such as malloc, realloc, calloc, etc.) to the various processes running on the computing device, to deallocate memory (e.g., based on instructions such as delete, free, etc.) or reallocate memory (e.g., based on instructions such as realloc, etc.) for various processes running on the computing device. The memory allocator 165 could be embodied as, for example, a loader, memory manager service, or a heap management service.

In response to execution of an instruction causing a memory access operation, the processor circuitry 110 generates an encoded pointer 180 that includes at least data representative of the memory address 182 involved in the operation, data representative of the size data 186 (e.g., based on a power of two) of a slot to which the memory allocation is assigned, and optionally, data representative of the tag data 184 associated with the memory allocation slot 140 containing the memory address 182. The encoded pointer 180 may include additional information, such as pointer arithmetic as described below in detail with regard to FIG. 2. In embodiments, the memory controller circuitry 120 compares the tag data 184 carried by the encoded pointer 180 with the tag data stored in the metadata region 150 at the mid-point 142 of the memory allocation slot 140. If the tag data 184 carried by the encoded pointer 180 matches the tag data stored in the metadata region 150 at the mid-point 142 of the memory allocation slot 140, the memory controller circuitry 120 completes the requested operation. If the tag data 184 carried by the encoded pointer 180 fails to match the tag data stored in the metadata region 150 at the mid-point 142 of the memory allocation slot 140, the memory controller circuitry 120 returns an exception to the processor circuitry 110.

The system memory circuitry 130 includes any number and/or combination of electrical components, semiconductor devices, optical storage devices, quantum storage devices, molecular storage devices, atomic storage devices, and/or logic elements capable of storing information and/or data. All or a portion of the system memory circuitry 130 may include transitory memory circuitry. All or a portion of the system memory circuitry 130 may include non-transitory memory circuitry. The system memory circuitry 130 may include one or more storage devices having any storage capacity. For example, the system memory circuitry 130 may include one or more storage devices having a storage capacity of about: 512 kilobytes or greater; 1 megabyte (MB) or greater; 100 MB or greater; 1 gigabyte (GB) or greater; 100 GB or greater; 1 terabyte (TB) or greater; or about 100 TB or greater.

In some embodiments, an instruction that causes the processor circuitry 110 to perform a memory allocation operation causes the processor circuitry 110 to apportion the memory circuitry 130 into any power of two number of memory allocation slots 140A-140n. As depicted in FIG. 1, in some embodiments, the processor circuitry 110 may apportion the memory circuitry 130 into a single memory allocation slot 140A (i.e., a power of two=$2^m$, for a value of m that results in the entire system memory being covered). As depicted in another example apportionment in FIG. 1, in other embodiments, the processor circuitry 110 may apportion the system memory circuitry 130 into two memory allocation slots 140A, 140B (i.e., a power of two=$2^{m-1}$). As depicted in another example apportionment in FIG. 1, in other embodiments, the processor circuitry 110 may apportion the memory circuitry 130 into four memory allocation slots 140A-140D (i.e., a power of two=$2^{m-2}$). As depicted in another example apportionment in FIG. 1, in other embodiments, the processor circuitry may apportion the system memory circuitry 130 into "n" memory allocation slots 140A-140n (i.e., a power of two=$2^k$ for a value k that results in dividing the system memory into "n" memory allocations). Importantly, note that the mid-point 142A-142n in each of the memory allocation slots 140 does not align with the mid-point in other memory allocations, thereby permitting the storage of bounds information and tag data in metadata regions 150A-150n, where the bounds information and tag data is unique to the respective memory allocation slot 140A-140n. In embodiments, the tag data in the metadata regions 150A-150n may include any number of bits. For example, the tag data may include 4-bits or more, 6-bits or more; 8-bits or more, 16-bits or more, or 32-bits or more. Also, the upper and lower bounds information stored in the metadata regions 150A-150n may include any number of bits and the metadata regions 150A-150n may be sized accordingly to accommodate both tag data and the upper and lower bounds information.

Although the description herein describes metadata regions 150A-150n in each of the memory allocation slots 140A-140n as containing bounds information along with tag data, in other embodiments, other types of metadata may be stored in metadata regions 150A-150n instead of, or in addition to the tag data. In some embodiments, other metadata may include but is not limited to: permission bits, a compartment identifier (ID), privilege level, accessed and/or dirty bits, identifier for code authorized to access the data such as a hash value, a message authentication code, key, Key Identifier (keyID), tweak value or IV/counter value used by the processor circuitry 110 to encrypt/decrypt data (and/or other metadata) within the respective memory allocation slot 140. For example, a keyID stored as metadata may be used to select a memory encryption key used to encrypt the data within the bounded allocation using AES (Advanced Encryption Standard) XTS (XEX-based tweaked-codebook mode with ciphertext stealing) mode (or equivalent) using the memory address for the current data load/store operation and/or tag metadata as a tweak. In some embodiments, other metadata may include but is not limited to: an aggregate cryptographic MAC value, Integrity-Check Value (ICV), or ECC code for the data allocation. In such embodiments, the other metadata can be used to detect data corruption and may be used for correction of random bit errors. For example, each time a data block is written, the old MAC value based on the previous data value of the block (and location of block) is unrolled (e.g., using an GFMUL or XOR operation) and the new stored value is rolled in (e.g. using a GFMUL or XOR operation, etc.). Although various embodiments may provide for the above-described other metadata to be stored in the metadata regions instead of, or in addition to tag data, for ease of explanation, embodiments will be described assuming that only tag data is stored in metadata regions 150A-150n along with upper and lower bounds information for each allocation.

The encoded pointer 180 includes the memory address 182 to perform a memory operation (fetch, store, etc.). The memory address 182 may include any number of bits. For example the memory address 182 may include: 8-bits or more; 16-bits or more, 32-bits or more; 48-bits or more; or 64-bits or more. In embodiments, the size data 186 carried by the encoded pointer 180 may include any number of bits. For example, the size data 186 may include 4-bits or more, 8-bits or more, 16-bits or more, or 32-bits or more. In embodiments, the tag data 184 carried by the encoded pointer 180 may include any number of bits. For example, the tag data 184 may include 4-bits or more, 8-bits or more, 16-bits or more, or 32-bits or more. In one or more embodiments, all or a portion of the address and/or tag data carried by the encoded pointer 180 may be encrypted. Additionally, in one or more embodiments, the encoded pointer or a portion thereof may be used to as input to an encryption algorithm (e.g., as a tweak to a counter mode block cipher) to encrypt data stored in the memory allocation. In embodiments, the bounds information and tag data stored in metadata regions 150A-150n may be loaded as a cache line (e.g., a 32-byte block, 64-byte block, or 128-byte block) into the processor cache circuitry 112. In such embodiments, in performing memory operations on data stored in the processor cache circuitry 112, the memory controller circuitry 120 or other logic, e.g., in processor circuitry 110 or cache circuitry 112, compares the tag data 184 with the tag data stored in the metadata region 150 in the cache line containing the requested memory address.

In some embodiments, for memory operations occurring at memory addresses before or after the memory addresses of the metadata region 150, and that do not request access to data within the metadata region, the access is performed using the encoded pointer 180 at the address indicated by memory address 182. For memory operations occurring at a memory address at the beginning of the metadata region 150 (or within the metadata region 150), the bounds data in the metadata region 150 can be used to identify the location of data that was relocated from the metadata region and stored at the end or beginning (or both) of the memory allocation to make room for the metadata (e.g., bounds information, tag, etc.) to be stored in the metadata region 150 of the memory allocation slot 140. Once the relocated data is located, it can be moved to the metadata location so that the memory access can be performed with all of the original data in its correct location within the memory allocation slot 140. In some embodiments, for memory operations occurring at memory addresses before or after the memory addresses at or within the metadata region 150, where the metadata region 150 (or a portion thereof) is to be included in a cache line to be transferred to cache in response to the memory operation, the relocated data in the metadata region may be relocated to the metadata region before the cache line is transferred to cache. Thus, subsequent accesses to the metadata region can be obtained from cache without any additional memory accesses. In other embodiments, the metadata region included in the cache line is not replaced with the relocated data prior to being transferred to cache, and subsequent accesses to the metadata region (when the cache line is in cache) can be satisfied by fetching the relocated data and replacing the metadata region in cache with the fetched relocated data before satisfying the memory access request. In this latter scenario, the relocated data may remain in main memory until it is fetched by the processor, or it may be prefetched and cached so that subsequent accesses to the metadata region can be quickly filled in from the local cache.

In some embodiments, the memory accesses are performed upon successful verification of the tag data stored in the metadata region 150 with the tag data 184 associated with the memory allocation slot 140. Thus, the presence of the tag data and the bounds information stored in the metadata region 150 is "hidden" by the processor circuitry from software having access to the metadata using the encoded pointer 180.

Figure 2:
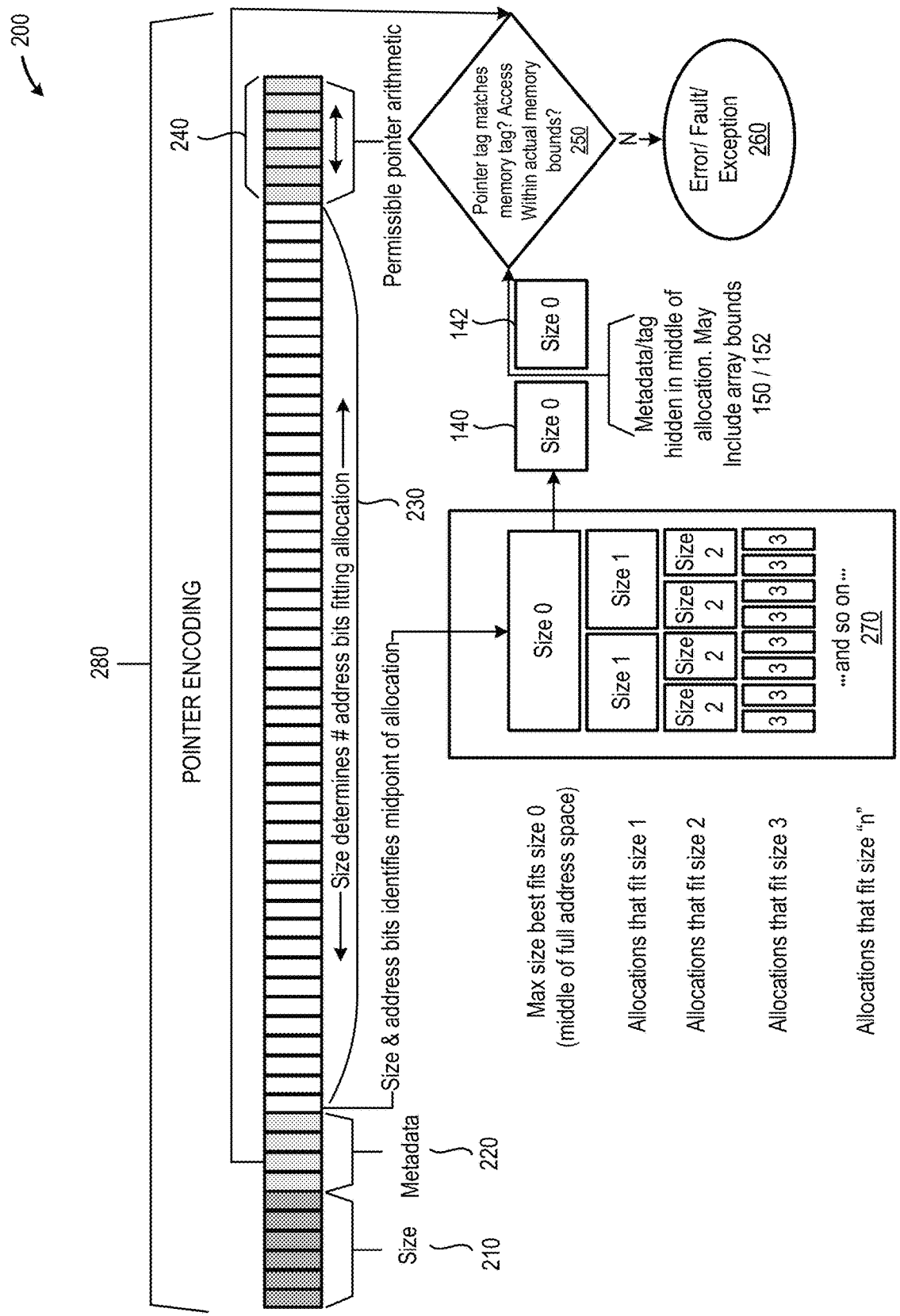
FIG. 2 is a schematic diagram of an illustrative encoded pointer architecture according to at least one embodiment.

FIG. 2 is a schematic diagram of an illustrative encoded pointer architecture 200 in which the encoded pointer 180 includes a multi-bit memory allocation power size field 210, a multi-bit optional metadata field 220 (such as a tag field), a multi-bit address field 230, and a multi-bit pointer arithmetic field 240. As depicted in FIG. 2, the encoded pointer 180 may include any size pointer, such as, for example, a 64-bit pointer, or a 128-bit pointer, or a pointer that is larger than 128-bits. The encoded pointer, in one embodiment, may include an x86 architecture 64-bit pointer. The encoded pointer 180 may include a greater (e.g., 128 bits, 256 bits) or lesser (e.g., 16 bits, 32 bits) number of bits. In embodiments, the number of bits used in the address field 230 may be based on the size of the respective memory allocation slot 140 as expressed in the power size field 210. For example, in general, a larger memory allocation ($2^0$) requires a lesser number of address bits than a smaller memory allocation ($2^1$ to $2^n$). The address field 230 may include any number of bits. For example, the address field 230 may accommodate memory addresses having: 8-bits or more; 16-bits or more, 32-bits or more; 48-bits or more; or 64-bits or more.

A graphical representation of a memory circuitry 270 (which may be similar to memory circuitry 130 of FIG. 1) illustrates possible memory slots to which memory allocations for various encodings in the power size field 210 of encoded pointer 280 can be assigned. Each address space portion of memory, covered by a given value of the bits in address field 230, contains a certain number of allocation slots (e.g., one Size 0 slot, two Size 1 slots, four Size 2 slots, etc.) depending on the power size field 210.

Referring still to FIG. 2, the power size field 210, in combination with the information in the address field 230, will allow the processor to find the mid-point of a given slot. The specific address bits in the address field 230 are determined by the size indicated in the power size field. In one example of a power of two scheme, the value in the power size field determines the number of bits in the pointer arithmetic field 240, and the number of bits in address field 230 can be adjusted accordingly. Thus, for a power of two scheme, where the power size field includes size exponent information, as the size exponent becomes larger (for larger slots), fewer address bits are needed to identify a particular slot (since with larger slots, there will be fewer slots to identify). In such a case, more of the bits at the end of the pointer, in the pointer arithmetic field 240, can be used to range within a given slot. The latter leads to a shrinking of the address field. This compact power encoding enables constant-time lookups of non-duplicated metadata, and the encoding scales to the full linear/virtual address space.

As noted previously, use of metadata field 220 and of tag data therein is optional. Tag data in a pointer allows multiple versions of a pointer to be used pointing to the same slot, while still ensuring that the pointer version being used to access the slot is in fact the pointer with the right to access that slot. The use of tag data can be useful for mitigating UAF attacks for example. Where a dangling pointer is involved, but where tag data is used, changing tags with each version of the pointer would result in a mismatch with an allocation sought to be accessed by a dangling pointer, leading to errors and thus protecting the new allocation from unauthorized access by the dangling pointer.

In embodiments, the power size field 210 may include any number of bits. For example, the size data may include: 2-bits or more; 4-bits or more; 6-bits or more; or 8-bits or more. The power size field 210 provides an indication of the size of the memory allocation slot 140. The metadata field 220, when present (it is to be noted that a tag field is optional according to an embodiment but other metadata may be present) may include any number of bits. For example, the power size field 210 may include: 4-bits or more, 6-bits or more; 8-bits or more, 16-bits or more, or 32-bits or more. The encoded pointer 280 also includes a pointer arithmetic field 240. The pointer arithmetic field 240 may include any number of bits. For example, the pointer arithmetic field 240 may include: 4-bits or more, 6-bits or more; 8-bits or more, 16-bits or more, or 32-bits or more.

As depicted in FIG. 2, in one example, upon execution of an instruction that includes a memory operation, at 250, the processor circuitry 110 and/or the memory controller circuitry 120 compares the metadata (such as tag data 184) included in the metadata field 220 with the metadata stored in the metadata region 150 of the memory allocation slot 140. If the metadata (e.g., tag data 184) included in the metadata field 220 matches the metadata stored in the metadata region 150 of the memory allocation slot 140, the processor circuitry 110 and/or the memory controller circuitry 120 completes the requested memory operation in the system memory circuitry 130. If the metadata (e.g., tag data 184) included in the metadata field 220 fails to match the metadata stored in the metadata region 150 of the memory allocation slot 140, the memory controller circuitry 120 reports an error, fault, or exception 260 to the processor circuitry 110. Bounds metadata may also be included in metadata region 150. In some embodiments, the memory controller circuitry 120 may also check, at 250, whether the memory access is within the specified bounds and allow access if the memory access is within the specified bounds and deny access if the memory access is outside the specified bounds. The bounds information may include coordinates of a memory allocation—e.g., offset and array size, or actual allocation size to the left and allocation size to the right of a slot mid-point, or any other information that indicates the actual beginning and end of the allocation.

Figure 3:
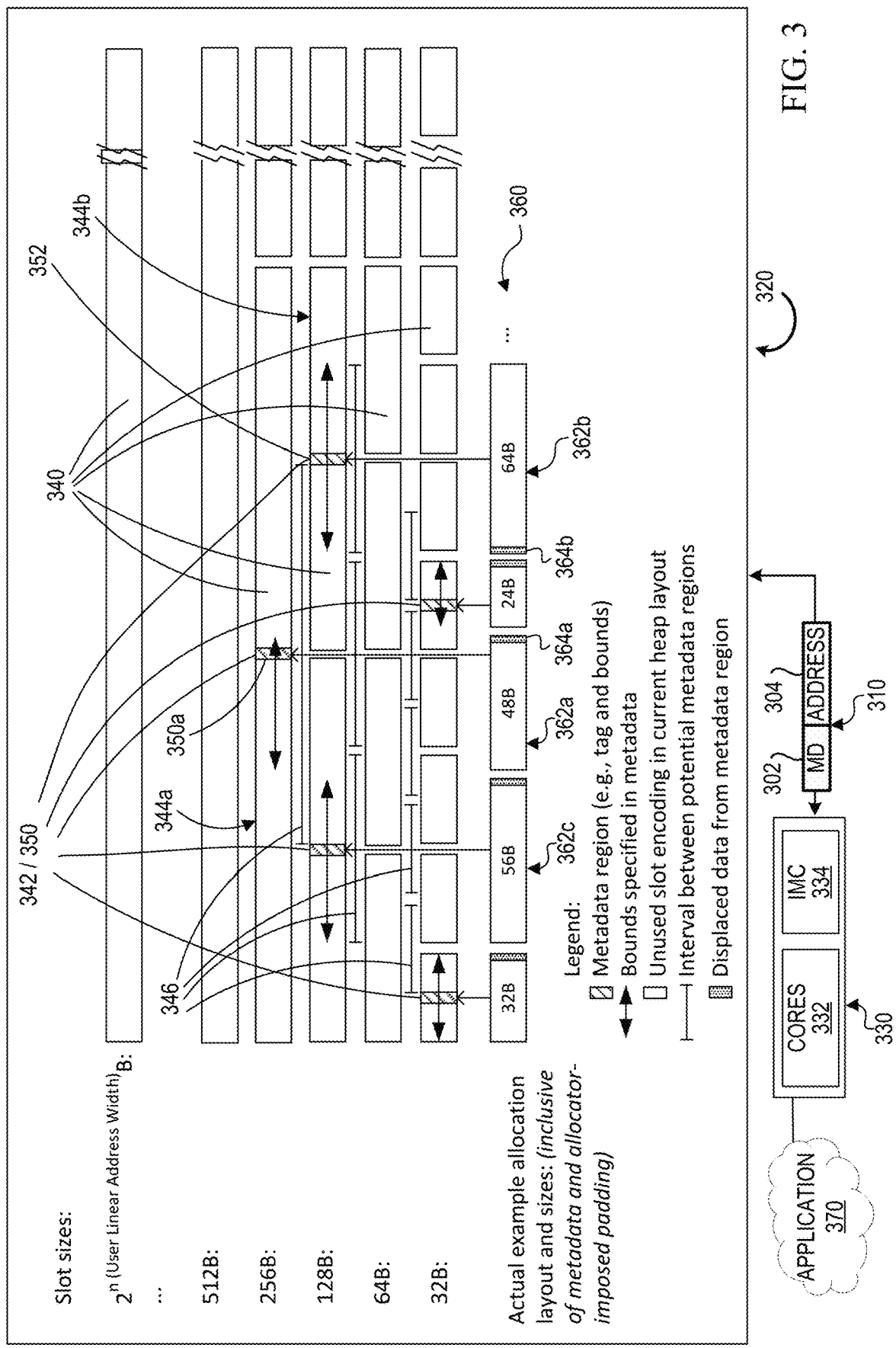
FIG. 3 is a schematic illustration of a memory allocation and access system with data relocation for inline metadata according to an embodiment.

FIG. 3 is a schematic diagram of an illustrative memory/cache 320 (e.g., similar to memory circuitry 130 and/or 270) to allow data relocation for inline metadata in memory allocations accessed by an encoded pointer 310 (e.g., similar to encoded pointers 180, 280). The schematic diagram also shows processor circuitry 330 (e.g., similar to processor circuitry 110) including cores 332 and memory controller circuitry 334 (e.g., memory controller (MC), integrated memory controller (IMC), memory management unit (MMU)), which are communicatively coupled to memory/cache 320. Although embodiments are not so limited, in the shown embodiment of FIG. 3 the memory/cache 320 may be apportioned into one or more power of two (i.e., $2^0$ to $2^n$) slots 340 in which the respective mid-point address at the mid-point 342 includes at least a portion of respective metadata regions 350 that are associated with respective memory allocations 360 within slots 340, in accordance with at least one embodiment described herein. Uniform intervals 346 are defined between potential metadata regions in consecutive power-of-two slots. Additionally, "allocation" and "memory allocation" are intended to refer to an addressable portion of memory in which an object, such as data or code, is stored. As used herein, "slot" is intended to refer to a unit of memory in a cache line.

In some embodiments, an instruction that causes the processor circuitry 330 to allocate memory causes encoded pointer 310 to be generated. The encoded pointer may include at least data representative of the linear address associated with the targeted memory allocation 360 and metadata 302 (such as a power of two encoding of the allocation size in power size field 210 and optionally tag data in metadata field 220) associated with the respective memory allocation 360 corresponding to memory address 304. Also, an instruction that causes the processor circuitry 330 to perform a memory operation (e.g., LOAD, MOV) that targets a particular memory allocation (e.g., 64B memory allocation 368) causes the memory controller circuitry 334 to access that memory allocation, which is assigned to a particular slot (e.g., 128B slot 354) in memory/ cache 320 using the encoded pointer 310.

In the embodiments of the memory/cache 320 of FIG. 3, each memory allocation 360 is fully assigned to a given slot (i.e., one memory allocation per slot and one slot per memory allocation), in this way ensuring that the metadata region 350 at the mid-point of a slot can be easily associated with the memory allocation to which it pertains. Embodiments, however, are not so limited, and include within their scope the provision of at least some metadata (e.g., upper and lower bounds information, tag data) within a slot that includes none, some, or all of the memory allocation to which the metadata pertains. The memory allocations 360 are shown in FIG. 3 once at the bottom of the figure and represented correspondingly by double pointed arrows within the respective slots 340 to which the memory allocations are assigned. Even though the memory allocations 360 may be assigned to slots larger than the allocations themselves, the allocations may, according to one embodiment, not need padding in order to be placed within the larger slots.

According to some embodiments, a memory allocation may be assigned to a slot that most tightly fits the allocation, given the set of available slots and allocations. In the shown embodiment of FIG. 3, for example, the 32B allocation is assigned to a 32B slot, the 56B allocation to a 128B slot, the 48B allocation to a 256B slot, the 24B allocation to a 32B slot and the 64B allocation to a 128B slot. For illustration purposes, the 48B allocation and the 64B allocation are specifically referenced at 362 and 368, respectively, and are assigned to slots that are specifically referenced at 344a and 344b, respectively. In the shown example of FIG. 3, because the 56B allocation would have crossed an alignment boundary within two slots, it is assigned to the larger 128B slot. Although the example of FIG. 3 shows the memory allocations as spanning through the slots in a contiguous fashion (tightly packed), clearly, embodiments are not so limited, and include within their scope a scheme of memory allocations to respective, dedicated memory slots as long as a mid-point address of the slot is crossed by the allocation, where some slots may be free, especially for example in UAF scenario where a dangling pointer is involved. According to some embodiments, memory allocation sizes may be no smaller than half the width of a smallest slot in order for them to cross (i.e., to at least partially cover) the mid-point when assigned to a slot. Additionally, it is noted that each allocation is free to span possible metadata regions for smaller powers. Those possible metadata regions can simply store the allocation's data. As shown in FIG. 3 for example, the 56B allocation 362c (which is assigned to 128B-aligned slot) spans possible metadata regions in two 32B-aligned slots.

Based on the above allocation scheme, where each memory allocation is uniquely assigned to a dedicated slot, and crosses the slot mid-point, the metadata region 350 may be located at the mid-point address of the slot so that the processor is able to find the metadata region for a particular slot quickly and it is ensured to be at least partially contained within the memory allocation that is assigned to that particular slot, without having to go to a separate table or memory location to determine the metadata. The metadata region 350 for an allocation is efficiently addressed in terms of a power-of-two metadata spacing that is specified as an exponent in a power size field (e.g., 210) in an encoded pointer and that combines with the upper address bits in that pointer to locate the metadata in constant time. The metadata region assignment effectively results in each allocation being assigned to a naturally-aligned power-of-two allocation slot with the metadata at the mid-point of the slot. Thus, the size of the slot matches the metadata spacing specified by the value of the power field in the pointer. Furthermore, each allocation should be assigned the one unique metadata region with the highest power that is included in the allocation. However, the allocation does not itself need to be padded to fill the logical power-of-two slot. Spaced locations not used as metadata storage can instead store data.

One possible formula for computing the slot mid-point location where the metadata is stored can be expressed in a Verilog-like format as follows:

$$\{\text{SignExt}(\text{Pointer}[47:\text{Power}], 64-\text{Power}), 1'b1, (\text{Power}-1)'b0\}$$

where SignExt(x,y) sign extends x to y bits. The power for each allocation can be determined as follows:

$$\text{minPower such that AllocLimit} \leq \{\text{AllocBase}[63:\text{Power}], \text{Power}'b1\}$$

In this expression of minimum power, AllocBase is the address of the first byte of the allocation, AllocLimit is the address of the uppermost byte of the allocation, and the final term is sign-extended to have a bitwidth of Power and to be all ones. Note that the Power value is determined by both the size and the location of the allocation, i.e., based on which naturally-aligned power-of-two boundaries it crosses. The allocator can initialize the power field in each pointer according to this formula. In one example implementation, the initialization can be performed with assistance from a specialized instruction.

Any allocation that is at least half the minimum metadata spacing (power) has a unique metadata location that is inline or adjacent to the allocation data and is able to encode bounds covering the entire allocation. In the example of FIG. 3, a minimum metadata spacing that accommodates the minimum chunk size of a memory allocator (e.g., glibc) is 32B. This results in a minimum data size per chunk of 24B excluding an 8B chunk header. In one or more embodiments, the bounds cover the data region, but not the header region. This helps to mitigate chunk header corruption.

Metadata regions 350 are defined such that metadata can be deterministically stored inline with any possible allocation and can specify a tag (optionally) and bounds for that allocation. Every allocation has a unique association with a single metadata instance that can be located in constant time based on the encoded pointer (e.g., 180, 280, 310) for that allocation. The length of data preceding a metadata region of an allocation may differ from the length of data following the metadata region. Additionally, each allocation is free to span possible metadata storage locations for smaller powers. Those locations can simply store the allocation's data.

Current approaches sometimes put the metadata before each allocation, typically in a non-power-of-two scheme, and within each pointer, specify a distance of the pointer address from the beginning of the allocation. However, the pointer has a limited number of bits, and the need to specify the latter distance may overrun the extent of the pointer where the distance is larger than what the pointer can accommodate, that is, where an allocation is larger than one that the bits in the pointer can accommodate. The power-of-two (Po2) approach, used according to one or more embodiments, allows a unique mapping of each memory allocation to a Po2 slot, where the slot is used to provide the possibility to uniquely encode and encrypt each object stored in the memory allocations. According to some embodiments, metadata (e.g., upper and lower bounds information, tag data) in metadata regions 350 may be encrypted in addition to, or instead of, encrypting the object (e.g., data) in the memory allocation.

To overcome the problem of too long of a distance/offset from the beginning of an allocation as noted above, instead, some embodiments merely specify, in the power size field of the pointer, the size of the slot, such as the Po2 size of the slot as a size exponent in the power size field of the pointer, that the object to be addressed fits into. The size determines the specific address bits to be referred to by the processor in order to determine the slot being referred to. Having identified the specific slot, the processor can go directly to the address of the metadata region of the identified slot in order to write metadata (e.g., upper and lower bounds information, tag data) in the metadata region (e.g., during memory allocation operations) or read out the current data at the metadata region (e.g., during memory access operations). Embodiments are, however, not limited to Po2 schemes for the slots, and may include a scheme where the availability of slots of successively increasing sizes may be based on a power of an integer other than two, or based on any other scheme.

Bounds information stored as part of metadata in metadata regions 350, where the metadata region is known to cross the mid-point, may be expressed as the lower bound (LB) and upper bound (UB) with the mid-point as the point of reference for the LB and UB. Each metadata instance can specify bounds up to half the specified metadata spacing in either direction. Bounds can be used regardless of the size of the slot and in order to allow, among other things, a detection of buffer overflow. For example, bounds information and non-repeating tags can be used to provide deterministic checking for adjacent overflows and probabilistic checking for non-adjacent overflows and use after free (UAF). Advantageously, because the bounds information in the shown embodiment is stored in with the object in a slot (although embodiments are not so limited), it can be, at substantially the same time as the object itself, made available to the processor, in this manner making memory operations more efficient than those of the prior art. Bounds information, according to some embodiments, allow a determination of the location of the allocation based on known mid-point reference and without the need to take up a large number of bits in the pointer where the slot and/or the allocation itself are large, especially where the number of bits in the pointer may not be sufficient to support a distance of the pointer value from the beginning of the allocation. A Po2 scheme as shown by way of example in FIG. 3 provides a compact encoding scheme where, every time a value is added in the size exponent field of the pointer, the slot size being referenced is doubled, instead of a linear scaling as afforded by the provision of distance information from a pointer value to the beginning of a referred to object. Thus, a limited power size field can, in a Pot scheme can be used to designate much larger slot sizes and objects as schemes of the prior art.

Although the memory controller circuitry 334 is depicted in FIG. 3 as a separate box from the cores 332, the cores 332 may include all or a portion of the memory controller circuitry 334. Also, although the memory controller circuitry 334 is depicted in FIG. 3 as part of processor circuitry 330, in some embodiments, the processor circuitry 330 may include all, a portion, or none of the memory controller circuitry 334.

In response to execution of a memory access instruction, the processor circuitry 330 uses an encoded pointer 310 that includes at least data representative of the memory address 304 involved in the operation. Optionally in some embodiments, the encoded pointer 310 may also include data representative of the metadata 302, such as size, associated with the memory allocation 360 corresponding to the memory address 304. The encoded pointer 310 may include additional information, such as data representative of a tag or version of the memory allocation 360 and pointer arithmetic bits (e.g., 240) to identify the particular address being accessed within the memory allocation.

In embodiments described herein, a metadata region at the mid-point of a slot to which a memory allocation is assigned is sized to accommodate the upper and lower bounds information of the memory allocation. In some embodiments, a metadata region is sized to also store other metadata such as, for example, tag data. The metadata 302 carried in encoded pointer 310 may be compared with metadata stored in the metadata region 350 at the slot mid-point 342 to which the memory allocation 360 is assigned. The core 332 may further perform bounds checks and potentially other checks using the metadata stored at the slot mid-point. If the metadata 302 carried by the encoded pointer 310 (e.g., such as tag data) matches the metadata stored in the metadata region 350 at the slot mid-point 342 of the slot 340, and further if bounds checks comparing the memory address 304 against the bounds information match, the core 332 completes the requested operation. If the metadata 302 carried by the encoded pointer 310 fails to match the metadata stored in the metadata region 350 at the slot mid-point 342 of slot 340, and/or if bounds checks on the address check fails to return a match, the core 332 returns an exception to the processor circuitry 330.

The memory/cache 320 may include any number and/or combination of electrical components, semiconductor devices, optical storage devices, quantum storage devices, molecular storage devices, atomic storage devices, and/or logic elements capable of storing information and/or data. All or a portion of the memory/cache 320 may include transitory memory circuitry, such as RAM, DRAM, SRAM, or similar. All or a portion of the memory/cache 320 may include non-transitory memory circuitry, such as: optical storage media; magnetic storage media; NAND memory; and similar. The memory/cache 320 may include one or more storage devices having any storage capacity. For example, the memory/cache 320 may include one or more storage devices having a storage capacity of about: 512 kiloBytes or greater; 1 megaByte (MB) or greater; 100 MB or greater; 1 gigaByte (GB) or greater; 100 GB or greater; 1 teraByte (TB) or greater; or about 100 TB or greater.

In the shown embodiment of FIG. 3, the IMC 334 apportions the memory/cache 320 into any power of two number of slots 340. In some embodiments, the IMC 334 may apportion the memory/cache 320 into a single memory slot 340 (i.e., a power of two=$2^m$, for a value of m that results in the entire system memory being covered). In other embodiments, the IMC 334 may apportion the memory/cache 320 into two memory slots 340 (i.e., a power of two=$2^{m-1}$). In other embodiments, the IMC 334 may apportion the memory/cache 320 into four memory slots 340 (i.e., a power of two=$2^{m-2}$). In other embodiments, the IMC 334 may apportion the memory/cache 320 into "n" memory slots 340 (i.e., a power of two=$2^k$ for a value k that results in dividing the memory space into "n" slots). Importantly, note that the mid-point address 342 in each of the memory slots 340 does not align with the mid-point address in other memory slots, thereby permitting the storage of metadata (in a metadata region 350) that is unique to the respective memory slot 340s. In some embodiments, the metadata (which includes upper and lower bounds information and optionally other metadata) may include any number of bits. For example, the metadata may include 2 bits or more, 4-bits or more, 6-bits or more; 8-bits or more, 16-bits or more, or 32-bits or more.

The encoded pointer 310 is created for one of the memory allocations 360 (e.g., 32B allocation, 56B allocation, 48B allocation, 24B allocation, or 64B allocation) and includes memory address 304 for an address within the memory range of that memory allocation. When memory is initially allocated, the memory address may point to the lower bounds of the memory allocation. The memory address may be adjusted during execution of the application 370 using pointer arithmetic to reference a desired memory address within the memory allocation to perform a memory operation (fetch, store, etc.). The memory address 304 may include any number of bits. For example, the memory address 304 may include: 8-bits or more; 16-bits or more, 32-bits or more; 48-bits or more; or 64-bits or more; 128-bits or more; 256-bits or more, 512-bits for more, up to 2 to the power of the linear address width for the current operating mode, e.g., the user linear address width-bits in terms of slot sizes being addressed. In embodiments, the metadata 302 carried by the encoded pointer 310 may include any number of bits. For example, the metadata 302 may include 4-bits or more, 8-bits or more, 16-bits or more, or 32-bits or more. In embodiments, all or a portion of the address and/or tag data (which may or may not be included depending on the embodiment) carried by the encoded pointer 310 may be encrypted.

In embodiments, the contents of metadata regions 350 may be loaded as a cache line (e.g., a 32-byte block, 64-byte block, or 128-byte block, 256-byte block or more, 512-byte block, or a block size equal to a power of two-bytes) into the cache of processor circuitry 330. In performing memory operations on contents of a metadata region stored in the cache of processor circuitry 330, the memory controller circuitry 334 or other logic, e.g., in processor circuitry 330, can decrypt the contents (if the contents were stored in an encrypted form), compare the appropriate pointer metadata (e.g., tag data if used) with the corresponding contents from the metadata region 350 stored on the cache line containing the requested memory address. If a match is determined, then the appropriate bounds information (i.e., upper bounds information or lower bounds information) in the metadata region 350 can be used to determine a memory address where the original data from the metadata region was stored (relocated) to allow the inline metadata (e.g., bounds information and optionally other metadata) to be stored in the metadata region of the memory allocation. The relocated original data can be decrypted and loaded into a register from the appropriate place corresponding to the location of the metadata region of the memory allocation.

Figure 4:
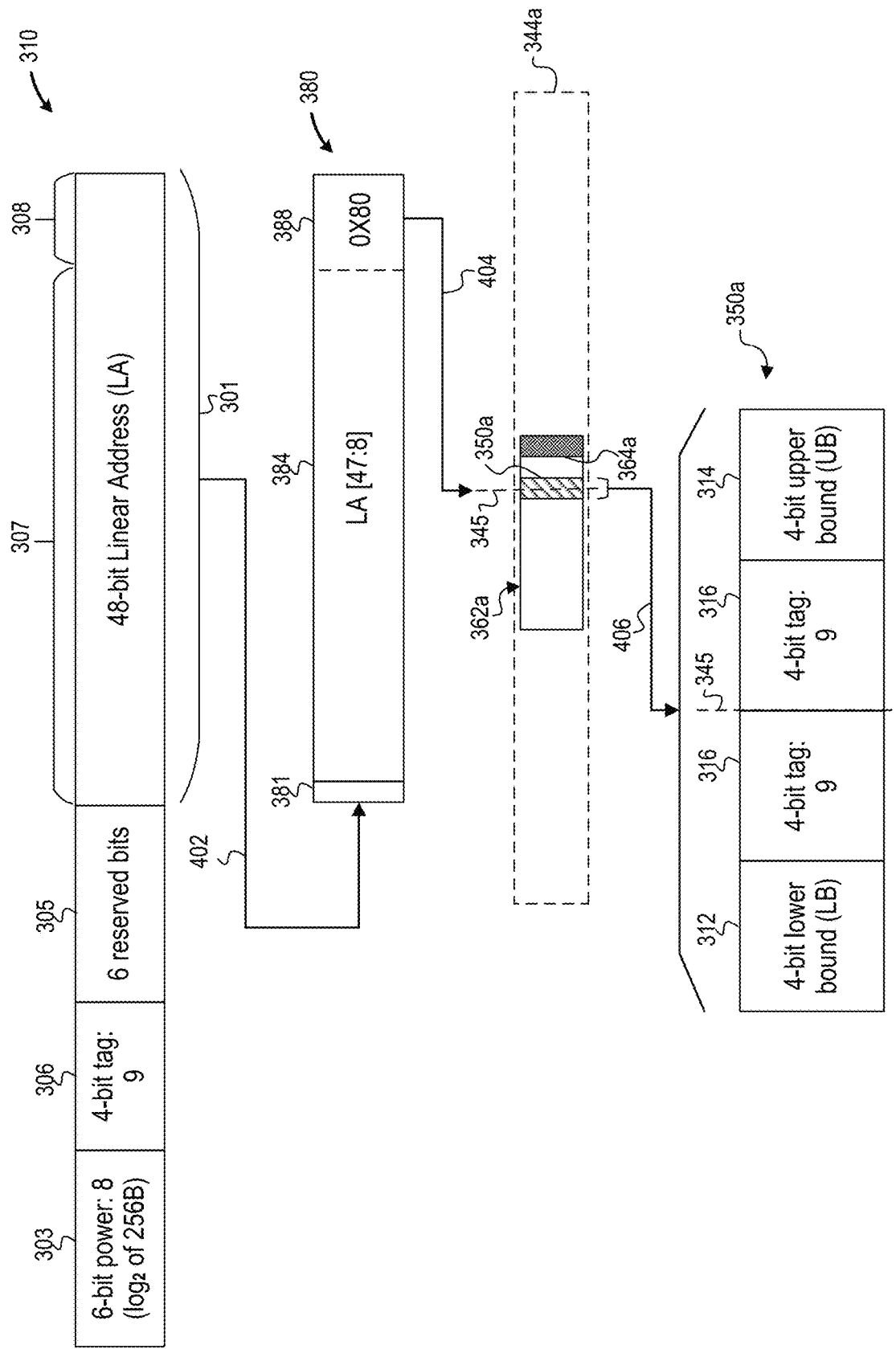
FIG. 4 is a simplified block diagram illustrating an example pointer encoding and metadata for a memory allocation according to an embodiment.

FIG. 4 is a simplified block diagram illustrating an example pointer encoding and metadata for an allocation according to one or more embodiments. For illustration purposes, FIG. 4 depicts example details of encoded pointer 310 and metadata region 350a for the example 48B allocation 362a assigned to the 256B-aligned slot 344a (also shown in FIG. 3). Encoded pointer 310 includes power size field 303 having 6-bits, a tag field 306 having 4-bits, a reserved field 305 having 6-bits, and a linear address (LA) field 301 having 48-bits. In one example, power size field 303 and tag field 306 correspond to metadata 302 in FIG. 3, and the linear address field 301 corresponds to memory address 304. The linear address field 301 includes a pointer arithmetic field 308, which could range within the 256B-aligned slot 344a, but is subject to tag and bounds checks against metadata to stay within the 48B allocation 362a. The linear address field 301 also includes immutable address bits 307 that are constant across the entire allocation slot.

At 402, a processor can use encoded pointer 310 to generate a mid-point address 380 to locate metadata region 350a for the 48B allocation 362a. In an embodiment, the least significant bits (LSBs) of the 48-bit LA in the LA field 301 can be modified to generate mid-point address 380 for the slot mid-point 345. The LSBs in the 48-bit LA in the LA field 301, shown in the pointer arithmetic field 308, can be replaced with half of the metadata spacing as indicated at 388. In this example, the metadata at slot mid-point 345 is located by substituting the number of pointer least significant bits specified by the power (i.e., 8-bits in this example) with a single set bit shifted left by power-minus-1 bits, which results in 0x80 or 128, as indicated in the least significant bits (LSBs) 388 of mid-point address 380. In some scenarios, the values of the bits in the computed linear address to the left of the most-significant bit in the LA field 301 can be computed by replicating a sign extension bit 381, to the left of a 47-bit LA portion 384 that includes the replaced LSBs 388.

At 404, an address of metadata region 350a of the 48B allocation 362a may be determined by the processor. In some cases, the size of the metadata and the mid-point address 380 of slot mid-point 345 can be used to determine the address of the metadata region 350a. In one or more embodiments, data that is located in the metadata region 350a of allocation 362a is displaced by metadata and moved to the beginning of the allocation, the end of the allocation, or to another area in memory. In this example, displaced data 364a is moved to the end of allocation 362a. It should be noted that, in some embodiments, a requested allocation size for allocation 362a could have been expanded to the resulting allocation size of 48B in order to accommodate the additional bytes of metadata stored inline at metadata region 350a, and to allow room to store the displaced data 354a at one of the ends of the allocation. In other embodiments, the requested allocation size of allocation 362a could have been 48B and the data that was displaced by inline metadata in the allocation could have been stored in memory outside the allocation.

At 406, metadata region 350a is expanded to show one possible configuration for a 48B allocation (which may be expanded from an originally requested allocation size in some embodiments to allow storing displaced data at one of the ends of the allocation). Metadata stored in metadata region 350a includes a 4-bit lower bound (LB) 312 of the allocation, a 4-bit upper bound (UB) 314 of the allocation, and a 4-bit tag 316 on the left side of the slot mid-point 345 and replicated on the right side of the slot mid-point 345. The 4-bit tag 316 in metadata region 350a corresponds to the 4-bit tag field 306 in the encoded pointer 310.

Figure 5:
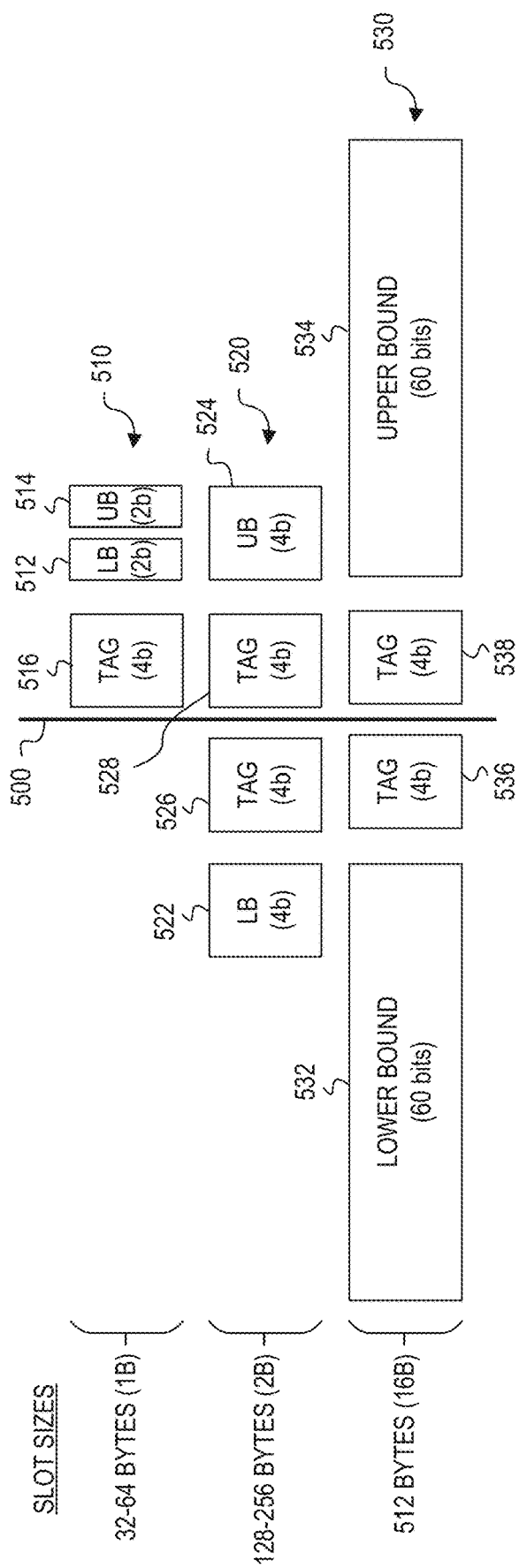
FIG. 5 is a block diagram representing possible metadata formats and storage locations for various slot sizes shown in FIG. 3 according to an embodiment.

FIG. 5 is a block diagram representing possible metadata formats and storage locations for various slot sizes shown in FIG. 3. In at least one embodiment, bounds storage may be sized to accommodate the maximal bounds for the corresponding range of slot sizes. For slots no larger than a 64-byte cacheline, all data as well as metadata 510 can fit within a single cacheline. For example, a tag 516 having 4 bits, a lower bound 512 having 2 bits, and an upper bound 514 having 2 bits can be placed on one side of a slot mid-point 500. For larger slots, a lower bound, such as LB 522 for 128B-256B slots and LB 532 for 512B slots, can be stored below the slot mid-point 500, and an upper bound, such as UB 524 for 128B-256B slots and UB 534 for 512B slots, can be stored above the slot mid-point 500. A copy of the tag in the encoded pointer (e.g., 4 bits) can be placed on each side of the slot mid-point as shown by tags 526 and 528 of metadata 520 in a slot size of 128-256 bytes, and tags 536 and 538 of metadata 538 in a slot size of 512 bytes. It should be noted that, although FIG. 5 shows tags having 4-bit values, other tag sizes could also be used in one or more embodiments.

In at least one embodiment, the metadata can be split on each side of the slot mid-point 500 for larger slots so that the processor only needs to access the metadata portion on the same side(s) of the mid-point as the requested data. In this embodiment, at most one additional cacheline access is performed to load metadata. Additionally, memory accesses that are no further than 64 bytes from the mid-point load metadata from the same cacheline(s) as the data. This can apply at page granularity as well to minimize page accesses.

In one or more embodiments, bounds may be expressed in 8-byte granules to match existing hardware configurations and to provide a compact bounds encoding. It should be apparent, however, that granularities of other sizes are possible, even a granularity down to a single byte. The bounds can represent distances from the slot mid-point, and bounded ranges for allocations do not overlap. Thus, even if an allocation does not entirely fill its 8B-aligned bounds, any overflows within those bounds do not disclose or corrupt information in other allocations. The stored bounds can be incremented to compute the actual distances from the mid-point. In some embodiments, the bounds may encompass both the data and metadata.

Note that it is possible to specify an upper bound that does not extend any further than the metadata itself for certain combinations of metadata formats and bounds granularities. That indicates there is no data displaced by the metadata, i.e. the metadata trails all of the data in the allocation. It is also possible to express a bound permitting access to an amount of data past the end of the metadata that is smaller than the metadata itself. That indicates that the specified smaller amount of data is displaced by the metadata. A corollary is that the bounds checks may be performed after redirecting accesses to the relocation region in some embodiments that include all data and metadata in the bounds. Otherwise, an invalid access to a missing relocation region or portion of a relocation region could go undetected in such embodiments.

It should be noted that storing a single copy of bounds metadata efficiently enables fine-grained bounds.

Although slots shown and described herein range from 32 bytes to 512 bytes, other slot sizes are also possible. For example, smaller slots could be implemented and could be optimized such that a single byte of metadata between a 15-byte slot and a 16-byte slot can fit the tags for both slots. Bounds could be omitted so that the metadata could fit within a single byte. Slots of those sizes could be paired and the pair aligned to a 32-byte boundary.

Figure 6:
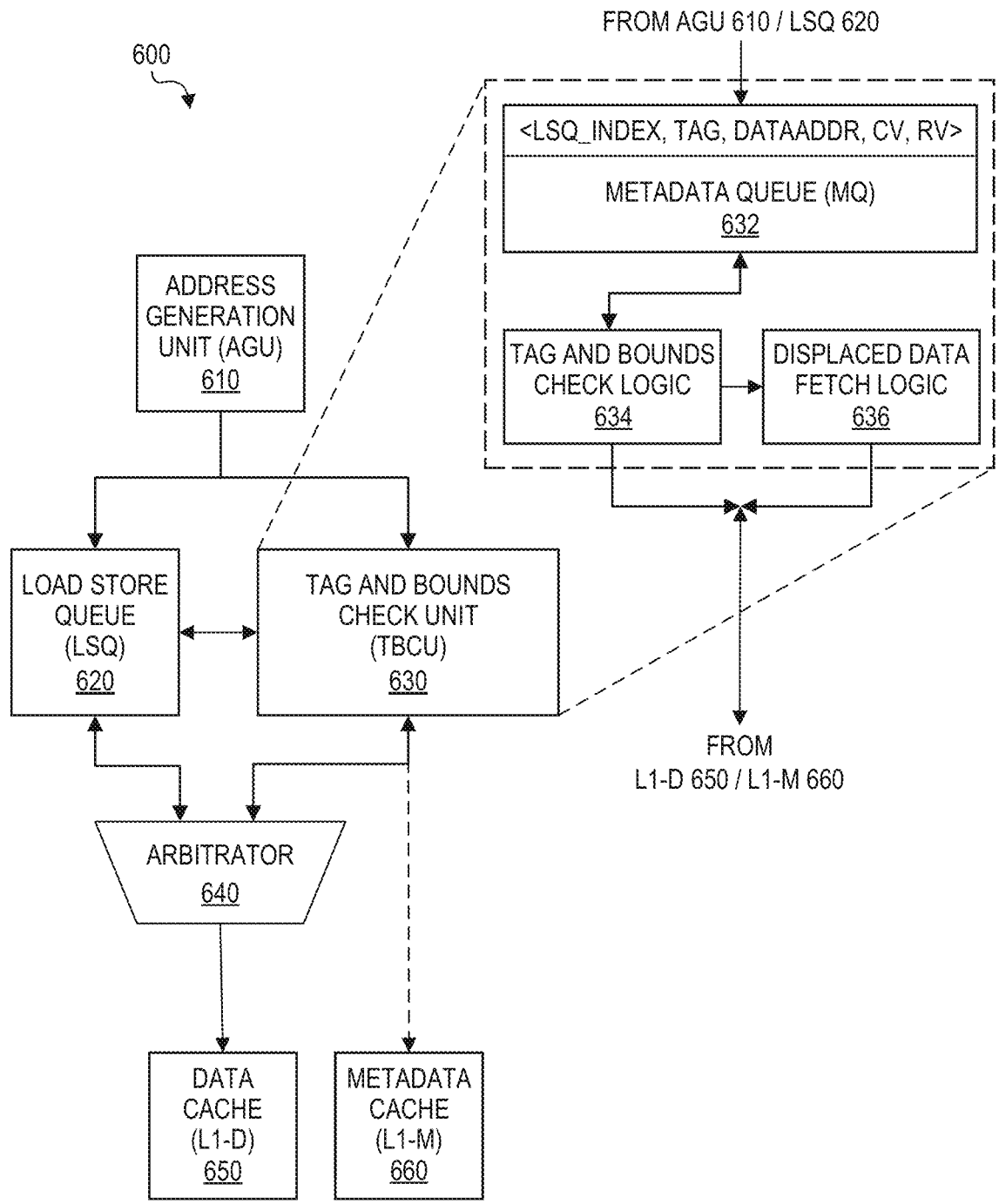
FIG. 6 is a block diagram of example microarchitectural components of a system for performing security checks for memory allocations according to an embodiment.

Turning to FIG. 6, FIG. 6 is a block diagram of a system 600 illustrating microarchitectural components involved in linear inline metadata addressing and checks in one or more embodiments. System 600 may be configured as a memory subsystem or a part thereof to perform address generation and metadata fetch and verification. System 600 can include an address generation unit (AGU) 610, a load/store queue (LSQ) 620, a tag & bounds check unit (TBCU) 630, and arbitrator 640, a data cache (L1-D) 650, and a metadata cache (L1-M) 660. TBCU 630 can comprise a metadata queue (MQ) 632, a tag and bounds logic check 634, and displaced data fetch logic 636. One or more of the microarchitectural components of FIG. 6 may be included in processor circuitry (e.g., 110, 330) and/or memory controller circuitry (e.g., 120, 334).

In one or more embodiments, in addition to being configured to generate linear addresses of objects (or selected bytes of objects) being accessed, AGU 610 can be configured to generate linear addresses of displaced data from the objects for accesses that overlap the metadata. AGU 610 can also be configured to generate linear metadata addresses for inline metadata and to direct the linear metadata addresses to TBCU 630. TBCU 630 can be configured to load and check the metadata. This may include going through the translation lookaside buffers (TLBs) or page walkers (if needed) for translations of linear to physical metadata addresses. In one possible optimization, if the metadata access is to the same page as the data access because the metadata and data are on the same page, then the address translation for the metadata can be skipped and translation from the data access can be reused. Skipping the translation of the metadata increases efficiency as additional calculations for the metadata memory address are not needed. This is possible when using linear inline metadata where the metadata is placed near or co-located with the data.

The TBCU metadata queue 632 can receive information from AGU 610 and LSQ 620 related to demand loads/stores (e.g., linear addresses of linear inline metadata, requested object or selected bytes thereof, and displaced data). An entry in TBCU metadata queue 632 can be allocated alongside a reorder buffer (ROB) allocation of an LSQ entry for the corresponding demand load/store. In at least one embodiment, each metadata queue entry can store information related to the demand load/store and tag and bounds checks. For example, each metadata queue entry can store an LSQ index, a tag, a metadata address (DATAADDR), a completed verification (CV) indicator (e.g., 1 bit), and a result verification (RV) indicator (e.g., 1 bit). The metadata address (DATAADDR) is the address of the metadata, while the LSQ index can be used to lookup the true data address from LSQ 620 and the displaced address can be generated from the true data address and metadata. A completed verification (CV) indicator may be embodied as a single bit that is not set until tag and bounds checks are complete. A result verification (RV) may be embodied as a single bit that is only set of the tag and bounds checks indicate that the corresponding demand load/store access should be permitted. At the retire stage of the pipeline, a lookup can be performed in the metadata queue 632 based on the corresponding LSQ index, and the retire stage is stalled if the CV indicator is not set (e.g., CV=0). If the CV indicator is set (e.g., CV=1), the RV indicator is checked and allows a successful commit if the RV indicator is set (e.g., RV=1). Otherwise, a tag and bounds check failure exception can be generated.

The TBCU 630 can also house the logic 636 to fetch the displaced data from the endpoint (or beginning point) of an allocation. Because the metadata displaces some mid-point data to the end (or beginning) of the allocation, any access to such displaced data is identified by the displaced data fetch logic 636 in the TBCU 630. The TBCU 630 calculates the effective endpoint address (or beginning point address) of the load/store. This process can be transparent to the LSQ 620, which stores the true address, rather than the displaced address of the displaced data for store-load forwarding. The TBCU 630 can store a mapping (e.g., in the metadata queue 632 or other suitable location) between the true address and the displaced address, and also the corresponding LSQ index for the access. In at least one embodiment, the true address can be the original address generated by AGU 610 for the access, and the displaced address can correspond to the starting byte address of the relocation region that holds all of the displaced data that overlapped with the metadata in the metadata region. In other embodiments, the displaced address could correspond to the starting byte of the displaced data being accessed from the relocation region. When the access completes with the displaced address, the TBCU updates the corresponding LSQ index with the displaced data. Thus, in at least one implementation, the displaced data and the other portions of data obtained from the memory allocation (e.g., prefix data, suffix data, or both) can be reassembled in the load store queue 620. In other implementations, TBCU 630 can reassemble the displaced data and the other portions of the data obtained from the memory allocation. It should be appreciated that determining where the displaced data is located, fetching the displaced data, and reassembling the other portions of the data (e.g., prefix data and/or suffix data) with the displaced data can be performed in any suitable hardware, software, and/or firmware of the system based on particular implementations and needs.

The arbitrator 640 can handle dynamic scheduling of demand and metadata requests before sending them to the L1 caches (e.g., data cache 650 and metadata cache 660). The L1-M cache 660 can store the linear inline metadata stored (or to be stored) in a memory allocation associated with the access request. The L1-D cache 650 can store cache lines of access requests. In at least some embodiments, the linear inline metadata of an allocation (which is co-located with the data stored or to be stored in the allocation) may also be loaded in L1-D cache, but optimally, is accessed from the L1-M cache 660, if present. Demand load/store writeback may be allowed before metadata request completion, as the metadata checks can complete any time before the retire stage of the demand load/store. This enables efficient out-of-order execution. Since dependent instructions are stalled on demand loads/stores, the arbitrator 640 can have different priority levels for demand and metadata requests. This can enable better overall performance. In one example, a suitable form of a weighted round robin may be used where regular load and stores are prioritized, but not completely at the expense of the metadata. The metadata cache 660 is optional, but can advantageously provide additional metadata storage and separate metadata read bandwidth.

In one or more embodiments, metadata cache 660 may be optimized to increase performance. In one example, a cache set in data cache 650 contains one or more data blocks (or data cache lines) and is indexed by an L1-D set index, while a cache set in metadata cache 660 contains one or more metadata blocks (or metadata cache lines) and is indexed by an L1-M set index. The L1-D set index for data cache 650 may be calculated from the lower order bits of the memory address provided by the memory access request. Using the lower order bits of a metadata memory address to calculate the L1-M set index for metadata cache 660, however, can cause performance issues. When metadata is on power-of-two addresses in linear inline metadata, the lower order bits in the metadata address can tend to be the same, which can lead to a "hot-set" problem. A hot-set problem can occur for some workloads running with linear inline metadata, where most of the metadata requests access only a few sets in the metadata cache. This leads to cache conflicts and evictions between those metadata blocks, resulting in a lower L1-M hit rate and consequently lower performance.

To mitigate the hot-set problem, the L1-M set index of metadata cache 660 for linear inline metadata can be calculated using other bits of the metadata address. In one example, the L1-M set index of metadata cache 660 can be calculated using a folded exclusive OR ("folded-XOR") operation on higher order bits of the metadata address. Generally, any bits may be selected for performing the folded-XOR operation with the original lower order bits that comprise the set index, but since the higher order bits are typically dissimilar, this can provide a more random and hence uniform L1-M set index selection when compared to using just the lower order bits. In one example, the higher order bits can be a selected number of consecutive bits and can include the most significant bit in the metadata address. In other embodiments, the higher order bits need not be consecutive. Also, in some embodiments, the higher order bits need not include the most significant bit. The number of bits to be selected for the folded-XOR operation may depend on how many bits are needed for the L1-M set index, and the number of bits needed for the L1-M set index may depend on the number of cache sets in the metadata cache.

In one nonlimiting example, the number of higher order bits selected for calculating an L1-M set index of a particular metadata cache may be double the number of bits needed for the L1-M set index of that particular cache. For example, an L1-M set index can use four bits to index a metadata cache having sixteen cache sets. In this scenario, eight higher order bits of a metadata address may be used to calculate the L1-M set index for that metadata cache. It should be apparent, however, that greater or fewer higher-order bits could be used for the folded-XOR operation based on particular implementations and needs.

Figure 7A:
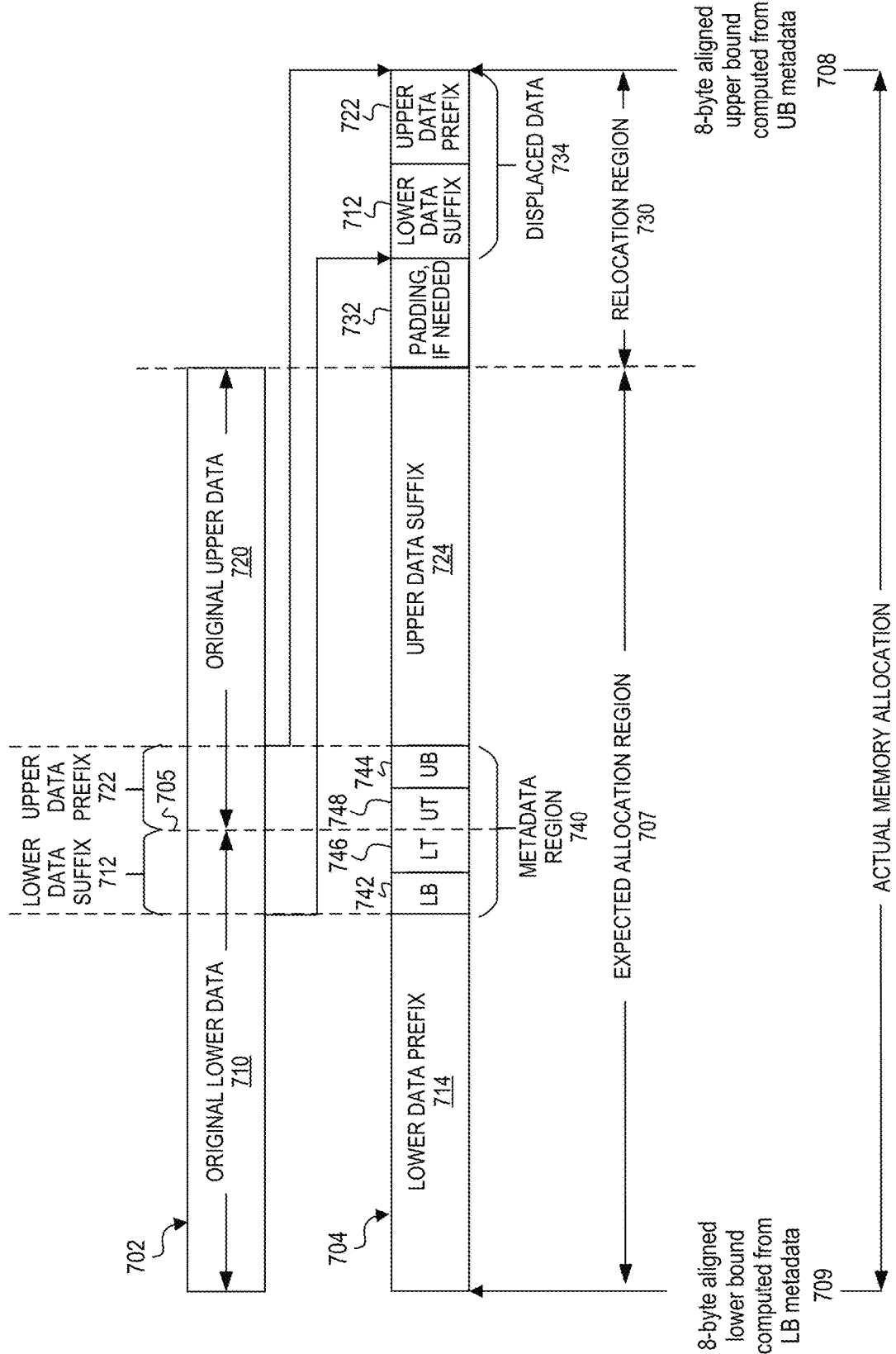
FIG. 7A illustrates a memory allocation with views of an expected format and a modified actual format according to at least one embodiment.

Referring now to FIG. 7A, FIG. 7A is an illustration of a possible embodiment of a memory allocation 700A resulting from an example memory allocation request. FIG. 7A shows a view of an expected format 702 and a view of a modified actual format 704 (also referred to herein as 'modified format' or 'actual format') of the allocation. An encoded pointer to the memory allocation 700A is generated in response to a memory allocation request from an application and provided to the application to enable memory accesses. In this embodiment, the actual memory allocation 700A comprises an expected (original) allocation region 707 and a relocation region 730. Data stored in the memory allocation 700A may be accessed by the application according to the expected format 702 for expected allocation region 707. However, the data is actually stored in the memory allocation 700A according to the modified format 704. In the modified format 704, some data is relocated from a particular region within the memory allocation 700A to an alternate region to enable inline metadata to be stored in the particular region within the actual memory allocation 700A.

The memory allocation 700A may have an 8-byte aligned lower bound 709 and an 8-byte aligned upper bound 708 and may be assigned to a slot having a power of two size and a mid-point 705. The slot may be the smallest power of two slot into which the memory allocation in the modified format 704 fits based on the particular memory address (e.g., at the lower 8-byte boundary), on the size of the memory allocation 700A (in the modified format 704), and on which slot mid-point the memory allocation 700A (in the modified format 704) crosses. It should be noted that, although the slot mid-point 705 is in the middle of the slot (not shown), the mid-point may or may not be located in the middle of memory allocation 700A (or in the middle of the expected allocation region 707), and its relative location within the memory allocation 700A depends on the lower bound address and the size of the allocation. Also, although the slot of mid-point 705 is not illustrated in FIG. 7A, it should be understood that the memory allocation 700A that is in the modified format 704 fits entirely within the slot.

It should be further noted that in an embodiment where bounds are checked prior to displacing data and the displaced data is stored outside the bounds, the placement of the relocation region 730 within memory allocation 700A may be determined based, at least in part, on where the metadata region is located in the memory allocation 700A. Specifically, the relocation region may be placed within the memory allocation to prevent the relocation region from overlapping with the metadata region. For example, if the slot mid-point of the slot assigned to memory allocation 700A is located at the end of memory allocation 700A, then the relocation region may be placed at the beginning (e.g., 8-byte lower bound 709) of the memory allocation 700A. In other embodiments that have a predetermined placement of the relocation region, selection of the slot for the memory allocation may depend on selecting a slot where the metadata region defined in the slot would be located within the expected allocation region of the actual memory allocation 700A, in addition to selecting the smallest power of two slot having sufficient size and available space to hold the entire memory allocation 700A.

In one or more embodiments, the allocation size requested in the memory allocation request for memory allocation 700A corresponds to an expected format (e.g., 702), but is increased so that more memory is allocated and a modified format (e.g., 704) can be rendered to accommodate inline metadata. Nevertheless, the application is unaware of the modified format 704 and its memory access requests are made according to the expected format 702. The expected format 702 includes original lower data 710 and original upper data 720, which are contiguous and divided by the slot mid-point 705. In the modified format 704 that accommodates inline metadata, however, some of the original lower data 710 (lower data suffix 712) and some of the original upper data 720 (upper data prefix 722) are displaced by the metadata and relocated to alternate locations in the memory allocation 700A as displaced data 734. An area around the slot mid-point 705, referred to herein as a metadata region 740 of the allocation, is sized to contain the metadata that displaces some of the original data (e.g., the lower data suffix 712 and the upper data prefix 722).

The displaced data 734 from the metadata region 740 (e.g., the lower data suffix 712 and the upper data prefix 722) can be relocated and stored at the beginning or the end of the memory allocation 700A. Alternatively, in some embodiments, the lower data suffix 712 may be stored at the beginning of the allocation and the upper data prefix 722 may be stored at the end of the allocation, or vice-versa. The portion of the memory allocation 700A to which displaced data is relocated and stored is identified as a relocation region 730 of the modified format 704. Thus, depending on where the displaced data is stored, a relocation region could be present at the beginning of the allocation, the end of the allocation (as in FIG. 7A), or at both the beginning and end of the allocation. The remaining original data in the memory allocation 700A, which may be separated by the metadata stored in metadata region 740 includes a lower data prefix 714, which is the non-displaced portion of the original lower data 710, and an upper data suffix 724, which is the non-displaced portion of the original upper data 720.

The displaced data 734, which includes the lower data suffix 712 and the upper data prefix 722, can be aligned just below an 8-byte aligned upper bound 708 of the modified format 704 of memory allocation 700A. If needed, padding 732 may be added between the end of the upper data suffix 724 (e.g., the upper bound of the expected format 702) and the displaced data 734 to ensure alignment of the displaced data 734 with the 8-byte aligned upper bound 708. In an alternative implementation, the displaced data 734 may be moved to the beginning of the modified format 704 of the memory allocation 700A. In this scenario, displaced data 734 can be aligned just above an 8-byte lower bound of the modified format 704 of the memory allocation 700A. If needed, padding may be added between the beginning of the lower data prefix 714 and the displaced data to ensure alignment of the displaced data with the 8-byte lower bound of the modified format 704 of the memory allocation 700A.

In yet other implementations, displaced data of different memory allocations within the same program could be relocated in different ways. For example, displaced data in a first memory allocation by a program could be relocated to the end of the first memory allocation, displaced data in a second memory allocation by the program could be relocated to the beginning of the second memory allocation, and displaced data in a third memory allocation could be split with one part relocated to the beginning of the third memory allocation and another part relocated to the end of the third memory allocation. In at least one embodiment, a bit (or bits) in the metadata could indicate where to find the displaced data.

Storing the displaced data 734 just below an 8-byte upper bound (or just above an 8-byte lower bound) minimizes padding, since storing it above the upper bound or below the lower bound may introduce internal padding when generating a lower bound or upper bound for data that is not 8-byte aligned. In addition, aligning the displaced data 734 just below an 8-byte upper bound or above an 8-byte lower bound can avoid the need in some cases for additional external padding to meet alignment requirements (e.g., two bytes of metadata may lead to an extra six bytes of padding to meet glibc's 8-byte alignment requirement). In another embodiment, the allocator may have other alignment requirements leading to different amounts of padding or no requirement for padding.

The location of the displaced data may be identified by the metadata in metadata region 740 so that the processor knows where to find it when performing memory accesses to the displaced data. In at least one embodiment, the metadata stored in metadata region 740 includes lower bound (LB) information 742, upper bound (UB) information 744, and optionally other metadata such as lower and upper tag data 746 and 748. In one example, LB information 742 may be stored on the lower side of the slot mid-point 705 in the metadata region 740, and UB information 744 may be stored on the upper side of the slot mid-point 705 in the metadata region 740. The LB and UB information may specify an offset to the end of the allocation bounds where the displaced data is stored. In the example shown in FIG. 7A, UB information 744 may specify an offset to the new 8-byte aligned upper bound 708 where displaced data 734 is stored. For displaced data that is stored at the beginning of the memory allocation, LB information 742 may specify an offset to an 8-byte aligned lower bound 709. It should be noted that some embodiments may use alignments other than eight bytes.

Since variable-sized metadata can be larger (e.g., for page-sized allocations or other large allocations meeting a size threshold), the bounds metadata can be extended to include a redirection pointer, address, or index to the displaced data's actual location. Thus, linear tables can be much smaller than for traditional memory tagging technology and may be dynamically scaled. Even an on-the-fly linked list could be used as the displaced data could be relocated anywhere in memory. In some embodiments, a bit may be used in the metadata region for larger slots to select between inline and out-of-line displaced data. Advantageously, by flexibly relocating the displaced data, page aligned allocations can stay page aligned, as this is often the granularity to perform input/output (IO) operations with devices.

In addition to bounds metadata (e.g., LB and UB information), other metadata may also be stored in the metadata region. In this embodiment, metadata region 740 is sized to contain both the bounds metadata (e.g., 742 and 744) and any other included metadata. For example, tag data represented as lower tag (LT) data 746 and upper tag (UT) data 748 may be stored in metadata region 740 on the lower side of the slot mid-point 705 and the upper side of the slot mid-point 705, respectively. The tag data (LT and UT) may be used as previously described herein for security checks during memory accesses to protect against vulnerabilities such as use-after-free. Other types of metadata for security purposes (or any other purpose) may also or alternatively be included in the metadata region 740 with the bounds metadata, and the metadata region 740 may be sized accordingly. Because the size of the displaced data is directly dependent on the size of the combined metadata to be stored in a metadata region, the size of the displaced data may vary depending on the particular implementation.

Accesses to the metadata region 740 cause the processor to redirect the access to the particular data being accessed, either the lower data suffix 712 or the upper data prefix 722, in the relocation region 730 at the end of the memory allocation 700A. The metadata in the metadata region 740 can be used to locate the displaced data 734. For example, when a data access request (e.g., load or store operation) for the metadata region 740 is made, first the metadata in the metadata region 740 can be found and read by the processor using the slot mid-point location as identified by an encoded pointer (specifying both the address and the power of two slot size). The processor can then use the metadata (e.g., LB information 742 or UB information 744) to locate the displaced data 734, and to retrieve the displaced data from that alternate location (e.g., within a relocation region at the start or end of the memory allocation 700A). The processor can complete the load or store operation using the displaced data's alternate location. It should be noted that ordinary accesses directly to the displaced data 734 in the relocation region 730 may be blocked since those would not be issued by valid software.

For a reallocation (e.g., where an active allocation is resized), the previously displaced data can be moved back to the metadata region 740 and a new mid-point location can be identified in a new slot. A new metadata region at the new mid-point location can be used to store the new metadata. The data in that new metadata region can be displaced by the new metadata and moved, for example, to a relocation region at the beginning or the end of the reallocated buffer (or in another area of memory if the relocation region is outside the bounds of the memory allocation). Thus, reallocation operations can be very efficient. Similarly, for a device performing a direct memory access, only one location needs to be patched to replace the metadata with the original data for direct device access (where devices or drivers do not expect or process the metadata and expect to only see the original data buffer).

Alternative embodiments may keep displaced data inline for sub-page allocations and page-granular slot displaced data in a table indexed based on the linear address. That is, an index would not be stored in metadata in this embodiment. Even the glibc allocator stores large allocations in a separate memory range (e.g., containing memory regions requested from the kernel using mmap) than the one used for small allocations, so the page-granular table could cover only that range, which would limit linear address consumption. In fact, given that particular large allocations are likely accessed frequently within a given span of time, the metadata may be kept out-of-line for those allocations, for example with a metadata cache.

Figure 7B:
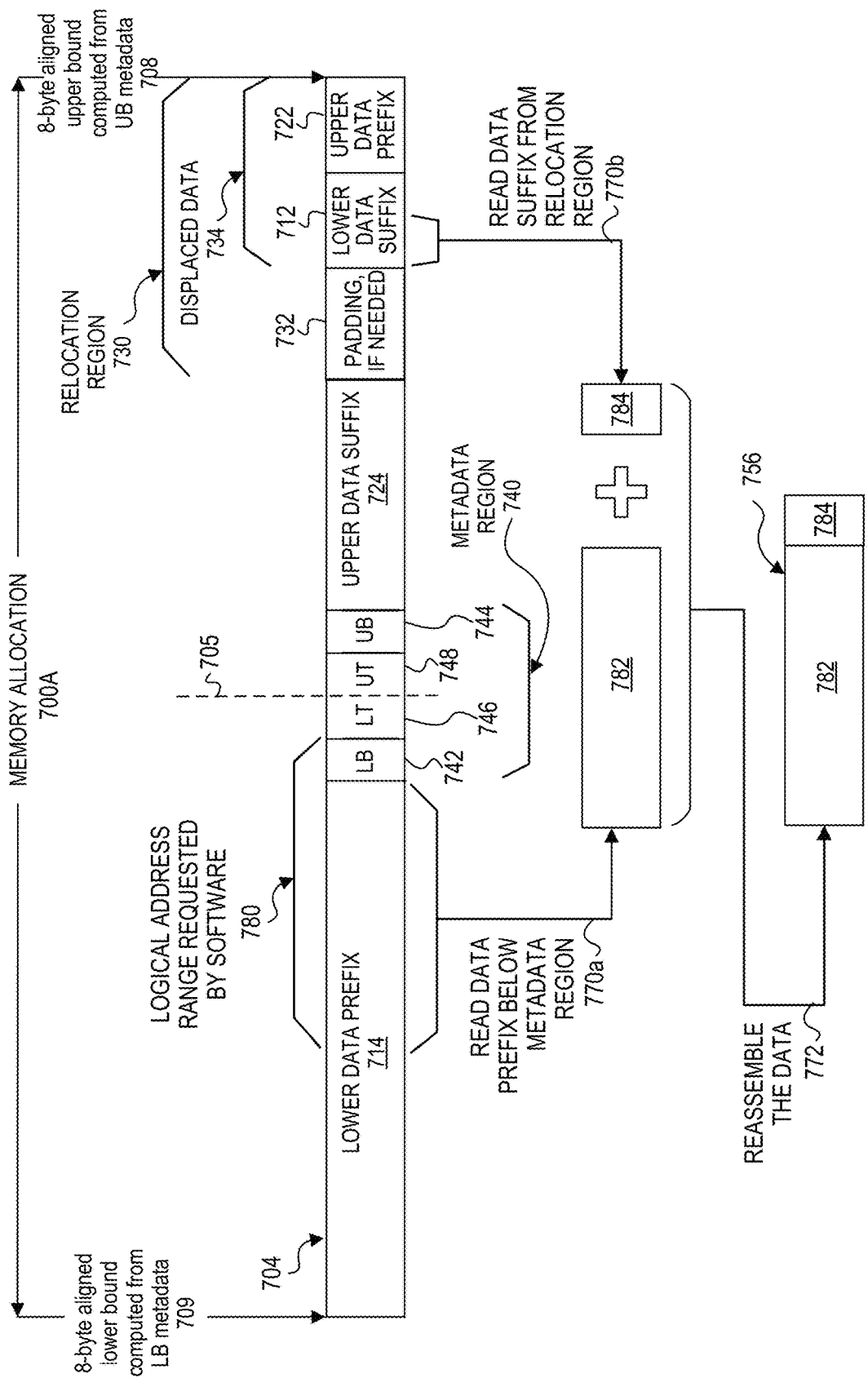
FIG. 7B illustrates a reassembling process in an example load operation of data from the memory allocation of FIG. 7A, according to at least one embodiment

FIG. 7B is a block diagram illustrating a reassembling process in a load operation of data in memory allocation 700A. As previously described, the modified format 704 of memory allocation 700A illustrates the actual linear/virtual layout after data belonging in metadata region 740 is displaced to a relocation region 730, and metadata (e.g., 742, 744, 746, 748) is stored in metadata region 740. In this example scenario, a logical address range 780 of memory allocation 700A is requested by software. The logical address range 780 includes a portion of lower data prefix 714 and also overlaps a portion of metadata region 740 where the lower bound information 742 is stored.

To perform the load at the logical address range 780, displaced data that belongs in the logical address range 780 is loaded from the relocation region 730. At 770*a*, a first data portion 782 belonging in the logical address range 780 is read. The first data portion 782 is part of lower data prefix 714, which is data located prior to the metadata region 740. At 770*b*, a second data portion 784 belonging in the logical address range 780 is read. The second data portion 784 is part of lower data suffix 712, which is displaced data that is stored in relocation region 730. At 762, the first data portion 782 and the second data portion 784 are reassembled as shown at 786.

Figure 7C:
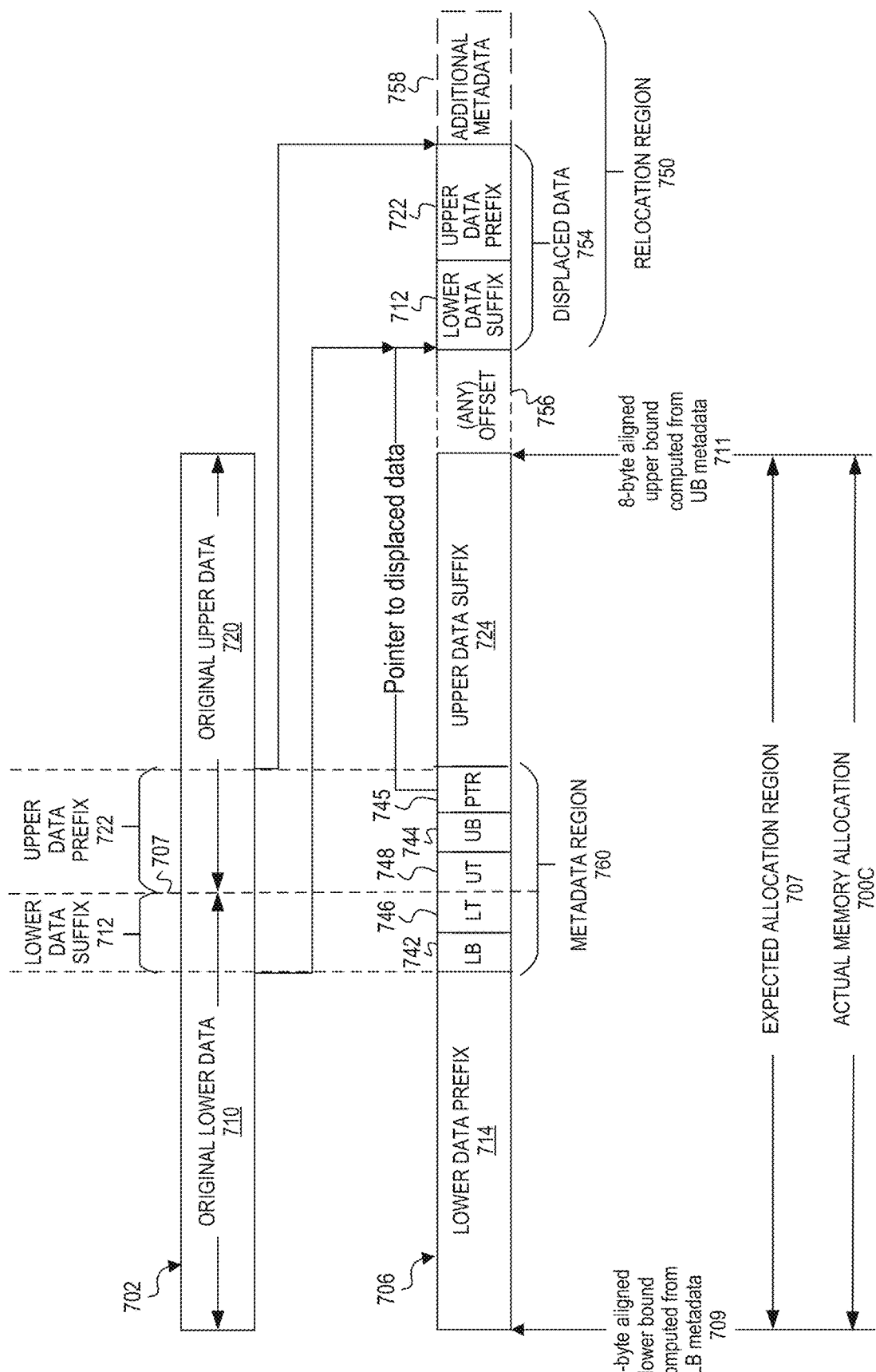
FIG. 7C illustrates another memory allocation with views of the expected format and an alternative modified actual format according to at least one embodiment.

FIG. 7C is an illustration of another possible embodiment of a memory allocation 700C resulting from the same memory allocation request as in FIG. 7A. FIG. 7C shows a view of the same expected format 702 shown in FIG. 7A and an alternative modified format 706 of the allocation 700C. An encoded pointer to the memory allocation 700C is generated in response to a memory allocation request from an application and provided to the application to enable memory accesses. In this embodiment, the actual memory allocation 700C corresponds to the expected allocation region 707, and a relocation region 750 is stored outside the bounds of the memory allocation 700C. Data stored in the memory allocation 700C may be accessed by the application according to the expected format 702. However, the data is actually stored partially in the memory allocation 700C according to a modified format (e.g., 706) and partially in a relocation region (e.g., 750) that may or may not be contiguous with memory allocation 700C. In the modified format 706, some data is relocated from a particular region (e.g., metadata region 760) within the memory allocation 700C to an alternate region (e.g., relocation region 750) to enable inline metadata to be stored in the particular region within the memory allocation 700C. Optionally, additional metadata 758 may also be stored in the alternate region.

The memory allocation 700C may have an 8-byte aligned lower bound 709 and an 8-byte aligned upper bound 711 and may be assigned to a slot having a power of two size and a mid-point 705. In at least one embodiment, the bounds 709 and 711 of the modified format 706 of memory allocation 700C are the same as the bounds of the expected format 702 of memory allocation 700C. The slot to which memory allocation 700C is assigned may be the smallest power of two slot into which the memory allocation 700C fits based on the particular memory address (e.g., at the lower 8-byte boundary), the size of the memory allocation 700C, and which slot mid-point the memory allocation 700C crosses. It should be noted that, although the slot mid-point 705 is in the middle of the slot (not shown), the mid-point may or may not be located in the middle of memory allocation 700C, and its relative location within the memory allocation 700C depends on the lower bound address and the size of the allocation. Also, although the slot of mid-point 705 is not illustrated in FIG. 7C, it should be understood that the memory allocation 700C in the modified format 706 (or in the expected format) fits entirely within the slot. Additionally, it should be noted that some embodiments may use alignments other than eight bytes.

In one or more embodiments, the allocation size requested in the memory allocation request for memory allocation 700C corresponds to an expected format (e.g., 702), and is not changed by the memory allocation operation. The memory allocation operation allocated memory in the requested allocation size, as memory allocation 700C. A modified format (e.g., 706) of memory allocation 700C is rendered to accommodate inline metadata. Thus, the actual allocation size of the resulting memory allocation 700C in the modified format 706 is the same as the originally requested allocation size.

The application is unaware of the modified format 706 and its memory access requests are made according to the expected format 702. The expected format 702 includes original lower data 710 and original upper data 720, which are contiguous and divided by the slot mid-point 705. In the modified format 706 that accommodates inline metadata, however, some of the original lower data 710 (lower data suffix 712) and some of the original upper data 720 (upper data prefix 722) are displaced by the metadata and relocated to alternate locations in memory, outside the bounds of memory allocation 700C.

Like the modified format 704 in FIG. 7A, in the modified format 706 of FIG. 7C, an area around the slot mid-point 705, which is referred to as a metadata region 760, is sized to contain the metadata that displaces some of the original data (e.g., the lower data suffix 712 and the upper data prefix 722). In this embodiment, however, metadata region 760 may be sized to also include a redirection pointer 745 to the displaced data 754 in the relocation region 750, which is outside the bounds of the memory allocation 700C. In this example, the metadata region 760 is expanded into the original upper data 720 to accommodate the redirection pointer 745 and therefore, the upper data prefix 722 of the embodiment in FIG. 7C may encompass more data than the upper data prefix 722 in the embodiment of FIG. 7A. It should be apparent, however, that the redirection pointer 745 may be located on either side of the slot mid-point 705 and the displaced data 754 can be adjusted accordingly.

With the pointer based relocation of FIG. 7C, the displaced data 754, and optionally, any additional metadata 758, can be relocated anywhere in memory. An offset 756 of any size may be provided between memory allocation 700C and the relocation region 750. For example, the relocation region may be located anywhere in memory before or after memory allocation 700C. The memory allocation 700C and relocation region 750 may be contiguous (with no spaces therebetween) or noncontiguous (spaced apart). An additional allocation is needed for the relocation region to store the displaced data 754 and optionally, additional metadata 758. Accordingly, when memory is allocated for memory allocation 700C (e.g., via malloc, calloc, etc.), an additional allocation for the relocation region 750 is performed, where the additional allocation has an allocation size equal to the size of the metadata region 760 (for the displaced data 754) added to the size of additional metadata 758 (if any). The memory allocator can then set the value of the redirection pointer 745 in the metadata region 760 to the address of the relocation region 750.

When memory allocation 700C is subsequently freed, the additional allocation (i.e., relocation region 750) containing the displaced data 754 and possibly additional metadata 758, would likewise be freed. Given the memory allocation specified by redirection pointer 745, the memory allocator would free that allocation too (e.g., free(redirection pointer 745) too. In an alternative embodiment, instead of allocating additional memory as a relocation region for the displaced data 754 and additional metadata 758, the displaced data 754 and additional metadata could be stored as entries in a table or other storage structure.

Figure 8:
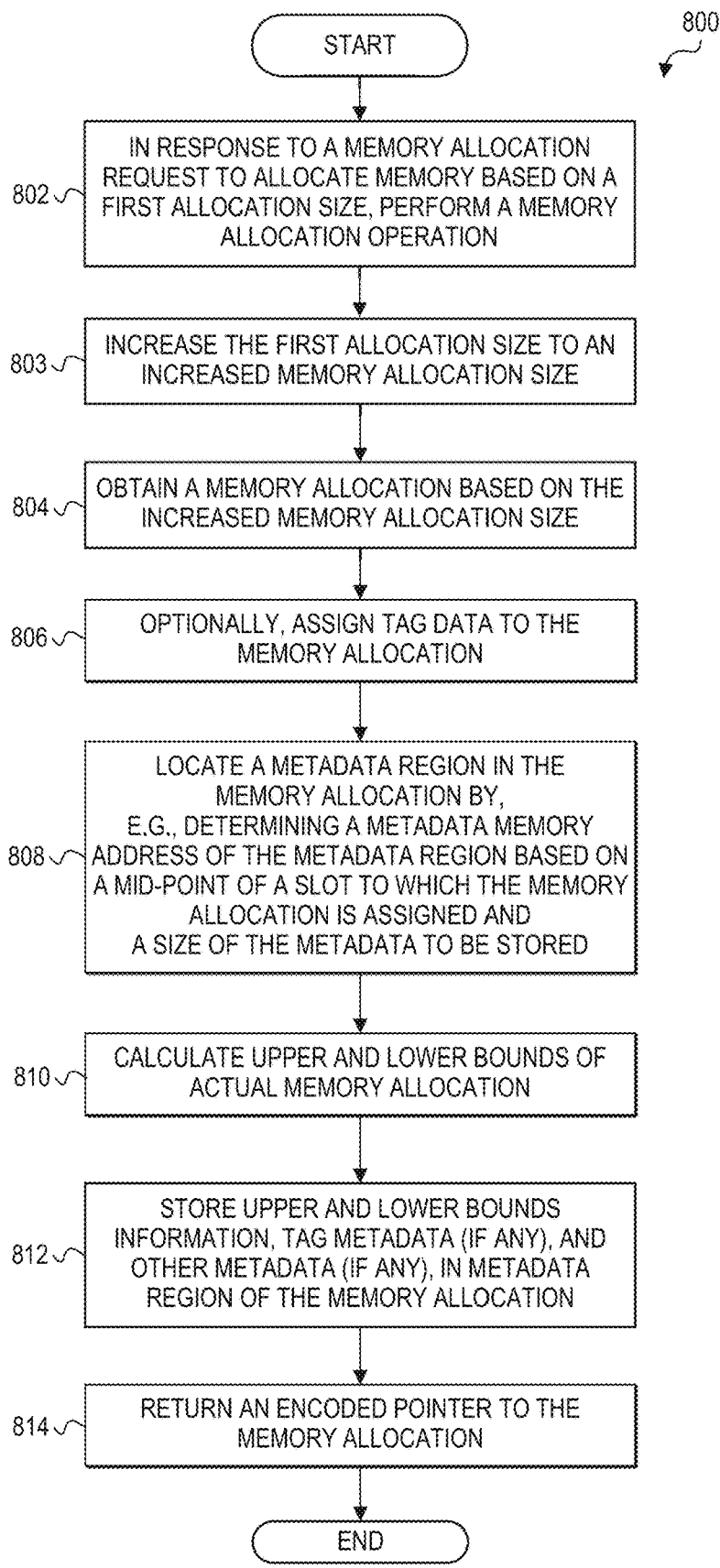
FIG. 8 is a high level flow diagram of an example process of performing a memory allocation operation according to at least one embodiment.

FIG. 8 is a high level flow diagram of an example process 800 of performing a memory allocation operation in a system with data relocation for inline metadata according to at least one embodiment described herein. For ease of illustration, process 800 is described with reference to memory allocation 700A of FIGS. 7A-7B. In an example, at least some of the operations shown in process 800 may be performed in software, which may be executed by processor circuitry 110, 330, 600. In another example, one or more of the operations shown in process 800 may be performed in hardware (e.g., processor circuitry 110, 330, 600, and/or memory controller circuitry 120, 334).

At 802, a memory allocation request to allocate memory based on a first (requested) allocation size may correspond to, for example, instructions in a user space application executed at run-time (e.g., C malloc, alloc, new, etc.), instructions compiled at compile time that need static memory (e.g., variables declaration, etc.), or the initiation of loading process by a loader (e.g., implicit memory allocation). In response to the memory allocation request, various instructions or logic may be executed to perform a memory allocation operation, which can include one or more operations, at least some of which are shown in process 800 and will be further described with reference to process 800. In one example, the instructions or logic to perform the memory allocation may be included in a privileged component, which may be part of an operating system, a trusted execution environment (TEE), a virtual machine, processor circuitry (e.g., 110, 330, 600), a co-processor, or any other suitable hardware, firmware, or software in a computing system (e.g., 100) or securely connected to the computing system.

At 903, the requested memory allocation size is increased by a number of bytes sufficient to accommodate metadata to be stored inline in a metadata region (e.g., 740) of the memory allocation (e.g., 700A). The metadata includes at least upper bound information and lower bound information. Optionally, other metadata may be included, such as tag data for example. The size of the memory allocation request may be increased by: 1-byte or more; 2-bytes or more; 4-bytes or more; 8-bytes or more; 16-bytes or more; 32-bytes or more, etc.

At 804, the requested memory allocation is obtained in the memory circuitry based on the increased memory allocation size. In at least one embodiment, the memory allocation operation may be performed as previously described herein, where the memory allocation is assigned to a power of two slot, and where a pointer to the allocation is encoded with the power of two size, as shown in FIGS. 2-3, among others.

At 806, tag data is assigned to the allocated memory, if tag data is used.

At 808, a memory address of the metadata region in the memory allocation is determined. The memory address of the metadata region may be determined by first determining a mid-point of a slot to which the memory allocation is assigned. The memory address of the mid-point of the slot may be determined based on the base address of the memory allocation and the size of the slot. The mid-point memory address and the size of the metadata to be stored in the metadata region may be used to calculate the memory address of the metadata region (e.g., the starting byte of the metadata region). Depending on the particular size of the slot, the metadata may be stored on one side of the mid-point of the slot or may be divided with metadata being stored on each side of the mid-point of the slot.

At 810, upper bound information and lower bound information are calculated for the actual memory allocation (e.g., 700A). Since the requested size for the memory allocation was increased to include room for a relocation region (e.g., 730) for displaced data (e.g., 734), the upper bound (or lower bound if the relocation region is placed at the beginning of the memory allocation) is used as the relocation information to find the displaced data during load operations and to relocate the displaced data during store operations.

At 812, the upper bound information and lower bound information and any other metadata to be stored in the metadata region (e.g., the tag metadata assigned to the memory allocation) may be stored in the metadata region (e.g., 740).

At 814, a pointer to the memory allocation may also be generated and encoded with a power of two encoding for the allocation size (e.g., power of two slot size), memory address bits, pointer arithmetic bits, and possibly tag data. The encoded pointer may be generated and encoded by processor circuitry in one example and can be outputted to the program that requested the memory allocation.

Figure 9:
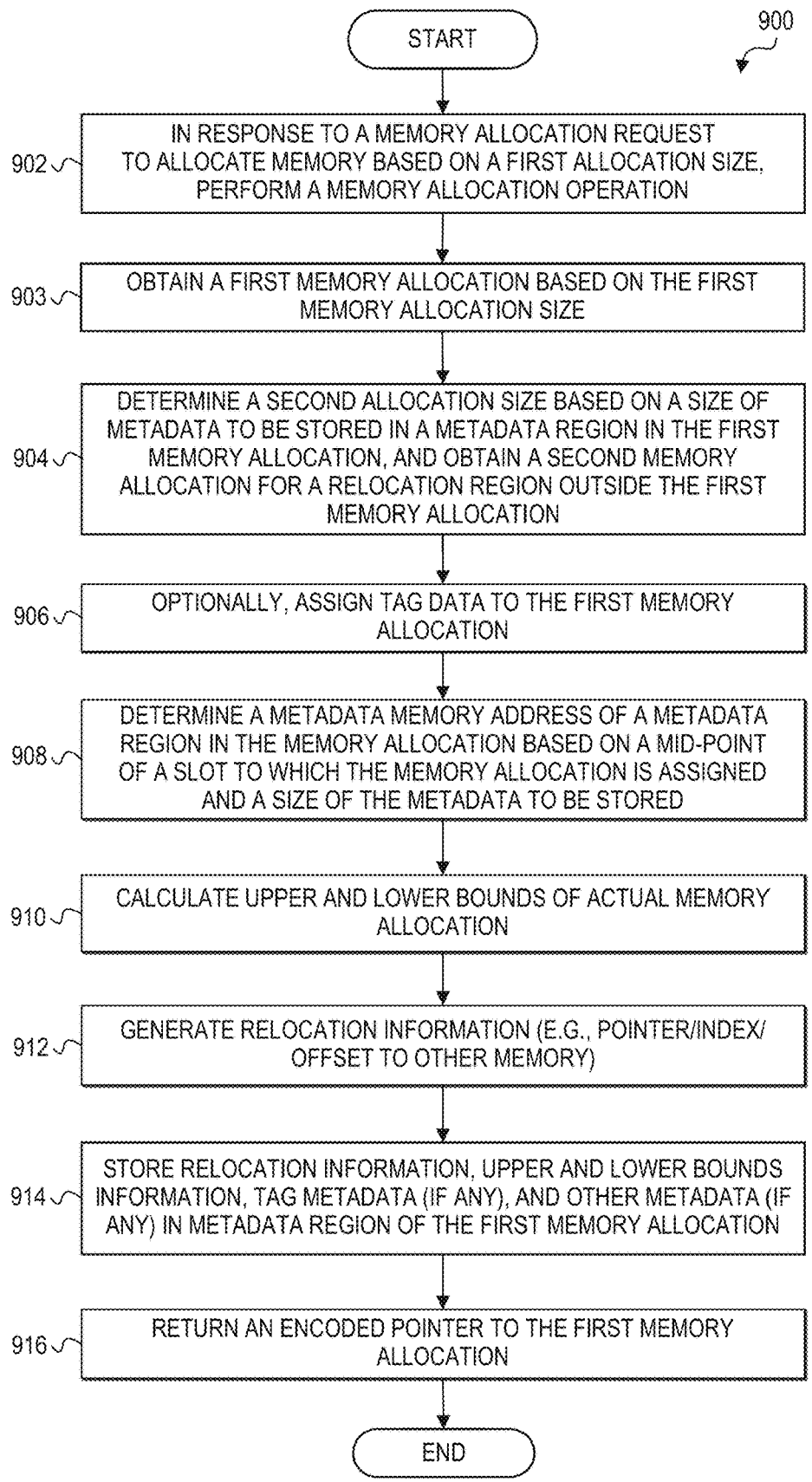
FIG. 9 is a high level flow diagram of another example process of performing a memory allocation operation according to at least one embodiment.

FIG. 9 is a high level flow diagram of another example process 900 of performing a memory allocation operation in a system with data relocation for inline metadata according to at least one embodiment described herein. For ease of illustration, process 900 is described with reference to memory allocation 700C of FIG. 7C. In an example, at least some of the operations shown in process 800 may be performed in software, which may be executed by processor circuitry 110, 330, 600. In another example, one or more of the operations shown in process 900 may be performed in hardware (e.g., processor circuitry 110, 330, 600, and/or memory controller circuitry 120, 334).

At 902, a memory allocation request to allocate memory based on a first (requested) allocation size may correspond to, for example, instructions in a user space application executed at run-time (e.g., C malloc, alloc, new, etc.), instructions compiled at compile time that need static memory (e.g., variables declaration, etc.), or the initiation of loading process by a loader (e.g., implicit memory allocation). In response to the memory allocation request, various instructions or logic may be executed to perform a memory allocation operation, which can include one or more operations, at least some of which are shown in process 900 and will be further described with reference to process 900. In one example, the instructions or logic to perform the memory allocation may be included in a privileged component, which may be part of an operating system, a trusted execution environment (TEE), a virtual machine, processor circuitry (e.g., 110, 330, 600), a co-processor, or any other suitable hardware, firmware, or software in a computing system (e.g., 100) or securely connected to the computing system.

At 903, a first memory allocation in the memory circuitry is obtained based on the requested memory allocation size. In at least one embodiment, the memory allocation operation for the first memory allocation may be performed as previously described herein, where the memory allocation is assigned to a power of two slot, and where a pointer to the allocation is encoded with the power of two size, as shown in FIGS. 2-3, among others.

At 904, a second allocation size for a relocation region to be allocated outside of the first memory allocation is determined. The second allocation size may be a number of bytes sufficient to accommodate metadata to be stored inline in a metadata region (e.g., 760) of the first memory allocation (e.g., 700C). The metadata may include at least relocation information such as a redirection pointer, index, or offset to the relocation region (once it is allocated). The relocation information is calculated and stored in the metadata region once the relocation region is allocated. The metadata to be stored in the metadata region may also include upper bound information and lower bound information of the first memory allocation (e.g., 700C), which can be calculated and stored in the metadata region. Metadata to be stored in the metadata region may optionally include other metadata such as tag data for example. The size of the second allocation size may be any suitable number of bytes such as 1-byte or more; 2-bytes or more; 4-bytes or more; 8-bytes or more; 16-bytes or more; 32-bytes or more etc. Once the second allocation size has been determined, the second memory allocation is obtained based on the second allocation size to obtain the allocated relocation region in the memory circuitry based on the second memory allocation size.

At 906, tag data is assigned to the allocated memory, if tag data is used.

At 908, a memory address of the metadata region in the memory allocation is determined. The memory address of the metadata region may be determined by first determining a mid-point of a slot to which the first memory allocation is assigned. The memory address of the mid-point of the slot may be determined based on the base address of the memory allocation and the size of the slot. The mid-point memory address and the size of the metadata to be stored in the metadata region may be used to calculate the memory address of the metadata region (e.g., the starting byte of the metadata region). Depending on the particular size of the slot, the metadata may be stored on one side of the mid-point of the slot or may be divided with metadata being stored on each side of the mid-point of the slot.

At 910, upper bound information and lower bound information are calculated for the first memory allocation (e.g., 700C). Since the relocation region is not contained within the first memory allocation, bounds information is not used to access the displaced data but may still be used for other purposes such as, for example, safety checks to ensure a memory access operation is not out of bounds.

At 912, relocation information associated with the relocation region can be generated. The relocation information can be used to access the relocation region to find displaced data during load operations and to relocate displaced data during store operations. The relocation information may be any suitable information that enables the processor circuitry and/or the memory controller circuitry to locate the displaced data in the relocation region. For example, relocation information may be a redirection pointer, an index, or an offset, among other examples.

At 914, the upper bound information and lower bound information and the relocation information (e.g., redirection pointer, index, offset) may be stored in the metadata region (e.g., 760). Also, other metadata may be stored in the metadata region (e.g., tag data, etc.).

At 916, a pointer to the memory allocation may also be generated and encoded with a power of two encoding for the allocation size (e.g., power of two slot size), memory address bits, pointer arithmetic bits, and possibly tag data. The encoded pointer may be generated and encoded by processor circuitry in one example and can be outputted to the program that requested the memory allocation.

Figure 10:
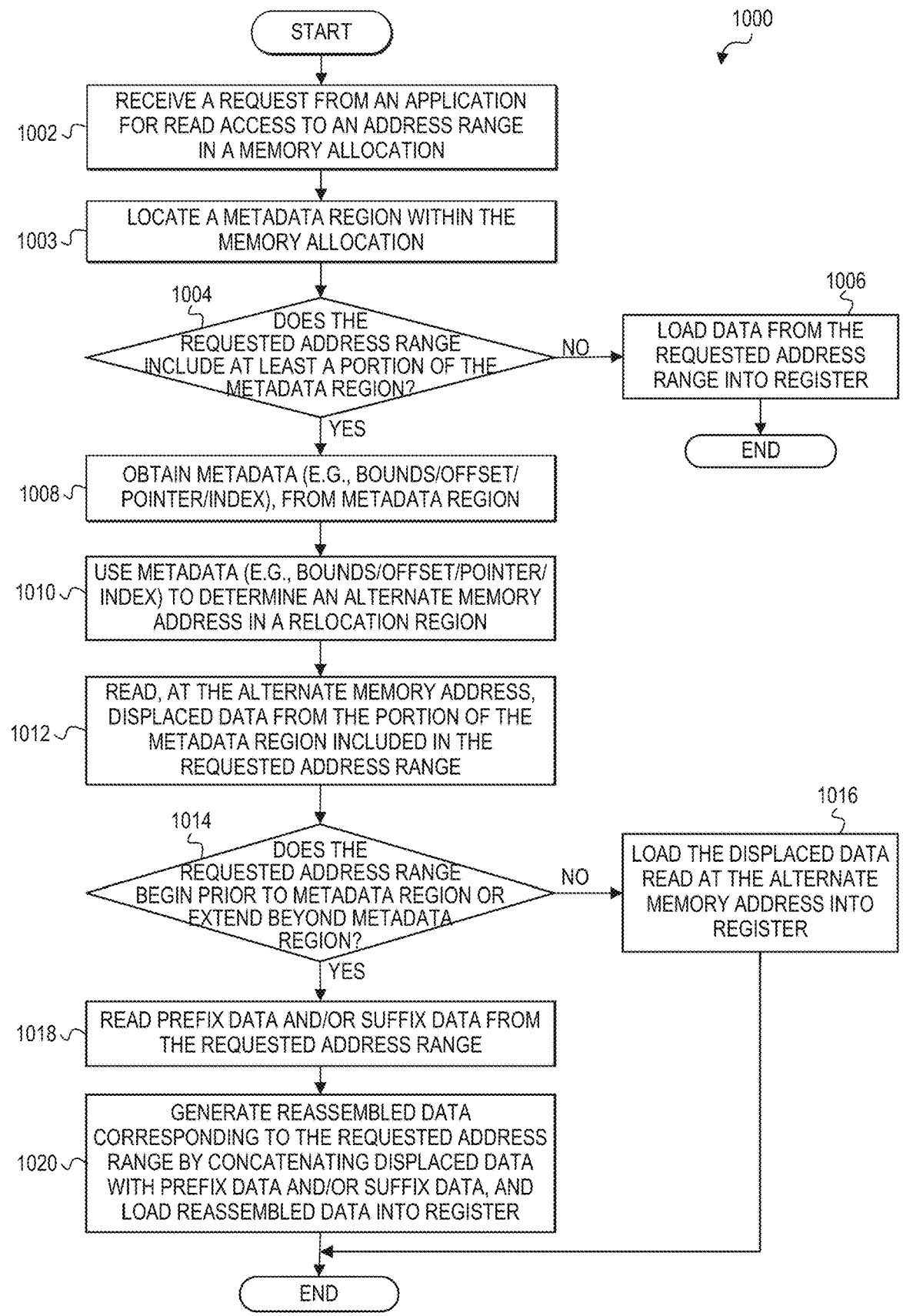
FIG. 10 is a high level flow diagram of an example process of performing a memory access operation according to at least one embodiment.

FIG. 10 is a high level flow diagram of an example process 1000 of performing a memory access request, such as a read, move, or load request, in a system with data relocation for inline metadata according to at least one embodiment described herein. One or more of the operations shown in process 1000 may be performed by processor circuitry 110, 330, 600, and/or memory controller circuitry 120, 334.

At 1002, the processor circuitry and/or the memory controller circuitry receives a request (e.g., a memory read request) from an application for read access to an address range in a memory allocation of the memory circuitry. The request indicates an encoded pointer to the first memory address in the requested address range in the memory allocation to be accessed (e.g., to read data). The number of bytes to be accessed (e.g., for reading data) can depend on the particular request that is received. Generally, the requested address range can include the entire memory allocation or any portion thereof, including a single byte.

At 1003, a metadata region within the memory allocation can be located. In at least one embodiment, the metadata region can be located using the encoded pointer provided by the memory read request. The encoded pointer may be similar to the encoded pointers previously described herein (e.g., 180, 280, 310). In an example, the processor circuitry and/or the memory controller circuitry can locate the metadata region by determining a memory address of the metadata region (e.g., 740, 760). The address of the metadata region can be determined by first determining a mid-point of a slot to which the memory allocation is assigned, and then determining the memory address of the metadata region. The memory address of the mid-point of the slot may be determined based on the address (e.g., base address) of the memory access and the size of the slot. The mid-point memory address and the size of the metadata stored in the metadata region may be used to calculate the memory address of the metadata region. The memory address of the metadata region can correspond to the starting (or first) byte address of the metadata region. Depending on the particular size of the slot, the metadata may be stored on one side of the mid-point of the slot or may be divided with metadata being stored on each side of the mid-point of the slot.

At 1004, the processor circuitry and/or the memory controller circuitry can determine whether the requested address range includes the metadata region (e.g., 740, 760) of the memory allocation (e.g., 700A, 700C).

If a determination is made at 1004 that the requested address range does not include the metadata region of the memory allocation, then at 1006, the read request is performed and data from the requested address range is loaded into a register.

If a determination is made at 1004 that the requested address range does include the metadata region of the memory allocation, then at 1008, the appropriate metadata to locate the relocation region is obtained from the metadata region. For example, if displaced data from the metadata region has been moved or relocated to the end of the memory allocation, then upper bound information (e.g., 744) may be obtained from the metadata region and used to find the alternate memory address in the relocation region at the end of the memory allocation. If displaced data from the metadata region has been moved to the beginning of the memory allocation, then lower bound information (e.g., 742) may be obtained from the metadata region and used to find the alternate memory address in the relocation region at the beginning of the memory allocation. If displaced data has been moved or relocated to memory outside the memory allocation, then a redirection pointer or index to the displaced data can be obtained from the metadata region. Accordingly, for embodiments in which a memory allocation is expanded to include a relocation region, the metadata may include bounds information (e.g., an offset and array size, an actual allocation size to the left/right of the slot mid-point) or any other information that indicates the end of the actual allocation (e.g., 700A), where the displaced data is stored. For embodiments in which a relocation region is allocated outside the memory allocation, the metadata may include a pointer or index to the relocation region, or any other suitable information to indicate a relocation region in memory outside the memory allocation (e.g., 700C), where the displaced data is stored.

At 1010, the processor circuitry and/or the memory controller circuitry uses the metadata to determine an alternate memory address in a relocation region, which may be within the memory allocation in some embodiments, or outside the memory allocation in other embodiments, as previously described.

At 1012, the processor circuitry and/or the memory controller circuitry reads, at the alternate memory address in the relocation region (e.g., 730, 750), displaced data from the portion of the metadata region that is included in the requested address range. The data that is read could include all of the displaced data (e.g., 734, 754) in the relocation region or any portion thereof, depending on the memory read/load request and how much of the metadata region overlaps with the requested address range.

At 1014, a determination is made as to whether the requested address range to be accessed (e.g., for reading data) begins prior to the metadata region or extends beyond the metadata region. If it is determined that the requested address range does not begin prior to the metadata region (i.e., a prefix portion) and does not extend beyond the metadata region (i.e., a suffix portion), then the requested address range is located only within the metadata region and therefore, all of the data corresponding to the requested address range has been displaced to the relocation region. In this case, at 1016, the processor circuitry and/or the memory controller circuitry loads, into a register, the displaced data read at the alternate memory address in the relocation region.

If it is determined that the requested address range begins prior to the metadata region (i.e., a prefix portion) or extends beyond the metadata region (i.e., a suffix portion), then at 1018, the processor circuitry and/or the memory controller circuitry reads a prefix portion and/or a suffix portion of the requested object from requested address range in the expected allocation region (e.g., 707) if the allocation size was increased during memory allocation operations, or in the first memory allocation (e.g., 700C) if the relocation region is allocated outside of the memory allocation. First, a determination can be made as to whether the requested address range begins prior to the metadata region. If the memory address referenced by the encoded pointer is located prior to the metadata region, then a prefix portion of the object is read from the memory allocation prior to the metadata region (e.g., in lower data prefix 714). The memory address and the size of requested address range can be used to determine whether the requested address range extends beyond the metadata region. If it is determined that the requested address range extends beyond the metadata region, then a suffix portion of the object is read from the memory allocation starting at a memory address immediately succeeding the metadata region but ending prior to a relocation region if the relocation region is included in the allocation (e.g., in upper data suffix 724).

At 1020, the processor circuitry 110 and/or the memory controller circuitry 120 generates reassembled data (e.g., displaced data portion from the relocation region, prefix data portion from the memory allocation prior to the metadata region, and/or suffix data portion from the memory allocation after the metadata region) by concatenating the data portions or otherwise combining the data portions and loading the reassembled data into a register. The reassembled data includes the displaced data from the alternate memory address.

It should be noted that, in one embodiment, when a memory access request is made for data in a particular memory allocation, if the cache line to be transferred includes the metadata region, then the displaced data may replace the metadata in the cache line that is transferred to cache. In this scenario, immediate or future access of the metadata region can be retrieved directly from cache without having to retrieve displaced data from another location. In other embodiments, however, the processor may only access other parts of a cache line and transfer that data to processor registers without ever needing to access the displaced data. In this scenario, the processor circuitry may wait until the metadata region is specifically requested (e.g., in a read, move, etc.) before fetching that displaced data. Additionally, the processor circuitry can separately cache the displaced data, either once it is needed or prefetched, so that subsequent accesses to the metadata region can be quickly filled in from that local data cache that stores displaced data from memory allocations.

Figure 11:
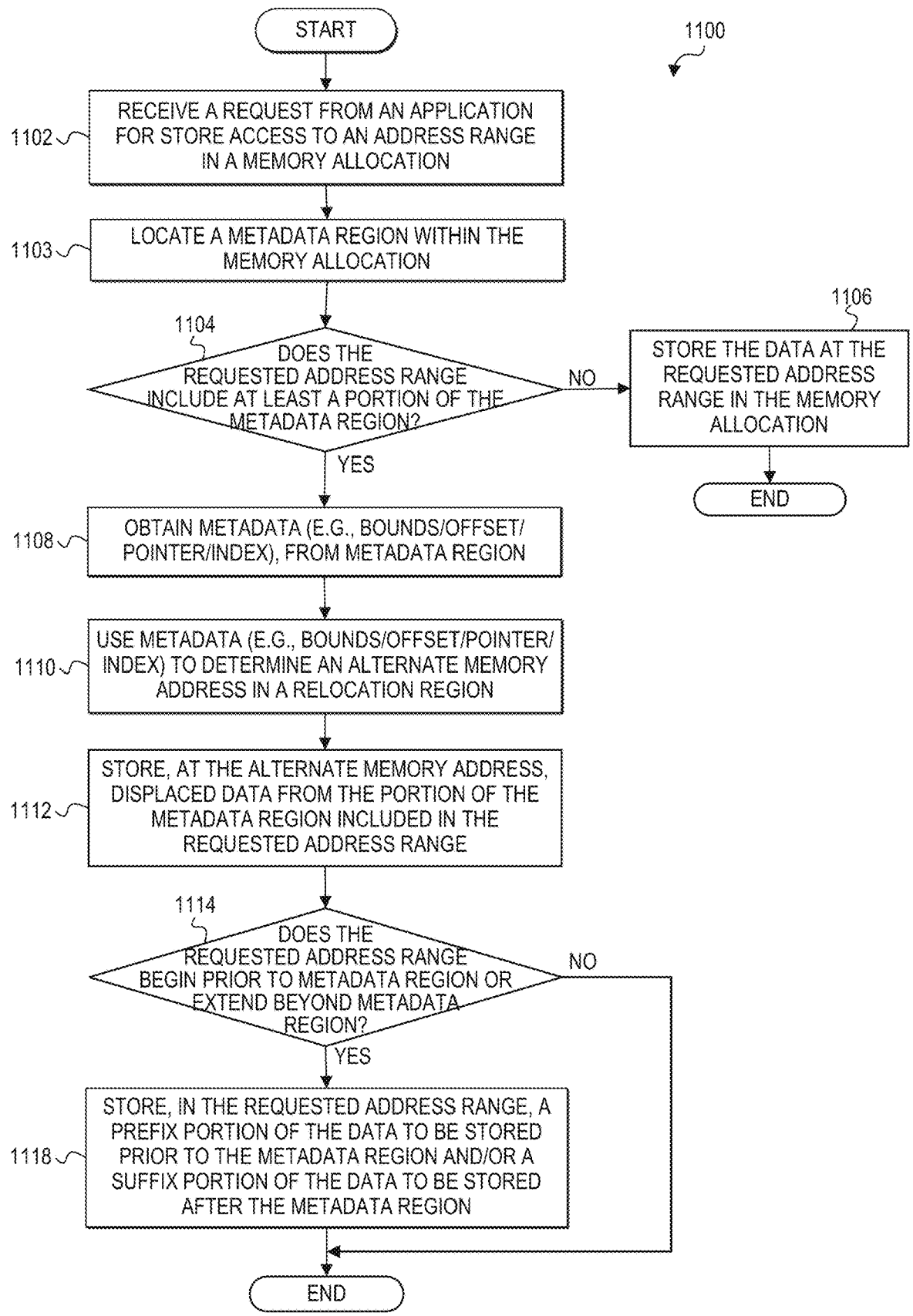
FIG. 11 is a high level flow diagram of an example process of performing another memory access operation according to at least one embodiment.

FIG. 11 is a high level flow diagram of an example process 1100 of performing a memory access request, such as a store or move request, in a system with data relocation for inline metadata according to at least one embodiment described herein. One or more of the operations shown in process 1100 may be performed by processor circuitry 110, 330, 600, and/or memory controller circuitry 120, 334.

At 1102, the processor circuitry and/or the memory controller circuitry receives a request (e.g., a memory store request) from an application for store access to an address range in a memory allocation of the memory circuitry. The request indicates an encoded pointer to the first memory address in the requested address range in the memory allocation to be accessed (e.g., to store data). The number of bytes to be accessed (e.g., for storing data) can depend on the particular request that is received. Generally, the requested address range can include the entire memory allocation or any portion thereof, including a single byte.

At 1103, a metadata region within the memory allocation can be located. In at least one embodiment, the metadata region can be located using the encoded pointer provided by the memory store request. The encoded pointer may be similar to the encoded pointers previously described herein (e.g., 180, 280, 310). In an example, the processor circuitry and/or the memory controller circuitry can locate the metadata region by determining a memory address of a metadata region (e.g., 740, 760). The address of the metadata region can be determined by first determining a mid-point of a slot to which the memory allocation is assigned, and then determining the memory address of the metadata region. The memory address of the mid-point of the slot may be determined based on the address (e.g. the base address) of the memory access and the size of the slot. The mid-point memory address and the size of the metadata stored in the metadata region may be used to calculate the memory address of the metadata region. The memory address of the metadata region can correspond to the starting (or first) byte address of the metadata region. Depending on the particular size of the slot, the metadata may be stored on one side of the mid-point of the slot or may be divided with metadata being stored on each side of the mid-point of the slot. The identified metadata region can be used to locate data in a register or cache that is to be stored in the metadata region.

At 1104, the processor circuitry and/or the memory controller circuitry can determine whether the requested address range includes the metadata region (e.g., 740, 760) of the memory allocation (e.g., 700A, 700C).

If a determination is made at 1104 that the requested address range does not include the metadata region of the memory allocation, then at 1106, the store request is performed and data from the processor register (or from cache) is stored in the requested address range of the memory allocation.

If a determination is made at 1104 that the requested address range does include the metadata region of the memory allocation, then at 1108, the appropriate metadata to locate the relocation region is obtained from the metadata region. At 1110, the metadata is used to determine an alternate memory address in a relocation region where the data to be displaced from the metadata region is to be stored. The relocation region may be within the memory allocation in some embodiments, or outside the memory allocation in other embodiments, as previously described. If the data to be displaced from the metadata region is to be stored at an alternate memory address in a relocation region at the end of the memory allocation, then upper bound information (e.g., 744) may be obtained from the metadata region and used to find the alternate memory address in the relocation region at the end of the memory allocation. However, if the data to be displaced from the metadata region is to be stored at an alternate memory address in a relocation region at the beginning of the memory allocation, then lower bound information (e.g., 742) may be obtained from the metadata region and used to find the alternate memory address in the relocation region at the beginning of the memory allocation. If the data to be displaced from the metadata region is to be stored in memory outside the memory allocation, then a redirection pointer or index to the relocation region can be obtained from the metadata region. Accordingly, for embodiments in which a memory allocation is expanded to include a relocation region, the metadata may include bounds information (e.g., an offset and array size, an actual allocation size to the left/right of the slot mid-point) or any other information that indicates the beginning and/or end of the actual allocation (e.g., 700A), where the data to be displaced is to be stored. For embodiments in which a relocation region is allocated outside the memory allocation, the metadata may include a pointer or index to the relocation region, or any other suitable information to indicate a relocation region in memory outside the memory allocation (e.g., 700C), where the data to be displaced is to be stored.

At 1112, the processor circuitry and/or the memory controller circuitry stores displaced data that the application expects to be stored in the metadata region or in a portion thereof that overlaps with the requested address range, at the alternate memory address in the relocation region instead. In embodiments where the size of a requested memory allocation is increased and displaced data is stored at the beginning or end of the allocation (e.g., FIG. 7A-7B), padding can be added to the displaced data if needed to ensure alignment with an 8-byte boundary. As previously noted, however, the allocator may have other alignment requirements leading to different amounts of padding or no requirement for padding. In other embodiments where displaced data is stored at an alternate location outside the bounds of the memory allocation (e.g., FIG. 7C), the relocation region (e.g., 750) in which the displaced data is stored may have the same alignment requirements as, or different alignment requirements than, the memory allocation.

At 1114, a determination is made as to whether the requested address range to be accessed (e.g., for storing data) begins prior to the metadata region or extends beyond the metadata region. If it is determined that the requested address range does not begin prior to the metadata region (i.e., a prefix portion) and does not extend beyond the metadata region (i.e., a suffix portion), then the requested address range is located only within the metadata region and therefore, all of the data to be stored was displaced and stored in the relocation region (e.g., at 1112).

If it is determined that the requested address range begins prior to the metadata region (i.e., a prefix portion) and/or extends beyond the metadata region (i.e., a suffix portion), then at 1118, the processor circuitry and/or the memory controller circuitry stores a prefix portion of the data to be stored and/or a suffix portion of the data to be stored in the requested address range in the expected allocation region (e.g., 707) if the allocation size was increased during memory allocation operations, or in the first memory allocation (e.g., 700C) if the relocation region is allocated outside the bounds of the memory allocation. First, a determination can be made as to whether the requested address range begins prior to the metadata region. If the memory address referenced by the encoded pointer is located prior to the metadata region, then a prefix portion of the data to be stored is stored in the portion of the requested address range located prior to the metadata region. The memory address and number of bytes in the requested address range (or the size of the data to be stored) can be used to determine whether the requested address range extends beyond the metadata region. If it is determined that the requested address range extends beyond the metadata region, then a suffix portion of the data to be stored is stored in the memory allocation starting at a memory address immediately succeeding the metadata region (but ending prior to a relocation region if the relocation region is included in the allocation).

In some embodiments, Shared Virtual Memory (SVM) may be used to access an allocation. For example, the bounds checks described above may be applied to that access by a CPU while servicing an Address Translation Services (ATS) translation request. If the access is disallowed, then an ATS translation failure may be indicated. The SVM-capable device may perform accesses to displaced or shifted data as described herein.

Figure 12:
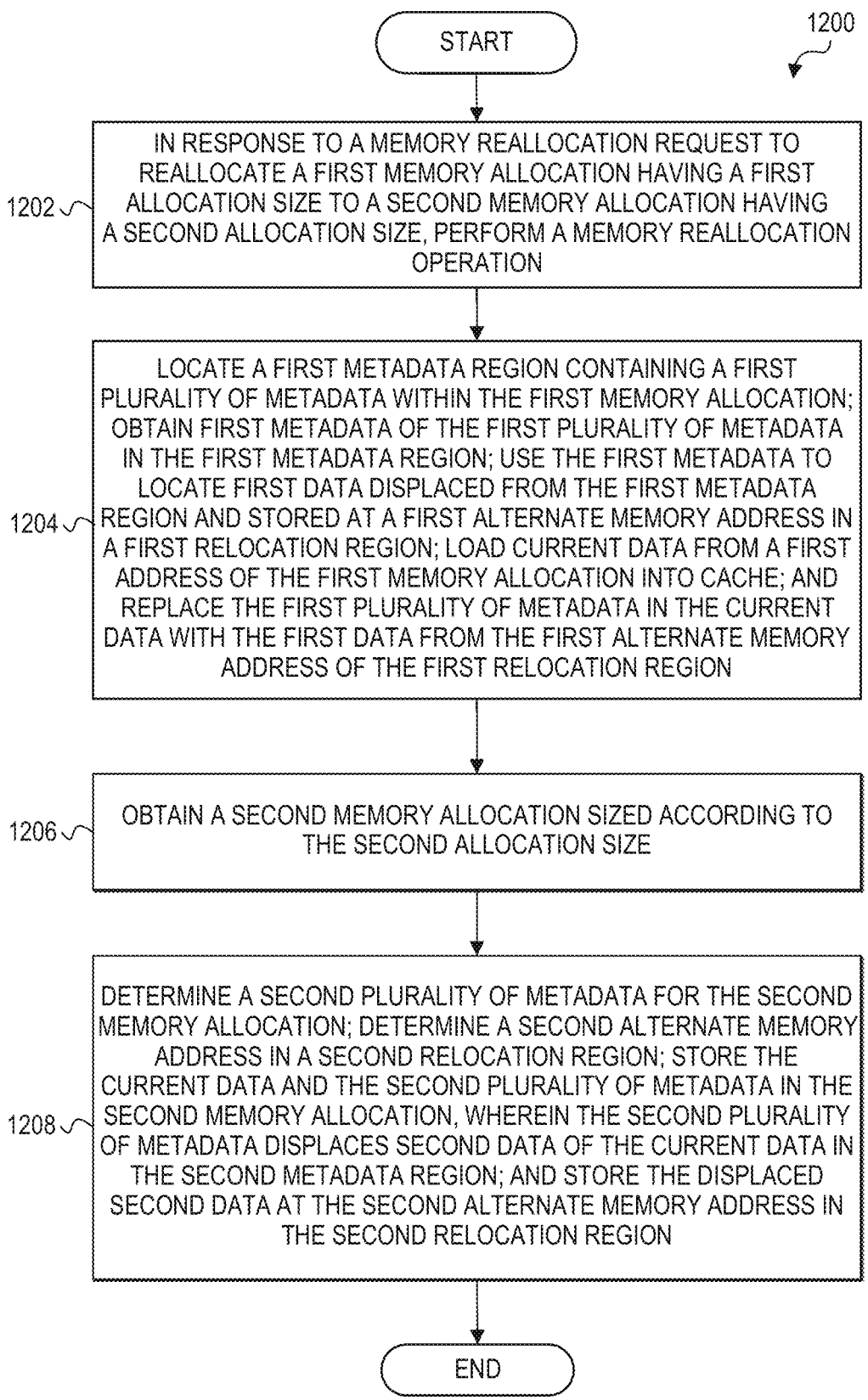
FIG. 12 is a high level flow diagram of an example process of performing a memory reallocation operation according to at least one embodiment.

FIG. 12 is a high level flow diagram of an example process 1200 of performing a memory reallocation in a system with data relocation for inline metadata according to at least one embodiment described herein. In an example, at least some of the operations shown in process 800 may be performed in software, which may be executed by processor circuitry 110, 330, 600. In another example, one or more of the operations shown in process 1200 may be performed in hardware (e.g., processor circuitry 110, 330, 600, and/or memory controller circuitry 120, 334).

At 1202, a memory reallocation request to reallocate a first memory allocation having a first allocation size to a second memory allocation having a second allocation size may correspond to, for example, instructions in a user space application executed at run-time (e.g., C realloc, etc.), instructions compiled at compile time that need static memory (e.g., variables declaration, etc.), or the initiation of loading process by a loader (e.g., implicit memory allocation). In response to the memory reallocation request, various instructions or logic may be executed to perform a memory reallocation operation, which can include one or more operations, at least some of which are shown in process 1200 and will be further described with reference to process 1200. In one example, the instructions or logic to perform the memory allocation may be included in a privileged component, which may be part of an operating system, a trusted execution environment (TEE), a virtual machine, processor circuitry (e.g., 110, 330, 600), a co-processor, or any other suitable hardware, firmware, or software in a computing system (e.g., 100) or securely connected to the computing system. When a memory reallocation operation is performed, an active allocation (first memory allocation) is resized from an original (or first) allocation size to a new (or second) allocation size.

At 1204, a first metadata region containing a first plurality of metadata within the first memory allocation is located. First metadata (e.g., bounds, offset, redirection pointer, index, etc.) of the first plurality of metadata in the first metadata region can be obtained. The first metadata is used to locate first data displaced from the first metadata region and stored at a first alternate memory address in a first relocation region.

An object stored in the first memory allocation is loaded into cache. This can be achieved using an encoded pointer to a memory address at the beginning of the first memory allocation. The encoded pointer can be provided (or otherwise indicated) by the reallocation request. The first plurality of metadata in the object (loaded into cache) can be replaced with the first displaced data from the first alternate memory address of the first relocation region. The first displaced data may be in the same cacheline loaded from memory in some cases. Otherwise, the displaced data can be loaded into cache before replacing the first plurality of metadata in the object loaded into cache.

At 1206, a second (new) memory allocation in the memory circuitry is obtained based on the second allocation size from the reallocation request. In at least one embodiment, the memory reallocation operation may be performed as previously described herein, where the second memory allocation is assigned to a power of two slot, and where a pointer to the allocation is encoded with the power of two size, as shown in FIGS. 2-3, among others. In one scenario, the second memory allocation may begin at the same memory address as the first memory allocation, but the two allocations may be assigned to different slots having different slot sizes. In this case, the second metadata region in the second memory allocation will be located in a different part of the second memory allocation than where the first metadata region was located in the first memory allocation. Thus, the two metadata regions will displace different portions of the same object stored in the first memory allocation and then subsequently stored in the second memory allocation.

At 1208, a second plurality of metadata for the second memory allocation is determined. A second alternate memory address in a second relocation region for the second memory allocation is also determined. Depending on the embodiment, the second relocation region may be included at one of the ends of the second memory allocation, or may be allocated in memory circuitry outside the bounds of the second memory allocation.

At 1208, the object and the second plurality of metadata may be stored in the second memory allocation. The second plurality of metadata displaces second data of the object in the second metadata region of the second memory allocation. The displaced second data is stored at the second alternate memory address in the second relocation region for the second memory allocation. Such reallocation operations can be very efficient as the object does not need to be shifted back and forth during the reallocation, but rather, only the metadata regions need to be manipulated. The first metadata region in the first memory allocation is patched with the displaced data, and the second metadata region in the second allocation is replaced with the new metadata. The data displaced by the new metadata is also relocated to the second relocation region. Thus, reallocation operations can be very efficient. Similarly, for a device performing a direct memory access, only one location needs to be patched to replace the metadata with the original data for direct device access (where devices or drivers do not expect or process the metadata and expect to only see the original data buffer).

It should also be noted that, in at least some embodiments, other metadata may be stored in metadata region such as tag data, and may be used as a security check during memory accesses such as a read or store access. The tag data store in the metadata region (e.g., 740, 760) can be compared to tag data stored in the encoded pointer provided by the memory access request. If they match, then the memory access can proceed. If they do not match, then a fault can be raised, as previously described herein.

Several memory safety checks can be performed in memory check systems with linear inline metadata as disclosed herein. Each time a memory access is attempted, a processor (e.g., 110, 330) and/or memory controller (e.g., 120, 334) can check the access against the stored metadata. The processor computes the mid-point for the allocation slot based on the power field in the encoded pointer (e.g., 180, 280, 310) and the address bits that are constant across the entire allocation slot (e.g., address bits 230, 307). The processor loads the metadata from a metadata region adjacent to the slot mid-point. If the requested memory is entirely on one side of the slot mid-point or the other, then only metadata from that corresponding side of the slot mid-point is loaded. Otherwise, the metadata from the entire metadata region, on both sides of the slot mid-point, is loaded.

In one or more embodiments, at least three different memory safety checks may be performed. A bounds check can be performed to determine whether the requested access is entirely within the bounds specified in the metadata. A tag check can be performed to determine whether the stored tag value matches the tag value in the encoded pointer. A slot check can be performed to determine whether the bounds extend no further than the range of their containing power-of-two-aligned slot. A slot check may be applicable when the slot size is larger than the maximum bounds that can be encoded in the metadata.

If any one of the safety checks indicates a memory safety violation, then a fault may be generated so that the operating system can inject a signal in the process or terminate the process. Different checks can be applied for out of bounds (OOB) violations and use after free (UAF) violations as indicated in Table 1 below, which shows mappings between violation types and the LIM checks that mitigate them. In Table 1, ✓ denotes deterministic protection, P denotes probabilistic or partial protection, X indicates that the check is inapplicable to the particular violation, and superscript numbers denote the relevant principles (discussed further herein) for enabling or strengthening the indicated check. A type of violation is addressed, at least partially, if at least one check detects it deterministically (✓) or probabilistically or partially (P):

TABLE 1

| VIOLATION TYPE | BOUNDS | TAG | SLOT |
|---|---|---|---|
| OOB within original slot | ✓[1] | X | X |
| OOB into adjacent, same-power slot | P[1] | ✓[2] | X |
| OOB into non-adjacent, same-power slot | P[1] | P[3] | X |
| OOB into unassigned slot, may contain data for other powers | P[6] | P[6] | P[6] |
| UAF after metadata invalidated | P[7] | P[7] | ✓[7] |
| UAF after metadata overwritten with data | P[4] | P[4] | P[4] |
| UAF after metadata replaced by new metadata | P[5] | P[5] | X |
| Pointer Forgery | P[6] | P[6] | P[6] |
| Metadata Forgery | P[6] | P[6] | P[6] |

In at least some embodiments, tag and slot assignments and metadata updates and storage can follow certain rules or principles (e.g., denoted by subscript numbers in Table 1) to help maximize efficacy. A first principle (Principle 1) provides that the allocator defines non-overlapping bounds for all allocations, and bounds are as tight as possible. A second principle (Principle 2) provides that different tags can be assigned to adjacent slots with the same slot power. A third principle (Principle 3) provides that, although tag assignments are to be assigned to adjacent slots with the same slot power, tag assignments should otherwise be as unpredictable as possible. A fourth principle (Principle 4) provides that the reuse of an allocation slot across multiple allocation requests can be minimized to prevent stale pointers from referencing an allocation slot after the allocation that the pointer originally referenced has been freed. A fifth principle (Principle 5) provides that even if a slot is reused while a dangling pointer exists, minimizing the reuse of tag values and spacing tag values as far as possible for a given slot can still mitigate such scenarios. A sixth principle (Principle 6) provides that metadata can be encrypted. A seventh principle (Principle 7) provides that optionally, metadata can be invalidated immediately after an allocation is freed.

The multiple checks specified Table 1 can increase the probabilities that some types of memory safety issues will be detected, while others may depend on a single check. For example, a use-after-free (UAF) violation after the same slot was reallocated with an identically sized allocation in the intervening time can depend on Principle 3 for detection. However, if the underlying memory was reallocated as differently sized slots in the intervening time, then interpreting as metadata whatever data is now stored where the metadata was stored for the original allocation could trigger any of the three checks.

Each type of violation can be mitigated either deterministically or probabilistically due to one or more of the distinct types of LIM checks with reference to the applicable principle, as will now be described. An OOB violation within the original slot is an overflow that can be deterministically mitigated due to the bounds within the original slot always being consulted and Principle 1 resulting in the allocator not defining overlapping bounds for allocations.

For an OOB violation into a different, same-power slot, the bounds in the referenced slot may not include the requested addresses. Even if they do cover the requested addresses, the tag in the metadata may differ from the tag in the pointer. According to Principle 2, the tags will differ between adjacent slots.

For an OOB violation into an unassigned slot, even though the slot is unassigned, the underlying referenced data location as well as the corresponding metadata location for the referenced slot may contain data from allocations assigned to other slots. Whatever data happens to exist at the location where metadata would be stored for the referenced slot can be interpreted as metadata. This can cause, with high probability, the access request to be rejected by one or more of the three types of checks.

A UAF violation after metadata is invalidated could be mitigated deterministically by extending the metadata format with a validity bit that could be cleared when the allocation is freed. Checking the validity bit could be a straightforward addition to the slot check. However, even without a validity bit, metadata bounds fields can be set to all ones to deterministically trigger slot checks for most slot sizes. Only the largest slot size for each supported metadata format accepts all possible bounds field encodings. For those slots, the bounds can be zeroed to minimize the amount of data within the slot that is accessible (i.e., eight bytes in each direction from the mid-point). The tag can also be updated to at least not match pointers to the most recent allocation that occupied that slot, although older pointers may still match. To provide determinism for these latter slots, another option besides adding a validity bit in the metadata could be to expand the bounds storage for those slot sizes so that not all bounds encodings are defined. However, dangling pointer accesses to freed objects that have not yet been reallocated are not typically a significant risk to security. Thus, Principle 7 of invalidated metadata when an allocation is freed may be optional.

A UAF violation after metadata is overwritten with data is analogous to an OOB violation into an unassigned slot. Avoiding reuse of the slot (e.g., according to Principle 4) may increase the likelihood of this type of violation compared to a UAF violation after metadata is replaced by new metadata. This is generally preferable since all three types of checks can probabilistically detect this type of violation, whereas only two types of check as applicable to the latter type of violation. The latter type of violation, however, can be detected deterministically by the tag check as long as tag values are not reused within the slot. Thus, in some cases, Principle 5 may be emphasized more than Principle 4.

A UAF violation after metadata is replaced by new metadata may occur when a slot is reused while a dangling pointer exists. A tag can mitigate such scenarios. Principle 5 dictates that tag reuse should be minimized to increase the effectiveness of the tag as a mitigation. Bounds checks can also help to mitigate this type of violation. The invalid access may be outside the bounds of the new allocation in the slot. The bounds should be set tightly in accordance with Principle 1.

Pointer forgery can be attempted when an adversary knows the address of the targeted memory and can generate power and tag field values that match the contents of the metadata location for the targeted memory. Metadata encryption makes it highly unlikely to be successful.

Metadata forgery may be attempted by an adversary with access to an allocation that overlaps a potential metadata region for a more expansive allocation slot in order to grant access to the expansive allocation slot. In this scenario, the adversary could attempt to forge a pointer that references the forged metadata. Even if the adversary only has access to metadata regions for smaller slots, they may still be able to expand their bounds. Metadata encryption, as provided in Principle 6, can mitigate this threat since the key is hidden from the adversary. Typical memory encryption techniques can be applied selectively to the metadata, albeit with support for multiple, smaller block sizes or suitable modes matching the metadata formats, and at the linear memory level and in caches. The metadata encryption (e.g., block cipher for a small block size) can be hidden from adversaries (e.g., managed by the operating system), and newly assigned for each new process during execution. Some lightweight block ciphers with low latency could even be hidden by proceeding with the access pending the metadata check.

Reserving and initializing inline metadata is performed by memory allocators. Adequate linear address space needs to be reserved to fit the allocation and the linear inline metadata contained within it. Linear inline metadata needs to be initialized when memory is allocated and invalidated when the allocation is being freed.

A memory allocator can bypass linear inline metadata security checks when accessing linear inline metadata or its own metadata in linear memory directly, e.g., using specialized instructions. Code outside of the memory allocator is assumed to be initially benign, such that it would not contain instructions that can bypass linear inline metadata checks.

It is possible to supply metadata for accessing stack and global regions without storing and checking bounds and tags for individual allocations in those regions. For example, separate linear inline metadata-controlled slots can be defined to cover each thread's stack and another slot to cover the text (code) and global regions. A stack pointer register (RSP) can specify the power of the slot for the current thread's stack and an instruction pointer register (RIP) can specify the power of the slot for the text and global regions. This would block pointers to stack and global regions from being redirected out of their respective regions.

Linear inline metadata with data relocation can support large address spaces. Linear inline metadata can shrink or eliminate the tag field in encoded pointers to work even with paging modes that define large linear address space sizes requiring more address bits than would fit with the full tag field. For example, a five-level paging mode that requires 57 address bits can be supported in this way. However, the encoded pointer format can remain fixed throughout the program, since the entire program may use the same paging mode. Both spatial and temporal safety violations can still be mitigated even if the tag is narrowed or removed, as in-scope vulnerabilities are dependent on other checks as well.

Individual stack and global allocations can also be protected using linear inline metadata with data relocation. For example, stack and global allocations can be expanded to fit linear inline metadata and data that is displaced by the metadata. Such programs could be recompiled, e.g., to change the way that the stack pointer is updated, to initialize encoded pointers to stack and global allocations with the correct slot power and tag and to initialize linear inline metadata in stack and global allocations.

It should be further noted that in addition to metadata that is used to enforce spatial and temporal memory safety (e.g., tags and bounds metadata), other types of metadata may be incorporated into metadata stored in a metadata region defined at a mid-point of a slot. These other types of metadata may record various arbitrary information about each allocation and be sized to still fit within the allocation.

Cache coherence and atomicity can also be addressed with embodiments described herein. Metadata is updated as part of its containing allocation, so concurrency is handled with no need for locked metadata accesses. This is in contrast to other potential approaches that may store metadata for multiple allocations in a single byte (assuming that a byte is the smallest addressable unit of memory) and hence require a locked access to update metadata for just one of the allocations.

Cache coherency for displaced data on a different cacheline is similar to ordinary accesses that cross multiple cachelines. Software can use locks where atomicity is required, and those locks can be enforced across cacheline boundaries. Additionally, displaced data is not aliased. Applications may only access the same amount of data per-allocation as they would access without LIM.

Example Architectures

Figure 13:
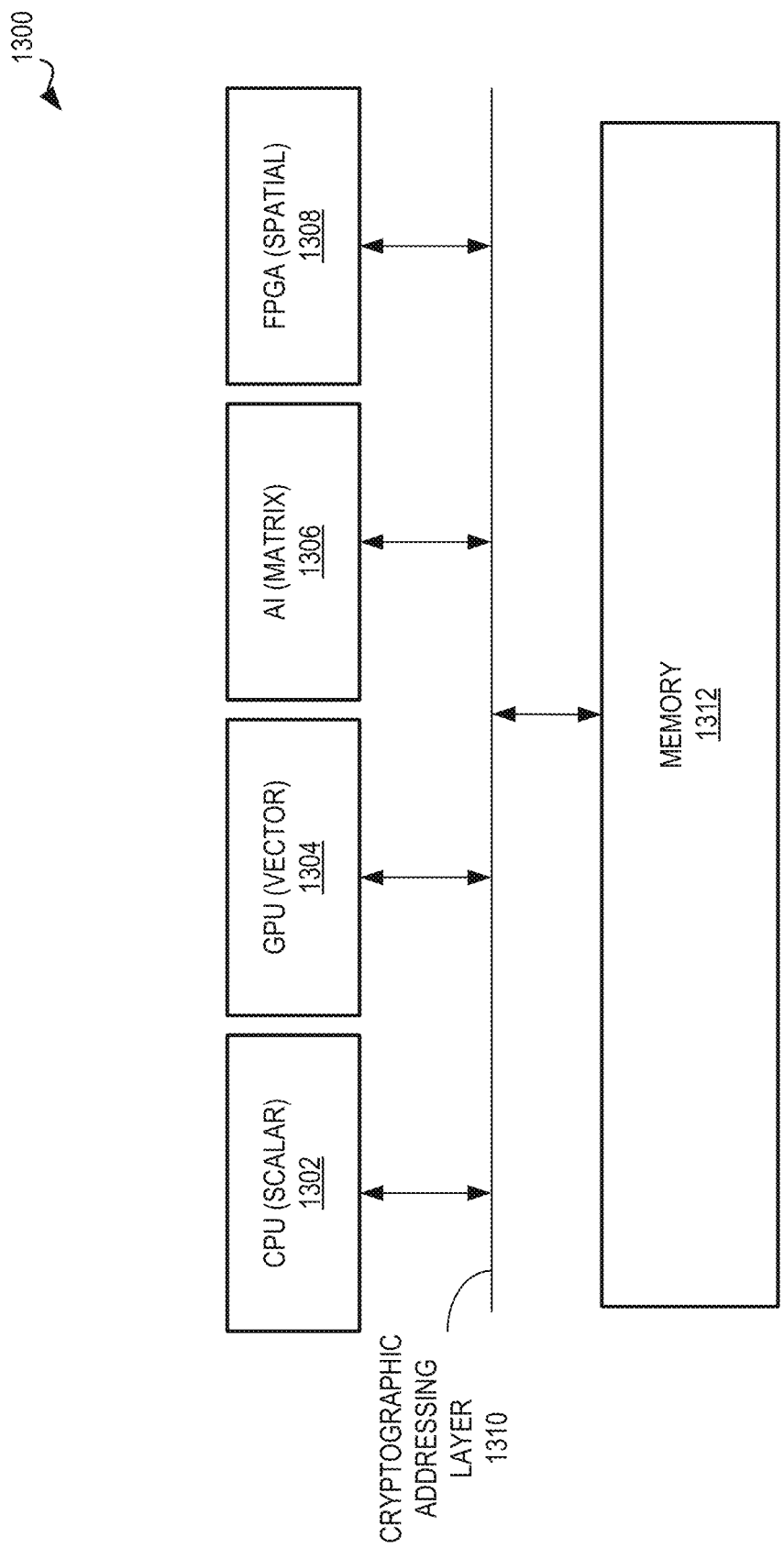
FIG. 13 is a block diagram illustrating an example cryptographic computing environment according to at least one embodiment.

FIG. 13 is a block diagram illustrating an example cryptographic computing environment 1300 according to at least one embodiment. In the example shown, a cryptographic addressing layer 1310 extends across the example compute vectors central processing unit (CPU) 1302, graphical processing unit (GPU) 1304, artificial intelligence (AI) 1306, and field programmable gate array (FPGA) 1308. For example, the CPU 1302 and GPU 1304 may share the same virtual address translation for data stored in memory 1312, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 1312 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 14:
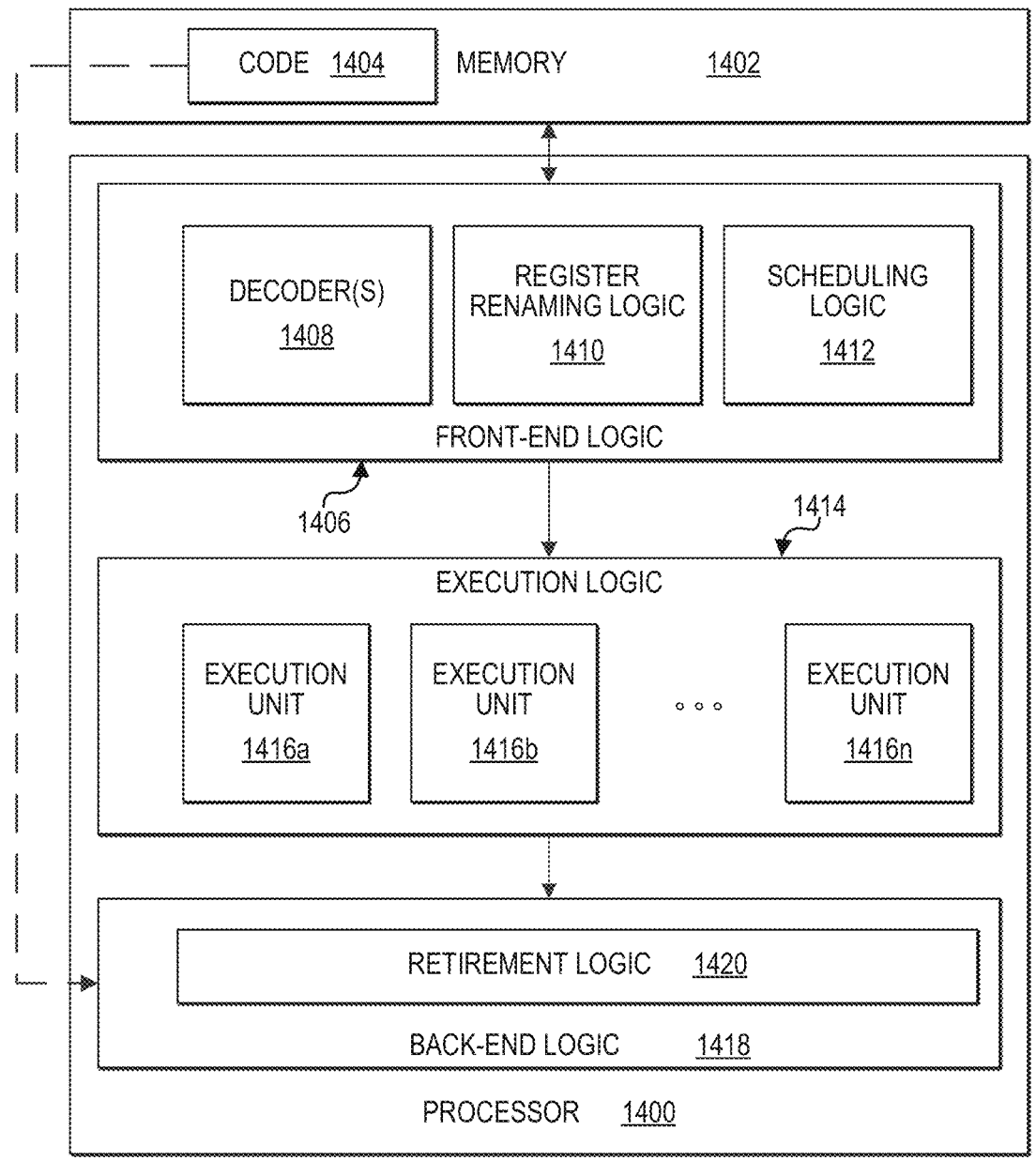
FIG. 14 is a block diagram illustrating an example processor core and memory according to at least one embodiment.
Figure 15:
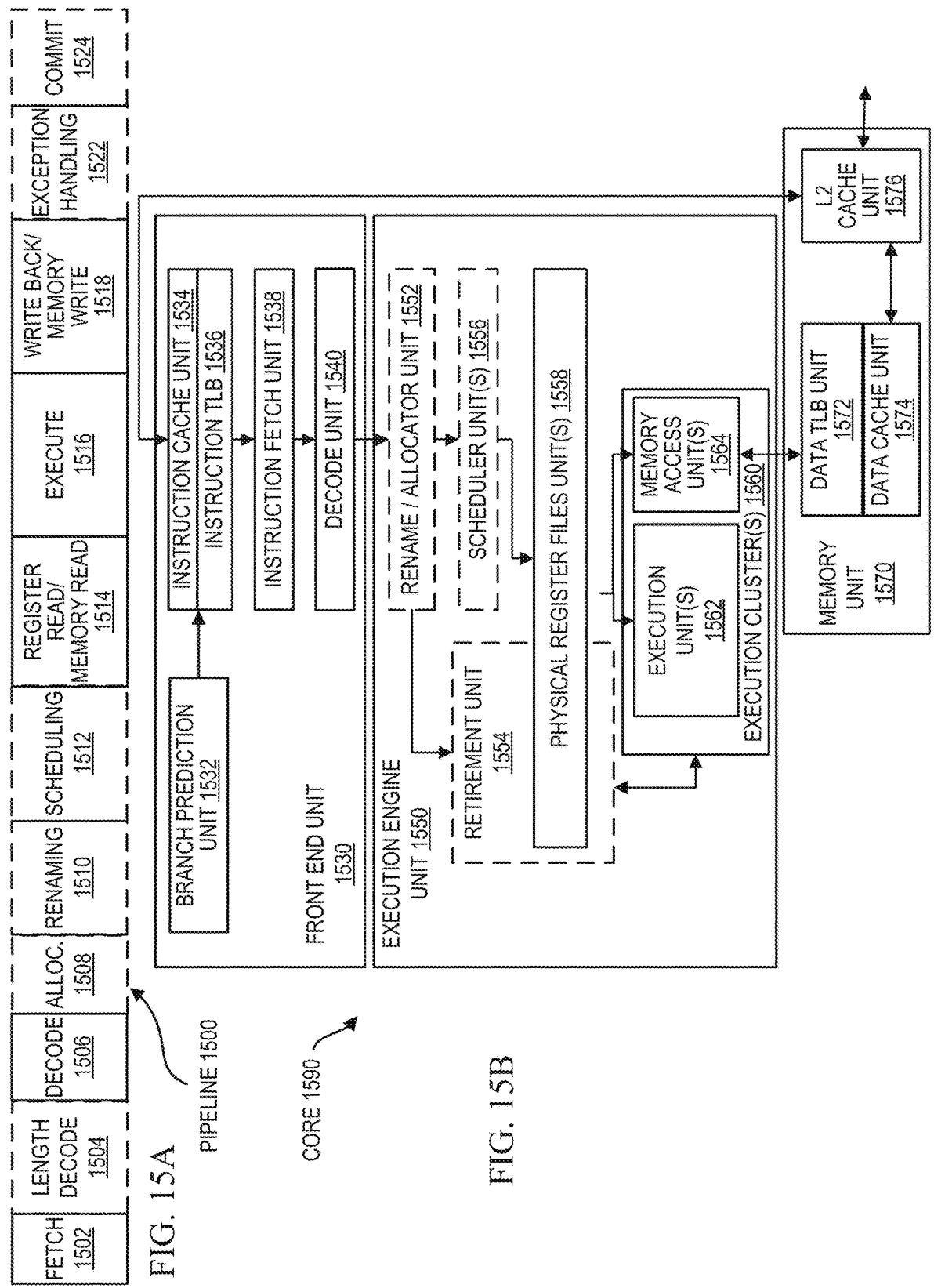
FIG. 15A is a block diagram illustrating both an exemplary in-order pipeline and an exemplary register renaming, out-of-order issue/execution pipeline in accordance with certain embodiments.
FIG. 15B is a block diagram illustrating both an exemplary embodiment of an in-order architecture core and an exemplary register renaming, out-of-order issue/execution architecture core to be included in a processor in accordance with certain embodiments.
Figure 16:
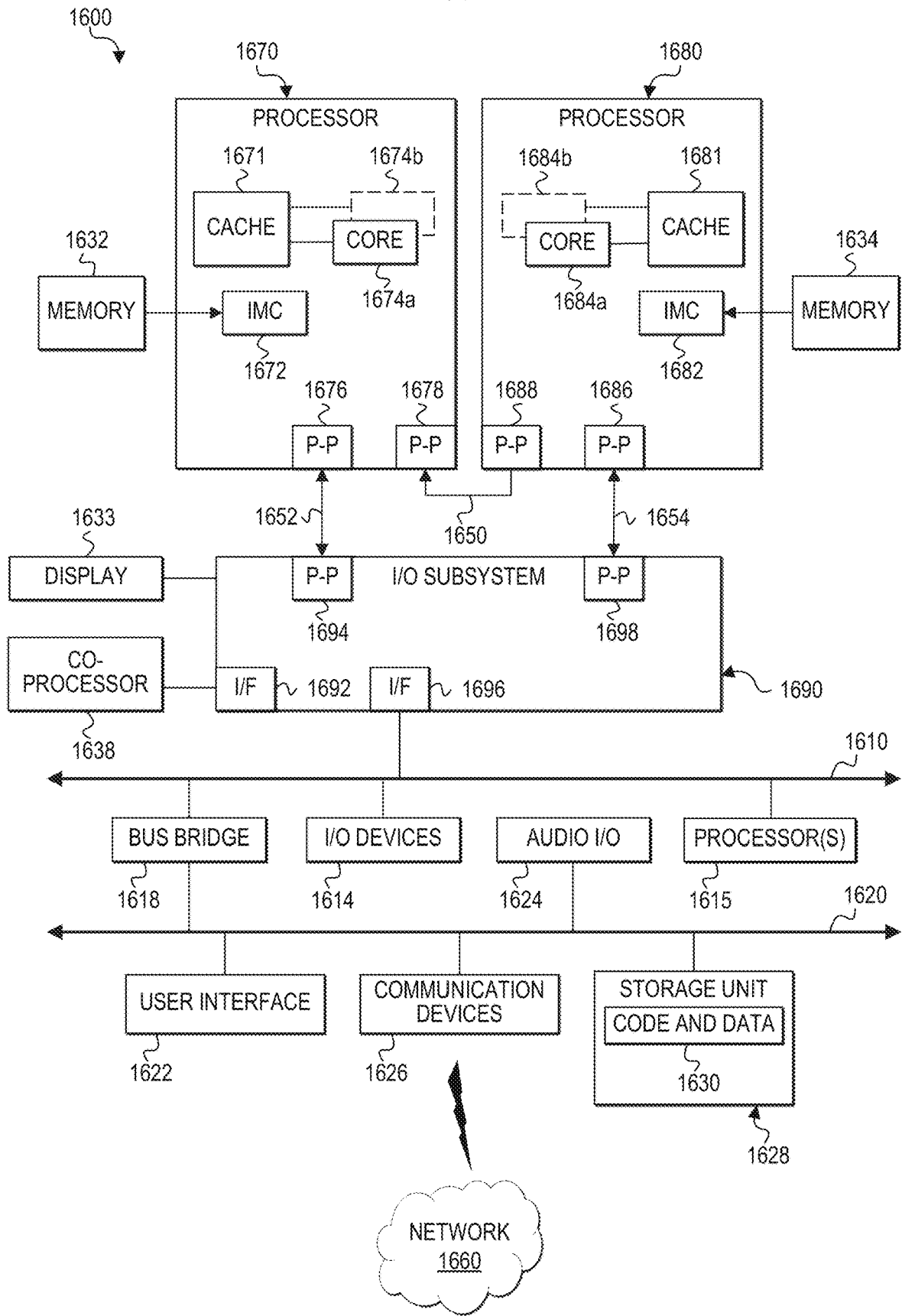
FIG. 16 is a block diagram of an example computer architecture according to at least one embodiment.

FIGS. 14-16 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 14-16.

FIG. 14 is an example illustration of a processor according to an embodiment. Processor 1400 is an example of a type of hardware device that can be used in connection with the implementations shown and described herein (e.g., processor circuitry 110, 330, 600). Processor 1400 may be any type of processor, such as a microprocessor, an embedded processor, a digital signal processor (DSP), a network processor, a multi-core processor, a single core processor, or other device to execute code. Although only one processor 1400 is illustrated in FIG. 14, a processing element may alternatively include more than one of processor 1400 illustrated in FIG. 14. Processor 1400 may be a single-threaded core or, for at least one embodiment, the processor 1400 may be multi-threaded in that it may include more than one hardware thread context (or "logical processor") per core.

FIG. 14 also illustrates a memory 1402 coupled to processor 1400 in accordance with an embodiment. Memory 1402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1400 can execute any type of instructions associated with algorithms, processes, or operations detailed herein. Generally, processor 1400 can transform an element or an article (e.g., data) from one state or thing to another state or thing.

Code 1404, which may be one or more instructions to be executed by processor 1400, may be stored in memory 1402, or may be stored in software, hardware, firmware, or any suitable combination thereof, or in any other internal or external component, device, element, or object where appropriate and based on particular needs. In one example, processor 1400 can follow a program sequence of instructions indicated by code 1404. Each instruction enters a front-end logic 1406 and is processed by one or more decoders 1408. The decoder may generate, as its output, a micro operation such as a fixed width micro operation in a predefined format, or may generate other instructions, microinstructions, or control signals that reflect the original code instruction. Front-end logic 1406 also includes register renaming logic 1410 and scheduling logic 1412, which generally allocate resources and queue the operation corresponding to the instruction for execution.

Processor 1400 can also include execution logic 1414 having a set of execution units 1416a, 1416b, 1416n, etc. Some embodiments may include a number of execution units dedicated to specific functions or sets of functions. Other embodiments may include only one execution unit or one execution unit that can perform a particular function. Execution logic 1414 performs the operations specified by code instructions.

After completion of execution of the operations specified by the code instructions, back-end logic 1418 can retire the instructions of code 1404. In one embodiment, processor 1400 allows out of order execution but requires in order retirement of instructions. Retirement logic 1420 may take a variety of known forms (e.g., re-order buffers or the like). In this manner, processor 1400 is transformed during execution of code 1404, at least in terms of the output generated by the decoder, hardware registers and tables utilized by register renaming logic 1410, and any registers (not shown) modified by execution logic 1414.

Although not shown in FIG. 14, a processing element may include other elements on a chip with processor 1400. For example, a processing element may include memory control logic along with processor 1400. The processing element may include I/O control logic and/or may include I/O control logic integrated with memory control logic. The processing element may also include one or more caches. In some embodiments, non-volatile memory (such as flash memory or fuses) may also be included on the chip with processor 1400.

FIG. 15A is a block diagram illustrating both an exemplary in-order pipeline and an exemplary register renaming, out-of-order issue/execution pipeline according to one or more embodiments of this disclosure. FIG. 15B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 15A-15B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. Processor core 1590 and memory unit 1570 are examples of the types of hardware that can be used in connection with the implementations shown and described herein (e.g., processor circuitry 110, 330, 600, memory controller circuitry 120, 334, memory circuitry 130, cache circuitry 112). The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like. In addition, processor core 1590 and its components represent example architecture that could be used to implement logical processors and their respective components.

The front end unit 1530 includes a branch prediction unit 1532 coupled to an instruction cache unit 1534, which is coupled to an instruction translation lookaside buffer (TLB) unit 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers (GPRs). In at least some embodiments described herein, register file(s) units 1558 are examples of the types of hardware that can be used in connection with the implementations shown and described herein (e.g., system 100). The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1562 may also include an address generation unit (e.g., 822) to calculate addresses used by the core to access main memory (e.g., memory unit 1570) and a page miss handler (PMH) (e.g., 826).

The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory. In addition, a page miss handler (e.g., page miss handler 826) may also be included in core 1590 to look up an address mapping in a page table if no match is found in the data TLB unit 1572.

By way of example, the exemplary register renaming, out-of-order issue/execution core architecture may implement the pipeline 1500 as follows: 1) the instruction fetch unit 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 16 illustrates a computing system 1600 that is arranged in a point-to-point (PtP) configuration according to an embodiment. In particular, FIG. 16 shows a system where processors, memory, and input/output devices are interconnected by a number of point-to-point interfaces. Generally, one or more of the computing systems or computing devices described herein (e.g., system 100) may be configured in the same or similar manner as computing system 1600.

Processors 1670 and 1680 may be implemented as single core processors 1674a and 1684a or multi-core processors 1674a-1674b and 1684a-1684b. Processors 1670 and 1680 may each include a cache 1671 and 1681 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1600. Moreover, processors 1670 and 1680 are examples of the types of hardware that can be used in connection with the implementations shown and described herein (e.g., processor circuitry 110, 330, 600).

Processors 1670 and 1680 may also each include integrated memory controller logic (MC) 1672 and 1682 to communicate with memory elements 1632 and 1634, which may be portions of main memory locally attached to the respective processors. In alternative embodiments, memory controller logic 1672 and 1682 may be discrete logic separate from processors 1670 and 1680. Memory elements 1632 and/or 1634 may store various data to be used by processors 1670 and 1680 in achieving operations and functionality outlined herein.

Processors 1670 and 1680 may be any type of processor, such as those discussed in connection with other figures. Processors 1670 and 1680 may exchange data via a point-to-point (PtP) interface 1650 using point-to-point interface circuits 1678 and 1688, respectively. Processors 1670 and 1680 may each exchange data with an input/output (I/O) subsystem 1690 via individual point-to-point interfaces 1652 and 1654 using point-to-point interface circuits 1676, 1686, 1694, and 1698. I/O subsystem 1690 may also exchange data with a high-performance graphics circuit 1638 via a high-performance graphics interface 1639, using an interface circuit 1692, which could be a PtP interface circuit. In one embodiment, the high-performance graphics circuit 1638 is a special-purpose processor, such as, for example, a high-throughput MIC processor, a network or communication processor, compression engine, graphics processor, GPGPU, embedded processor, or the like. I/O subsystem 1690 may also communicate with a display 1633 for displaying data that is viewable by a human user. In alternative embodiments, any or all of the PtP links illustrated in FIG. 16 could be implemented as a multi-drop bus rather than a PtP link.

I/O subsystem 1690 may be in communication with a bus 1610 via an interface circuit 1696. Bus 1610 may have one or more devices that communicate over it, such as a bus bridge 1618, I/O devices 1614, and one or more other processors 1615. Via a bus 1620, bus bridge 1618 may be in communication with other devices such as a user interface 1622 (such as a keyboard, mouse, touchscreen, or other input devices), communication devices 1626 (such as modems, network interface devices, or other types of communication devices that may communicate through a computer network 1660), audio I/O devices 1624, and/or a data storage device 1628. Data storage device 1628 may store code and data 1630, which may be executed by processors 1670 and/or 1680. In alternative embodiments, any portions of the bus architectures could be implemented with one or more PtP links.

Program code, such as code 1630, may be applied to input instructions to perform the functions described herein and generate output information. The output information may be applied to one or more output devices, in known fashion. For purposes of this application, a processing system may be part of computing system 1600 and includes any system that has a processor, such as, for example; a digital signal processor (DSP), a microcontroller, an application specific integrated circuit (ASIC), or a microprocessor.

The program code (e.g., 1630) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 16 is a schematic illustration of an embodiment of a computing system that may be utilized to implement various embodiments discussed herein. It will be appreciated that various components of the system depicted in FIG. 16 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
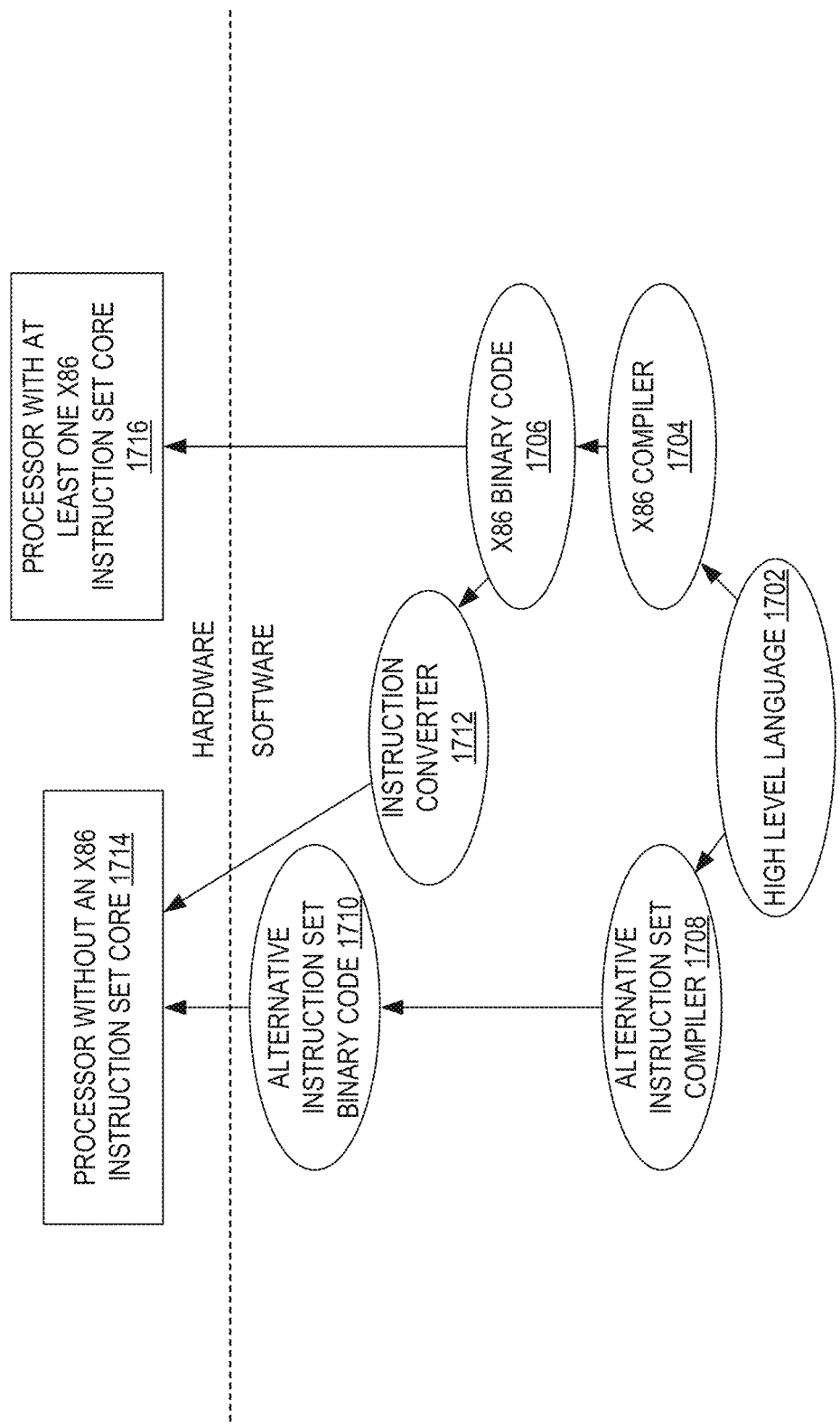
FIG. 17 is a block diagram contrasting the use of a software instruction converter to convert binary instructions in a source instruction set to binary instructions in a target instruction set according to embodiments of the present disclosure.

FIG. 17 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Furthermore, the words "optimize," "optimization," "optimizing," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The following examples pertain to embodiments in accordance with this specification. The system, apparatus, method, and machine readable storage medium embodiments can include one or a combination of the following examples:

Example A1 provides a system or apparatus, comprising processor circuitry to be communicatively coupled to a memory circuitry. The processor circuitry is to receive a memory access request corresponding to an application for access to an address range in a memory allocation of the memory circuitry and locate a metadata region within the memory allocation. The processor circuitry is further to, in response to a determination that the address range includes at least a portion of the metadata region: obtain first metadata stored in the metadata region, use the first metadata to determine an alternate memory address in a relocation region, and read, at the alternate memory address, displaced data from the portion of the metadata region included in the address range in the memory allocation.

Example A2 comprises the subject matter of Example A1, and the address range includes one or more bytes of an expected allocation region of the memory allocation.

Example A3 comprises the subject matter of any one of Examples A1-A2, and the relocation region is located at an end portion of the memory allocation, at a beginning portion of the memory allocation, or in an area of the memory circuitry outside the memory allocation.

Example A4 comprises the subject matter of any one of Examples A1-A3, and the first metadata stored in the metadata region includes upper bound information that indicates an upper boundary of the memory allocation or lower bound information that indicates a lower boundary of the memory allocation.

Example A5 comprises the subject matter of Example A4, and the relocation region is located within the memory allocation and is aligned with one of the upper boundary of the memory allocation or the lower boundary of the memory allocation.

Example A6 comprises the subject matter of any one of Examples A4-A5, and the upper boundary is aligned with an upper 8-byte boundary at an end of the memory allocation and the lower boundary is aligned with a lower 8-byte boundary at a beginning of the memory allocation.

Example A7 comprises the subject matter of any one of Examples A1-A6, and to locate the metadata region within the memory allocation is to include determining a second memory address of the metadata region based on address bits in an encoded pointer associated with the memory access request, size metadata in the encoded pointer, and a size of the metadata region, and the metadata region is divided at a mid-point address of a slot of the memory circuitry to which the memory allocation is assigned.

Example A8 comprises the subject matter of Example A7, and the size metadata in the encoded pointer represents a power of two size of a slot of the memory circuitry to which the memory allocation is assigned.

Example A9 comprises the subject matter of any one of Examples A1-A3, and the first metadata is one of upper bound information that indicates an upper boundary of the memory allocation, lower bound information that indicates a lower boundary of the memory allocation, an offset to the relocation region from a mid-point address of a slot of the memory circuitry to which the memory allocation is assigned, a pointer to the relocation region, or an index to the relocation region.

Example A10 comprises the subject matter of any one of Examples A1-A9, and the processor circuitry is further to: in response to a memory allocation request to allocate the memory circuitry based on a first allocation size, perform a memory allocation operation including, increasing the first allocation size to an increased memory allocation size based on metadata to be stored in the metadata region of the memory allocation, obtaining the memory allocation based on the increased memory allocation size, and storing the first metadata in the metadata region.

Example A11 comprises the subject matter of Example A10, and the processor circuitry is further to receive a memory store request corresponding to the application to store first data in the address range of the memory allocation, identify at least a first portion of the first data to be displaced from the metadata region, and store the first portion of the first data as the displaced data at the alternate memory address in the relocation region.

Example A12 comprises the subject matter of any one of Examples A1-A9, and the processor circuitry is further to, in response to a memory allocation request to allocate the memory circuitry based on a first allocation size, perform a memory allocation operation including, obtaining the memory allocation based on the first allocation size, obtaining the relocation region outside the memory allocation, generating a redirection pointer to the relocation region, and storing the redirection pointer in the metadata region.

Example A13 comprises the subject matter of Example A12, and the processor circuitry is further to receive a memory store request corresponding to the application to store first data in the address range of the memory allocation, identify a at least a first portion of the first data to be displaced from the metadata region, and use the redirection pointer to store the first portion of the first data as the displaced data at the alternate memory address in the relocation region.

Example A14 comprises the subject matter of any one of Examples A1-A13, and the processor circuitry is further to, in response to a memory reallocation request to reallocate the memory allocation based on a different allocation size, perform a memory reallocation operation including: obtaining a second memory allocation based on the different allocation size, determining second metadata for the second memory allocation, locating a second metadata region within the second memory allocation, determining a second alternate memory address in a second relocation region, storing the second metadata in the second metadata region of the second memory allocation where the second metadata is to displace fourth data from the second metadata region, and storing the fourth data at the second alternate memory address in the second relocation region.

Example A15 comprises the subject matter of any one of Examples A1-A14, and the processor circuitry is further to in response to a determination that a beginning memory address of the address range is located prior to the metadata region, access second data prior to the metadata region based on the beginning memory address of the address range, and generate reassembled data corresponding to the address range by concatenating at least the displaced data and the second data.

Example A16 comprises the subject matter of any one of Examples A1-A14, and the processor circuitry is further to, in response to a determination that the address range extends beyond the metadata region, access third data based on a third memory address immediately succeeding the metadata region, and generate reassembled data corresponding to the address range by concatenating at least the displaced data and the third data.

Example A17 comprises the subject matter of any one of Examples A1-A16, and the memory circuitry is to include a metadata cache indexed by a metadata cache set index and a data cache indexed by a data cache set index, and the processor circuitry is further to search the metadata cache using the metadata cache set index to obtain the first metadata and search the data cache using the data cache set index to obtain the displaced data.

Example A18 comprises the subject matter of Example A17, and the metadata cache set index is to be calculated using a number of higher order bits in a second memory address of the metadata region.

Example A19 comprises the subject matter of any one of Examples A1-A18, and the processor circuitry is further to obtain, from a translation lookaside buffer, a translated memory address corresponding to a beginning memory address of the address range, and in response to a determination that the address range and the metadata region are co-located on a memory page, use the translated memory address to calculate another translated memory address of the metadata region.

Example A20 comprises the subject matter of any one of Examples A1-A19, and the processor circuitry includes memory controller circuitry.

Example C1 provides a machine-readable storage medium that includes instructions that, when executed by first circuitry that includes a processor and a memory controller, cause the first circuitry to perform operations. The operations comprise receiving a memory access request corresponding to an application for access to an address range in a memory allocation of a memory circuitry and locating a metadata region within the memory allocation. The operations further comprise, in response to a determination that the address range includes at least a portion of the metadata region, obtaining first metadata stored in the metadata region, determining an alternate memory address in a relocation region, the determining based, at least in part, on the first metadata, and reading, at the alternate memory address, displaced data from the portion of the metadata region included in the address range in the memory allocation.

Example C2 comprises the subject matter of Example C1, and the address range includes one or more bytes of an expected allocation region of the memory allocation.

Example C3 comprises the subject matter of any one of Examples C1-C2, and the relocation region is located at an end portion of the memory allocation, at a beginning portion of the memory allocation, or in an area of the memory circuitry outside the memory allocation.

Example C4 comprises the subject matter of any one of Examples C1-C3, and the first metadata stored in the metadata region includes upper bound information that indicates an upper boundary of the memory allocation or lower bound information that indicates a lower boundary of the memory allocation.

Example C5 comprises the subject matter of Example C4, and the relocation region is located within the memory allocation and is aligned with one of the upper boundary of the memory allocation or the lower boundary of the memory allocation.

Example C6 comprises the subject matter of any one of Examples C4-C5, and the upper boundary is aligned with an upper 8-byte boundary at an end of the memory allocation and the lower boundary is aligned with a lower 8-byte boundary at a beginning of the memory allocation.

Example C7 comprises the subject matter of any one of Examples C1-C6, and the locating the metadata region within the memory allocation is to include determining a second memory address of the metadata region based on address bits in an encoded pointer associated with the memory access request, size metadata in the encoded pointer, and a size of the metadata region, and the metadata region is divided at a mid-point address of a slot of the memory circuitry to which the memory allocation is assigned.

Example C8 comprises the subject matter of Example C7, and the size metadata in the encoded pointer represents a power of two size of a slot of the memory circuitry to which the memory allocation is assigned.

Example C9 comprises the subject matter of any one of Examples C1-C3, and the first metadata is one of upper bound information that indicates an upper boundary of the memory allocation, lower bound information that indicates a lower boundary of the memory allocation, an offset to the relocation region from a mid-point address of a slot of the memory circuitry to which the memory allocation is assigned, a pointer to the relocation region, or an index to the relocation region.

Example C10 comprises the subject matter of any one of Examples C1-C9, and the operations further comprising, in response to a memory allocation request to allocate the memory circuitry based on a first allocation size, performing a memory allocation operation including: increasing the first allocation size to an increased memory allocation size based on metadata to be stored in the metadata region of the memory allocation, obtaining the memory allocation based on the increased memory allocation size, and storing the first metadata in the metadata region.

Example C11 comprises the subject matter of Example C10, and the operations further comprising receiving a memory store request corresponding to the application to store first data in the address range of the memory allocation, identifying at least a first portion of the first data to be displaced from the metadata region, and storing the first portion of the first data as the displaced data at the alternate memory address in the relocation region.

Example C12 comprises the subject matter of any one of Examples C1-C9, and the operations further comprising, in response to a memory allocation request to allocate the memory circuitry based on a first allocation size, performing a memory allocation operation including: obtaining the memory allocation based on the first allocation size, obtaining the relocation region outside the memory allocation, generating a redirection pointer to the relocation region, and storing the redirection pointer in the metadata region.

Example C13 comprises the subject matter of Example C12, and the operations further including receiving a memory store request corresponding to the application to store first data in the address range of the memory allocation, identifying a at least a first portion of the first data to be displaced from the metadata region, and using the redirection pointer to store the first portion of the first data as the displaced data at the alternate memory address in the relocation region.

Example C14 comprises the subject matter of any one of Examples C1-C13, and the operations further comprising, in response to a memory reallocation request to reallocate the memory allocation based on a different allocation size, performing a memory reallocation operation including: obtaining a second memory allocation based on the different allocation size, determining second metadata for the second memory allocation, locating a second metadata region within the second memory allocation, determining a second alternate memory address in a second relocation region, storing the second metadata in the second metadata region of the second memory allocation and the second metadata is to displace fourth data from the second metadata region, and storing the fourth data at the second alternate memory address in the relocation region.

Example C15 comprises the subject matter of any one of Examples C1-C14, and the operations further comprising, in response to a determination that a beginning memory address of the address range is located prior to the metadata region, accessing second data prior to the metadata region based on the beginning memory address of the address range, and generating reassembled data corresponding to the address range by concatenating at least the second data and the displaced data.

Example C16 comprises the subject matter of any one of Examples C1-C14, and the operations further comprising, in response to a determination that the address range extends beyond the metadata region, accessing third data based on a third memory address immediately succeeding the metadata region, and generating reassembled data corresponding to the address range by concatenating at least the displaced data and the third data.

Example C17 comprises the subject matter of any one of Examples C1-C16, and the operations further comprising searching a metadata cache using a metadata cache set index to obtain the first metadata and searching a data cache using a data cache set index to obtain the displaced data.

Example C18 comprises the subject matter of Example C17, and the metadata cache set index is to be calculated using a number of higher order bits in a second memory address of the metadata region.

Example C19 comprises the subject matter of any one of Examples C1-C18, and the operations further comprising obtaining, from a translation lookaside buffer, a translated memory address corresponding to a beginning memory address of the address range and, in response to a determination that the address range and the metadata region are co-located on a memory page, using the translated memory address to calculate another translated memory address of the metadata region.

Example C20 comprises the subject matter of any one of Examples C1-C19, and the memory controller is integrated with the processor.

Example M1 provides a method comprising receiving, via first circuitry including a processor and a memory controller, a memory access request corresponding to an application for access to an address range in a memory allocation of a memory coupled to the first circuitry and locating a metadata region within the memory allocation. The method also comprises, in response to determining that the address range includes at least a portion of the metadata region, obtaining first metadata stored in the metadata region, determining an alternate memory address in a relocation region where the determining is based, at least in part, on the first metadata, and reading, at the alternate memory address, displaced data from the portion of the metadata region included in the address range.

Example M2 comprises the subject matter of Example M1, and the address range includes one or more bytes of an expected allocation region of the memory allocation.

Example M3 comprises the subject matter of any one of Examples M1-M2, and the relocation region is located at an end portion of the memory allocation, at a beginning portion of the memory allocation, or in an area of the memory outside the memory allocation.

Example M4 comprises the subject matter of any one of Examples M1-M3, and the first metadata stored in the metadata region includes upper bound information that indicates an upper boundary of the memory allocation or lower bound information that indicates a lower boundary of the memory allocation.

Example M5 comprises the subject matter of Example M4, and the relocation region is located within the memory allocation and is aligned with one of the upper boundary of the memory allocation or the lower boundary of the memory allocation.

Example M6 comprises the subject matter of any one of Examples M4-M5, and the upper boundary is aligned with an upper 8-byte boundary at an end of the memory allocation and the lower boundary is aligned with a lower 8-byte boundary at a beginning of the memory allocation.

Example M7 comprises the subject matter of any one of Examples M1-M6, and the locating the metadata region within the memory allocation includes determining a second memory address of the metadata region based on address bits in an encoded pointer associated with the memory access request, size metadata in the encoded pointer, and a size of the metadata region, and the metadata region is divided at a mid-point address of a slot of the memory to which the memory allocation is assigned.

Example M8 comprises the subject matter of Example M7, and the size metadata in the encoded pointer represents a power of two size of a slot of the memory to which the memory allocation is assigned.

Example M9 comprises the subject matter of any one of Examples M1-M3, and the first metadata is one of upper bound information that indicates an upper boundary of the memory allocation, lower bound information that indicates a lower boundary of the memory allocation, an offset to the relocation region from a mid-point address of a slot of the memory to which the memory allocation is assigned, a pointer to the relocation region, or an index to the relocation region.

Example M10 comprises the subject matter of any one of Examples M1-M9, and further comprises, in response to a memory allocation request to allocate the memory based on a first allocation size, performing a memory allocation operation including: increasing the first allocation size to an increased memory allocation size based on metadata to be stored in the metadata region of the memory allocation, obtaining the memory allocation based on the increased memory allocation size, and storing the first metadata in the metadata region.

Example M11 comprises the subject matter of Example M10, and further comprises receiving a memory store request corresponding to the application to store first data in the address range of the memory allocation, identifying at least a first portion of the first data to be displaced from the metadata region, and storing the first portion of the first data as the displaced data at the alternate memory address in the relocation region.

Example M12 comprises the subject matter of any one of Examples M1-M9, and further comprises, in response to a memory allocation request to allocate the memory circuitry based on a first allocation size, performing a memory allocation operation including obtaining the memory allocation based on the first allocation size, obtaining the relocation region outside the memory allocation, generating a redirection pointer to the relocation region, and storing the redirection pointer in the metadata region.

Example M13 comprises the subject matter of Example M12, and further comprises receiving a memory store request corresponding to the application to store first data in the address range of the memory allocation, identifying a at least a first portion of the first data to be displaced from the metadata region, and using the redirection pointer to store the first portion of the first data as the displaced data at the alternate memory address in the relocation region.

Example M14 comprises the subject matter of any one of Examples M1-M13, and further comprises, in response to a memory reallocation request to reallocate the memory allocation based on a different allocation size, performing a memory reallocation operation including: obtaining a second memory allocation based on the different allocation size, determining second metadata for the second memory allocation, locating a second metadata region within the second memory allocation, determining a second alternate memory address in a second relocation region, storing the second metadata in the second metadata region of the second memory allocation, where the second metadata displaces fourth data from the metadata region, and storing the fourth data at the second alternate memory address in the relocation region.

Example M15 comprises the subject matter of any one of Examples M1-M14, and further comprises, in response to determining that a beginning memory address of the address range is located prior to the metadata region, accessing second data prior to the metadata region based on the beginning memory address of the address range, and generating reassembled data corresponding to the address range by concatenating at least the second data and the displaced data.

Example M16 comprises the subject matter of any one of Examples M1-M14, and further comprises, in response to determining that the address range extends beyond the metadata region, accessing third data based on a third memory address immediately succeeding the metadata region, and generating reassembled data corresponding to the address range by concatenating at least the displaced data and the third data.

Example M17 comprises the subject matter of any one of Examples M1-M16, and further comprises searching a metadata cache using a metadata cache set index to obtain the first metadata and searching a data cache using a data cache set index to obtain the displaced data.

Example M18 comprises the subject matter of Example M17, and the metadata cache set index is to be calculated using a number of higher order bits in a second memory address of the metadata region.

Example M19 comprises the subject matter of any one of Examples M1-M18, and further comprises obtaining, from a translation lookaside buffer, a translated memory address corresponding to a beginning memory address of the address range and, in response to determining that the address range and the metadata region are co-located on a memory page, using the translated memory address to calculate another translated memory address of the metadata region.

Example M20 comprises the subject matter of any one of Examples M1-M19, and the memory controller is integrated with the processor.

An Example N1 provides an apparatus, a system, a processor, a machine readable medium, a method, and/or hardware-, firmware-, and/or software-based logic, comprising or configured to include: first circuitry including a processor and a memory controller to, and in response to a memory reallocation request to reallocate a first memory allocation corresponding to an application, perform a memory reallocation operation including: locating a first metadata region containing a first plurality of metadata within the first memory allocation; obtaining first metadata of the first plurality of metadata in the first metadata region; using the first metadata to locate first data displaced from the first metadata region and stored at a first alternate memory address in a first relocation region; loading an object from a first address of the first memory allocation into cache; replacing the first plurality of metadata in the object with the first data from the first alternate memory address of the first relocation region; performing a memory reallocation operation to obtain a second memory allocation sized to hold the object; locating a second metadata region within the second memory allocation; determining a second plurality of metadata for the second memory allocation; determining a second alternate memory address in a second relocation region; storing the object and the second plurality of metadata in the second memory allocation, and the second plurality of metadata displaces second data of the object in the second metadata region; and storing the displaced second data at the second alternate memory address in the second relocation region.

Example N2 comprises the subject matter of Example N1, and the first memory allocation is assigned to a first slot and the second memory allocation is assigned to a second slot.

Example N3 comprises the subject matter of Example N2, and the first memory allocation and the second memory allocation begin at the same memory address Example N4 comprises the subject matter of Example N2, and the first plurality of metadata in the first metadata region displaces a first portion of the object in the first memory allocation, and the second plurality of metadata in the second metadata region displaces a second portion of the object in the second memory allocation, and the first portion of the object is not identical to the second portion of the object An Example Q1 provides an apparatus, a system, a processor, circuitry (memory and/or processor), a machine readable medium, a method, and/or hardware-, firmware-, and/or software-based logic, comprising or configured to include receiving a memory access request corresponding to an application to store first data in an address range in a memory allocation of memory circuitry, and locating a metadata region within the memory allocation. Example Q1 further includes, in response to a determination that the address range at least partially overlaps the metadata region, obtaining first metadata stored in the metadata region, using the first metadata to determine an alternate memory address in a relocation region, and storing at least a portion of the first data in the relocation region based on the alternate memory address.

Example Q2 comprises the subject matter of Example Q1 and the address range includes one or more bytes of an expected allocation region of the memory allocation.

Example Q3 comprises the subject matter of any one of Examples Q1-Q2, and the relocation region is located at an end portion of the memory allocation, at a beginning portion of the memory allocation, or in an area of the memory circuitry outside the memory allocation.

Example Q4 comprises the subject matter of any one of Examples Q1-Q3, and the first metadata stored in the metadata region includes upper bound information that indicates an upper boundary of the memory allocation or lower bound information that indicates a lower boundary of the memory allocation.

Example Q5 comprises the subject matter of Example Q4, and the relocation region is located within the memory allocation and is aligned with one of the upper boundary of the memory allocation or the lower boundary of the memory allocation.

Example Q6 comprises the subject matter of any one of Examples Q4-Q5, and the upper boundary is aligned with an upper 8-byte boundary at an end of the memory allocation and the lower boundary is aligned with a lower 8-byte boundary at a beginning of the memory allocation.

Example Q7 comprises the subject matter of any one of Examples Q1-Q6, and locating the metadata region within the memory allocation includes determining a second memory address of the metadata region based on address bits in an encoded pointer associated with the memory store request corresponding to the application, size metadata in the encoded pointer, and a size of the metadata region, and the metadata region is divided at a mid-point address of a slot of the memory circuitry to which the memory allocation is assigned.

Example Q8 comprises the subject matter of Example Q7, and the size metadata in the encoded pointer represents a power of two size of a slot of the memory circuitry to which the memory allocation is assigned.

Example Q9 comprises the subject matter of any one of Examples Q1-Q3, and the first metadata is one of upper bound information that indicates an upper boundary of the memory allocation, lower bound information that indicates a lower boundary of the memory allocation, an offset to the relocation region from a mid-point address of a slot of the memory circuitry to which the memory allocation is assigned, a pointer to the relocation region, or an index to the relocation region.

Example Q10 comprises the subject matter of any one of Examples Q1-Q9, and further comprising or configured to include, in response to a memory allocation request to allocate the memory circuitry based on a first allocation size, perform a memory allocation operation including: increasing the first allocation size to an increased memory allocation size based on metadata to be stored in the metadata region of the memory allocation, obtaining the memory allocation based on the increased memory allocation size, and storing the first metadata in the metadata region.

Example Q11 comprises the subject matter of any one of Examples Q1-Q9, and further comprising or configured to, in response to a memory allocation request to allocate the memory circuitry based on a first allocation size, perform a memory allocation operation including: obtaining the memory allocation based on the first allocation size, obtaining the relocation region outside the memory allocation, generating a redirection pointer to the relocation region, and storing the redirection pointer in the metadata region.

Example Q12 comprises the subject matter of any one of Examples Q1-Q11, and further comprising or configured to include, in response to a determination that a beginning memory address of the address range is located prior to the metadata region, storing a second portion of the first data prior to the metadata region based on the beginning memory address of the address range.

Example Q13 comprises the subject matter of any one of Examples Q1-Q12, and further comprising or configured to include, in response to a determination that the address range extends beyond the metadata region, storing a third portion of the first data based on a third memory address immediately succeeding the metadata region.

Example Q14 comprises the subject matter of any one of Examples Q1-Q13, and the memory circuitry includes a metadata cache indexed by a metadata cache set index and a data cache indexed by a data cache set index, and further comprising or configured to include storing the first metadata in the metadata cache using the metadata cache set index and storing the first data in the data cache using the data cache set index.

Example Q15 comprises the subject matter of Example Q14, and the metadata cache set index is to be calculated using a number of higher order bits in a second memory address of the metadata region.

Example Q16 comprises the subject matter of any one of Examples Q1-Q15, and further comprising or configured to include obtaining, from a translation lookaside buffer, a translated memory address corresponding to a beginning memory address of the address range, and in response to a determination that the address range and the metadata region are co-located on a memory page, using the translated memory address to calculate another translated memory address of the metadata region.

An Example Y1 provides an apparatus, the apparatus comprising means for performing the method of any one of the Examples M1-M20, N1-N4 or Q1-Q16.

Example Y2 comprises the subject matter of Example Y1, and the means for performing the method comprises at least one processor and at least one memory element.

Example Y3 comprises the subject matter of Example Y2, and the at least one memory element comprises machine readable instructions that when executed, cause the apparatus to perform the method of any one of Examples M1-M20, N1-N4, or Q1-Q16.

Example Y4 comprises the subject matter of any one of Examples Y1-Y3, and the apparatus is one of a computing system or a system-on-a-chip.

An Example X1 provides at least one machine-readable storage medium comprising instructions that, when executed, realize a system or implement a method as in any one of Examples A1-A20, M1-M20, N1-N4, or Q1-Q16.

What is claimed:

1. A system, comprising:
  processor circuitry communicatively coupled to a memory, wherein the processor circuitry is to:
    receive a memory access request corresponding to an application for access to first data associated with an address range in a memory allocation allocated for the application, the address range including a first portion of the first data to be accessed and at least a portion of a metadata region of the memory allocation;
    locate the metadata region within the memory allocation; and
    based on the address range including at least a portion of the metadata region:
      obtain first metadata stored in the metadata region;
      use the first metadata to determine an alternate memory address in a relocation region; and
      read, at the alternate memory address, displaced data having an original address in the portion of the metadata region included in the address range in the memory allocation.

2. The system of claim 1, wherein the address range includes one or more bytes of an expected allocation region of the memory allocation.

3. The system of claim 1, wherein the relocation region is located at an end portion of the memory allocation, at a beginning portion of the memory allocation, or in an area of the memory outside the memory allocation.

4. The system of claim 1, wherein the first metadata stored in the metadata region includes upper bound information that indicates an upper boundary of the memory allocation or lower bound information that indicates a lower boundary of the memory allocation.

5. The system of claim 4, wherein the relocation region is located within the memory allocation and is aligned with one of the upper boundary of the memory allocation or the lower boundary of the memory allocation.

6. The system of claim 1, wherein to locate the metadata region within the memory allocation is to include:
  determining a second memory address of the metadata region based on address bits in an encoded pointer associated with the memory access request, size metadata in the encoded pointer, and a size of the metadata region, wherein the metadata region is divided at a mid-point address of a slot of the memory to which the memory allocation is assigned.

7. The system of claim 6, wherein the size metadata in the encoded pointer represents a power of two size of a slot of the memory to which the memory allocation is assigned.

8. The system of claim 1, wherein the first metadata is one of:
  upper bound information that indicates an upper boundary of the memory allocation;
  lower bound information that indicates a lower boundary of the memory allocation;
  an offset to the relocation region from a mid-point address of a slot of the memory to which the memory allocation is assigned;
  a pointer to the relocation region; or
  an index to the relocation region.

9. The system of claim 1, wherein the processor circuitry is further to:
  in response to a memory allocation request to allocate the memory based on a first allocation size, perform a memory allocation operation including:
    increasing the first allocation size to an increased memory allocation size based on metadata to be stored in the metadata region of the memory allocation;
    obtaining the memory allocation based on the increased memory allocation size; and
    storing the first metadata in the metadata region.

10. The system of claim 9, wherein the processor circuitry is further to:
  receive a memory store request corresponding to the application to store the first data in the address range of the memory allocation;
  identify a second portion of the first data to be displaced from the metadata region; and store the second portion of the first data as the displaced data at the alternate memory address in the relocation region.

11. The system of claim 1, wherein the processor circuitry is further to:
in response to a memory allocation request to allocate the memory circuitry based on a first allocation size, perform a memory allocation operation including:
obtaining the memory allocation based on the first allocation size;
obtaining the relocation region outside the memory allocation;
generating a redirection pointer to the relocation region; and
storing the redirection pointer in the metadata region.

12. The system of claim 11, wherein the processor circuitry is further to:
receive a memory store request corresponding to the application to store the first data in the address range of the memory allocation;
identify a second portion of the first data to be displaced from the metadata region; and
use the redirection pointer to store the second portion of the first data as the displaced data at the alternate memory address in the relocation region.

13. The system of claim 1, wherein the processor circuitry is further to:
in response to a determination that a beginning memory address of the address range is located prior to the metadata region, access the first portion of the first data prior to the metadata region based on the beginning memory address of the address range; and
generate reassembled data corresponding to the address range by concatenating at least the displaced data and the first portion of the first data.

14. The system of claim 1, wherein the memory is to include:
a metadata cache indexed by a metadata cache set index; and
a data cache indexed by a data cache set index,
wherein the processor circuitry is further to:
search the metadata cache using the metadata cache set index to obtain the first metadata; and
search the data cache using the data cache set index to obtain the displaced data.

15. The system of claim 14, wherein the metadata cache set index is to be calculated using a number of higher order bits in a second memory address of the metadata region.

16. The system of claim 1, wherein the processor circuitry is further to:
obtain, from a translation lookaside buffer, a translated memory address corresponding to a beginning memory address of the address range; and
in response to a determination that the address range and the metadata region are co-located on a memory page, use the translated memory address to calculate another translated memory address of the metadata region.

17. A non-transitory machine-readable storage medium including instructions that, when executed by first circuitry including a processor and a memory controller, cause the first circuitry to perform operations comprising:
receiving a memory access request corresponding to an application for access to first data associated with an address range in a memory allocation allocated for the application, the address range including at least a portion of a metadata region and a first portion of the first data to be accessed;
locating the metadata region within the memory allocation; and
based on the address range including at least a portion of the metadata region:
obtaining first metadata stored in the metadata region;
determining an alternate memory address in a relocation region, the determining based, at least in part, on the first metadata; and
reading, at the alternate memory address, displaced data having an original address in the portion of the metadata region included in the address range in the memory allocation.

18. The non-transitory machine-readable storage medium of claim 17, wherein the relocation region is located at an end portion of the memory allocation, at a beginning portion of the memory allocation, or in an area of memory outside the memory allocation.

19. The non-transitory machine-readable storage medium of claim 17, the operations further comprising, in response to a memory allocation request to allocate memory based on a first allocation size, performing a memory allocation operation including:
obtaining the memory allocation based on the first allocation size;
obtaining the relocation region outside the memory allocation;
generating a redirection pointer to the relocation region; and
storing the redirection pointer in the metadata region.

20. The non-transitory machine-readable storage medium of claim 17, the operations further comprising:
based on the address range extending beyond the metadata region, accessing the first portion of the first data based on a second memory address immediately succeeding the metadata region; and
generating reassembled data corresponding to the address range by concatenating at least the displaced data and the first portion of the first data.

21. The non-transitory machine-readable storage medium of claim 17, the operations further comprising, in response to a memory reallocation request to reallocate the memory allocation based on a different allocation size, performing a memory reallocation operation including:
obtaining a second memory allocation based on the different allocation size;
determining second metadata for the second memory allocation;
locating a second metadata region within the second memory allocation;
determining a second alternate memory address in a second relocation region;
storing the second metadata in the second metadata region of the second memory allocation, wherein the second metadata is to displace fourth data from the second metadata region; and
storing the fourth data at the second alternate memory address in the relocation region.

22. A method comprising:
receiving, via first circuitry including a processor and a memory controller, a memory access request corresponding to an application for access to first data associated with an address range in a memory allocation allocated for the application in a memory coupled to the first circuitry, the address range including at least a portion of a metadata region and a first portion of the first data; and based on determining that the address range includes at least a portion of the metadata region:
  obtaining first metadata stored in the metadata region;
  determining an alternate memory address in a relocation region, the determining based, at least in part, on the first metadata; and
  reading, at the alternate memory address, displaced data having an original address in the portion of the metadata region included in the address range in the memory allocation.

23. The method of claim 22, further comprising:
in response to determining that a beginning memory address of the address range is located prior to the metadata region, accessing the first portion of the first data prior to the metadata region based on the beginning memory address of the address range;
based on the address range extending beyond the metadata region, accessing a third portion of the first data based on a third memory address immediately succeeding the metadata region; and
generating reassembled data corresponding to the address range by concatenating at least the first portion of the first data, the displaced data, and the third portion of the first data.

24. An apparatus, comprising:
processor circuitry to be communicatively coupled to a memory, wherein the processor circuitry is to:
  receive a memory access request corresponding to an application to store first data in an address range in a memory allocation allocated for the application, the address range to include a first portion of the first data to be accessed and to overlap, at least partially, a metadata region in the memory allocation;
  locate the metadata region within the memory allocation; and
  based on the address range at least partially overlapping the metadata region:
    obtain first metadata stored in the metadata region;
    use the first metadata to determine an alternate memory address in a relocation region; and
    store a second portion of the first data in the relocation region based on the alternate memory address.

25. The apparatus of claim 24, wherein the address range includes one or more bytes of an expected allocation region of the memory allocation.

\* \* \* \* \*